(12) United States Patent
Tomishima

(10) Patent No.: US 9,723,165 B1
(45) Date of Patent: Aug. 1, 2017

(54) IMAGE FORMING APPARATUS

(71) Applicant: S-PRINTING SOLUTION CO., LTD., Suwon-si, Gyeonggi-do (KR)

(72) Inventor: Yuichiro Tomishima, Yokohama (JP)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/402,815

(22) Filed: Jan. 10, 2017

(30) Foreign Application Priority Data

Jan. 22, 2016 (JP) .................................. 2016-010547
Oct. 18, 2016 (KR) .......................... 10-2016-0135261

(51) Int. Cl.
*G06F 15/00* (2006.01)
*G06K 1/00* (2006.01)
*G06K 15/00* (2006.01)
*H04N 1/00* (2006.01)

(52) U.S. Cl.
CPC ....... *H04N 1/00724* (2013.01); *H04N 1/0075* (2013.01); *H04N 1/00734* (2013.01); *H04N 1/00769* (2013.01); *H04N 2201/0082* (2013.01)

(58) Field of Classification Search
CPC ........... H04N 1/00724; H04N 1/00734; H04N 1/0075; H04N 1/00769; H04N 2201/0082
USPC .................................. 358/1.1, 1.5, 1.12, 1.18
See application file for complete search history.

(56) References Cited

U.S. PATENT DOCUMENTS

| | | | |
|---|---|---|---|
| 5,139,339 A | 8/1992 | Courtney et al. | |
| 7,005,661 B2 | 2/2006 | Yamaguchi et al. | |
| 7,705,293 B2 | 4/2010 | Miyahara et al. | |
| 8,514,449 B2 | 8/2013 | Tanaka et al. | |
| 2009/0310980 A1 | 12/2009 | Tashiro et al. | |
| 2013/0075970 A1 | 3/2013 | Kozlowski | |
| 2013/0216245 A1 | 8/2013 | Hoshi et al. | |
| 2014/0241742 A1 | 8/2014 | Hoshi et al. | |
| 2014/0268151 A1 | 9/2014 | Ohba et al. | |
| 2015/0151938 A1* | 6/2015 | Matsumoto | B65H 7/14 358/1.12 |
| 2015/0293487 A1* | 10/2015 | Takenaga | G03G 15/5029 356/73 |
| 2016/0221780 A1 | 8/2016 | Nishimura et al. | |

FOREIGN PATENT DOCUMENTS

| | | |
|---|---|---|
| JP | 6-32496 | 2/1994 |
| JP | 6-40605 | 2/1994 |
| JP | 7-52482 | 2/1995 |
| JP | 9-100048 | 4/1997 |

(Continued)

OTHER PUBLICATIONS

International Search Report and Written Opinion of the International Searching Authority dated Apr. 18, 2017, 10 pages.

*Primary Examiner* — Douglas Tran
(74) *Attorney, Agent, or Firm* — Staas & Halsey LLP

(57) ABSTRACT

An image forming apparatus capable of preventing misdetermination of a type of printing paper includes a transmitted light receiver, a specularly reflected light receiver, and a diffusively reflected light receiver, which constitute a sensor, and an output determiner that determines whether data output by the plurality of light receivers is normal. The image forming apparatus determines the type of printing paper and an abnormality of the printing paper from the determination by the output determiner.

20 Claims, 28 Drawing Sheets

(56) References Cited

FOREIGN PATENT DOCUMENTS

| | | |
|---|---:|---:|
| JP | 10-194526 | 7/1998 |
| JP | 11-52482 | 2/1999 |
| JP | 3145699 | 1/2001 |
| JP | 2004-184203 | 7/2004 |
| JP | 2007-93586 | 4/2007 |
| JP | 2008-44754 | 2/2008 |
| JP | 2008-290810 | 12/2008 |
| JP | 2009-13946 | 1/2009 |
| JP | 2009-214979 | 9/2009 |
| JP | 2010-26496 | 2/2010 |
| JP | 2010-100383 | 5/2010 |
| JP | 5388838 | 10/2013 |
| JP | 2015-125237 | 7/2015 |

* cited by examiner (WHEN PRINTING PAPER SHEET AND TRANSMITTED
LIGHT RECEIVER ARE ARRANGED IN X-AXIS DIRECTION)

(WHEN PRINTING PAPER SHEET IS AWAY FROM
TRANSMITTED LIGHT RECEIVER IN X-AXIS DIRECTION)

(WHEN PRINTING PAPER SHEET IS CLOSE TO
TRANSMITTED LIGHT RECEIVER IN X-AXIS DIRECTION)

(WHEN Z-DIRECTION AXIS MISALIGNMENT OF
TRANSMITTED LIGHT SPOT EXCEED THRESHOLD)

(WHEN Z-DIRECTION AXIS MISALIGNMENT OF TRANSMITTED
LIGHT SPOT IS WITHIN ALLOWABLE RANGE OF THRESHOLD)

(WHEN Y-DIRECTION AXIS MISALIGNMENT OF
TRANSMITTED LIGHT SPOT EXCEED THRESHOLD)

(WHEN Y-DIRECTION AXIS MISALIGNMENT OF TRANSMITTED
LIGHT SPOT IS WITHIN ALLOWABLE RANGE OF THRESHOLD)

(WHEN +θ-DIRECTION SHIFT AXIS MISALIGNMENT OF TRANSMITTED
LIGHT SPOT IS WITHIN ALLOWABLE RANGE OF THRESHOLD)

(WHEN +θ-DIRECTION SHIFT AXIS MISALIGNMENT OF
TRANSMITTED LIGHT SPOT EXCEED THRESHOLD)

(WHEN −θ-DIRECTION SHIFT AXIS MISALIGNMENT OF
TRANSMITTED LIGHT SPOT EXCEED THRESHOLD)

(WHEN X-DIRECTION SHIFT AXIS MISALIGNMENT OF TRANSMITTED
LIGHT SPOT IS WITHIN ALLOWABLE RANGE OF THRESHOLD)

(WHEN X-DIRECTION SHIFT AXIS MISALIGNMENT OF
TRANSMITTED LIGHT SPOT EXCEED THRESHOLD)

(WHEN X-DIRECTION SHIFT AXIS MISALIGNMENT OF
TRANSMITTED LIGHT SPOT EXCEED THRESHOLD)

(WHEN X-θ DIRECTION SHIFT AXIS MISALIGNMENT OF TRANSMITTED LIGHT SPOT IS WITHIN ALLOWABLE RANGE OF THRESHOLD)

(WHEN X-θ DIRECTION SHIFT AXIS MISALIGNMENT OF TRANSMITTED LIGHT SPOT EXCEED THRESHOLD)

(WHEN X-θ DIRECTION SHIFT AXIS MISALIGNMENT OF TRANSMITTED LIGHT SPOT EXCEED THRESHOLD)

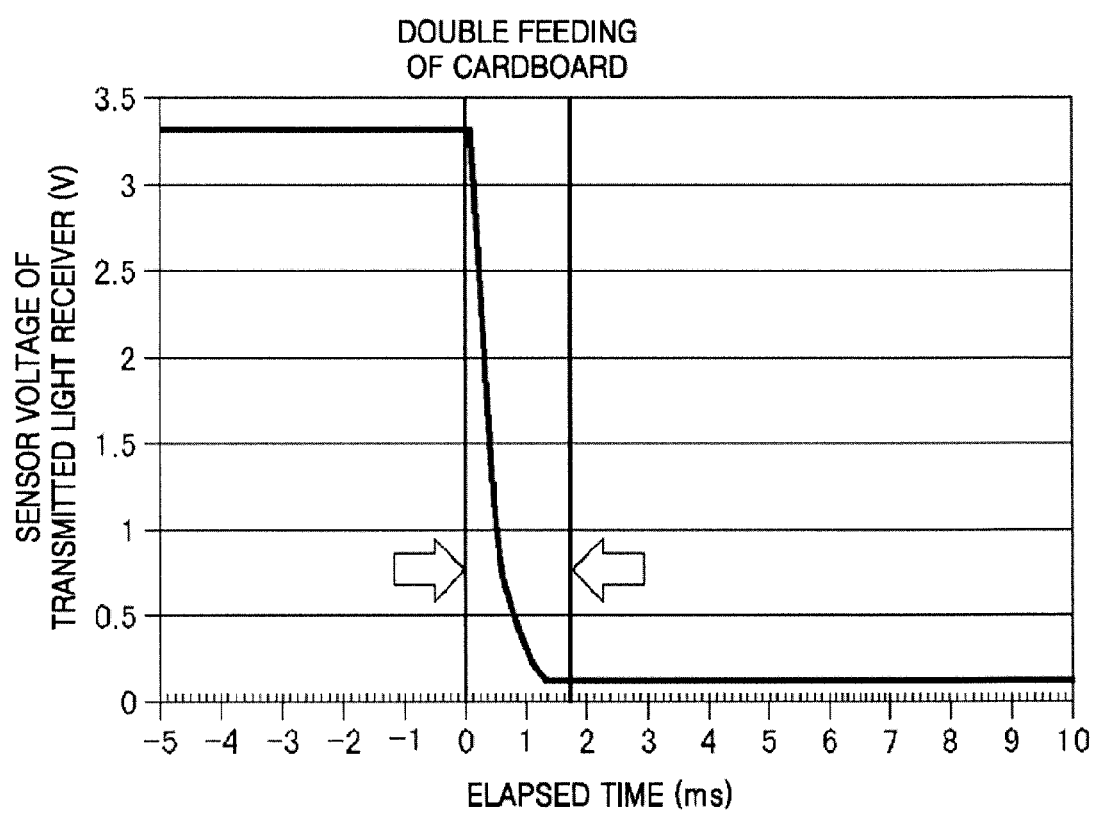

WHEN PRINTING PAPER SHEET AND TRANSMITTED
LIGHT RECEIVER 22 ARE ARRANGED IN X-AXIS DIRECTION

WHEN PRINTING PAPER SHEET AND TRANSMITTED
LIGHT RECEIVER 22 ARE ARRANGED IN X-AXIS DIRECTION

IMAGE FORMING APPARATUS

CROSS-REFERENCE TO RELATED APPLICATIONS

This application claims the priority benefit of Japan Patent Application No. 2016-010547, filed on Jan. 22, 2016, in the Japan Intellectual Property Office, and of Korean Patent Application No. 10-2016-0135261, filed on Oct. 18, 2016, in the Korean Intellectual Property Office, the disclosures of each of which are incorporated herein in their entirety by reference.

BACKGROUND

1. Field

The disclosure relates to an image forming apparatus capable of determining a type or the like of printing paper by using data output by an optical sensor.

2. Description of the Related Art

Image forming apparatuses may generally use a plurality of types of printing paper. Accordingly, before actual printing is performed, the type or the like of printing paper on which printing is to be performed should be set. When the type of printing paper is not accurately set, the original image quality performance may not be secured, and image forming apparatuses may malfunction. To address this problem, Japan Patent Application Nos. 2007-93586, 2015-125237, and 2004-184203 describe methods of determining the type of printing paper by using an optical sensor.

The optical sensor may include a light emission device that emits light, and a light reception device capable of detecting the light emitted by the light emission device. The type of printing paper, for example, the size, thickness, or the like, of printing paper, may be determined using data output by the light reception device.

SUMMARY

Disclosed herein are image forming apparatuses capable of preventing misdetermination of a printing paper type from occurring due to non-uniform traveling of printing paper, or location or angle changes of an optical sensor and the printing paper.

Disclosed herein are image forming apparatuses capable of determining an abnormal state, such as paper double feeding or conveyance of reusable paper.

Additional aspects will be set forth in part in the description which follows and, in part, will be apparent from the description, or may be learned by practice of the disclosed embodiments.

According to an aspect of an embodiment, an image forming apparatus may include a light emitter configured to radiate light to a recording medium having one surface on which a toner image is formed, a light receiver including a plurality of detectors configured to receive a portion of the light radiated to the recording medium and to respectively output independent detection results, and an output determiner configured to determine a change in a conveying state of the recording medium or a relative arrangement of the light emitter and the light receiver, according to the independent detection results respectively output by the plurality of detectors. The light receiver may include at least one of a transmitted light receiver configured to detect an amount of light transmitted by the recording medium from among the light radiated by the light emitter, a specularly reflected light receiver configured to detect an amount of light specularly reflected by the recording medium from among the light radiated by the light emitter, or a diffusively reflected light receiver configured to detect an amount of light diffusively reflected by the recording medium from among the light radiated by the light emitter.

The independent detection results respectively output by the plurality of detectors may be light receiving amounts detected by the plurality of detectors or degrees of relative change of the light receiving amounts.

When a sum of the light receiving amounts of the plurality of detectors exceeds a range of preset total light amount threshold or is less than the range of preset total light amount threshold, the output determiner may determine that the conveying state of the recording medium or the relative arrangement of the light emitter and the light receiver is abnormal.

A range of the total light amount threshold may be at least 60% to less than 120% of the optimal total light amount.

The light receiver may include at least three detectors, and each of the detectors may include at least one detection device.

The plurality of detectors may be arranged at regular intervals, and the output determiner may determine whether the conveying state of the recording medium or the relative arrangement of the light emitter and the light receiver is abnormal, according to a difference between the light receiving amounts of the plurality of detectors.

The output determiner may determine whether the conveying state of the recording medium or the relative arrangement of the light emitter and the light receiver is abnormal, according to a difference between the light receiving amounts of the plurality of detectors arranged at different locations in a direction perpendicular to a conveying direction of the recording medium on a plane defined by the recording medium.

The output determiner may determine whether the conveying state of the recording medium or the relative arrangement of the light emitter and the light receiver is abnormal, according to a difference between the light receiving amounts of the plurality of detectors arranged at different locations in the conveying direction of the recording medium.

The plurality of detectors may be four detectors, and the plurality of detectors may be arranged in a lattice shape.

When an intersection between an optical axis of the light radiated by the light emitter and the recording medium is defined as an origin point, the output determiner may calculate a difference between a sum of the light receiving amounts of the detectors arranged on a plus (positive) side of the direction perpendicular to the conveying direction of the recording medium and a sum of the light receiving amounts of the detectors arranged on a minus (negative) side opposite to the plus side of the direction perpendicular to the conveying direction of the recording medium. When the difference exceeds a preset maximum threshold, the output determiner may determine that the conveying state of the recording medium or the relative arrangement of the light emitter and the light receiver is abnormal.

When an intersection between an optical axis of the light radiated by the light emitter and the recording medium is defined as an origin point, the output determiner may calculate a difference between a sum of the light receiving amounts of the detectors arranged on a plus side of the conveying direction of the recording medium and a sum of the light receiving amounts of the detectors arranged on a minus side opposite to the plus side of the conveying direction of the recording medium. When the difference exceeds a preset maximum threshold, the output determiner may determine that the conveying state of the recording medium or the relative arrangement of the light emitter and the light receiver is abnormal.

The maximum threshold may be 80% of a light receiving amount sum of the detector.

When the sum of the light receiving amounts of the detectors is less than or equal to a preset angle determination threshold, the output determiner may define an intersection between an optical axis of the light radiated by the light emitter and the recording medium as an origin point, and may calculate a difference between a sum of the light receiving amounts of the detectors arranged on a plus side of the conveying direction of the recording medium and a sum of the light receiving amounts of the detectors arranged on a minus side opposite to the plus side of the conveying direction of the recording medium. When the difference exceeds a preset shift determination threshold, the output determiner may determine that the conveying state of the recording medium or the relative arrangement of the light emitter and the light receiver is abnormal.

When a sum of the light receiving amounts of the detectors is less than or equal to a preset angle determination threshold, the output determiner may define an intersection between an optical axis of the light radiated by the light emitter and the recording medium as an origin point, and may calculate a difference between a sum of the light receiving amounts of the detectors arranged on a plus side of the direction perpendicular to the conveying direction of the recording medium and a sum of the light receiving amounts of the detectors arranged on a minus side opposite to the plus side of the direction perpendicular to the conveying direction of the recording medium. When the difference exceeds a preset shift determination threshold, the output determiner may determine that the conveying state of the recording medium or the relative arrangement of the light emitter and the light receiver is abnormal.

When a sum of the light receiving amounts of the detectors is less than or equal to a preset angle determination threshold, the output determiner may define an intersection between an optical axis of the light radiated by the light emitter and the recording medium as an origin point, and may calculate a difference between a sum of the light receiving amounts of detectors arranged on a diagonal line in one direction and a sum of the light receiving amounts of detectors arranged on a diagonal line in another direction, in four areas defined in a lattice shape by the conveying direction of the recording medium and a direction perpendicular to the conveying direction of the recording medium. When the difference exceeds a preset shift determination threshold, the output determiner may determine that the conveying state of the recording medium or the relative arrangement of the light emitter and the light receiver is abnormal.

The angle determination threshold may be 70% of the preset optimal total light amount.

The shift determination threshold may be 50% of the light receiving amount sum of the detector.

The image forming apparatus may further include an abnormality determiner that determines that an error has occurred to the light emitter and the light receiver, when a frequency or time period from which it is determined that a conveying state of the recording medium or a relative arrangement of the light emitter and the light receiver has an error exceeds a preset frequency or time period.

The image forming apparatus may further include an abnormality determiner that determines normality or abnormality of the recording medium currently being conveyed. The light receiver may monitor a light receiving amount and determine existence of the recording medium on a light path between the light emitter and the light receiver. The abnormality determiner may monitor a change in the light receiving amount and determine whether the recording medium currently being conveyed is double-fed.

The abnormality determiner may detect the change in the light receiving amount from a leading end portion of the recording medium currently being conveyed.

The light receiving amount is a transmitted light amount of light transmitted by the recording medium. When a change time period of the transmitted light amount exceeds a preset transmitted light paper double feeding determination threshold, the abnormality determiner may determine whether the recording medium currently being conveyed is double-fed.

The light receiving amount is a reflected light amount of light reflected by the recording medium. When a change time period of the reflected light amount exceeds a preset reflected light paper double feeding determination threshold, the abnormality determiner may determine whether the recording medium currently being conveyed is double-fed.

When the abnormality determiner has determined that the recording medium currently being conveyed is double-fed, and a recording medium that precedes the recording medium currently being conveyed is undergoing printing, the conveyance of the recording medium currently being conveyed may be stopped, the printing of the preceding recording medium is completed, and then a printing operation may be stopped.

When the double-fed recording medium having a preset maximum thickness is on the path of the light emitted by the light emitter, the light emitted by the light emitter may include a light amount of an intensity that passes through the recording medium and can be detected by the light receiver.

When the recording medium having the preset maximum thickness is on the path of the light emitted by the light emitter, the light emitted by the light emitter may include a light amount of an intensity that passes through the recording medium and can be detected by the light receiver. When a recording medium corresponding to a thickness greater than the maximum thickness is detected, the abnormality determiner may determine that the thickness of the recording medium currently being conveyed is abnormal.

A measuring internal Ts of the light receiving amount is expressed as in Inequality 1:

[Inequality 1]

$$T_s < (D_{min} \div v) \times \frac{1}{2} \times \frac{1}{3}$$

In Inequality 1, Dmin indicates a preset minimum value of a deviation between recording media when paper double feeding occurs, and v indicates a conveying speed of the recording medium. The abnormality determiner may measure the light receiving amount at the measuring interval Ts.

The light emitter may include a lens or aperture that adjusts the diameter of the light emitted by the light emitter so that the diameter of light radiated to the recording medium exceeds the minimum value of the deviation between the recording media.

The image forming apparatus may further include an abnormality determiner that determines a normality or abnormality of the recording medium currently being conveyed from a change in the transmitted light amount and a change in the reflected light amount.

When the transmitted light amount decreases by more than a preset variation that is as much as one sheet of recording medium and the reflected light amount increases by more than a preset variation that is as much as one sheet of recording medium, the abnormality determiner may determine that the recording medium currently being conveyed is double-fed.

When the transmitted light amount decreases by more than the preset variation that is as much as one recording medium and the reflected light amount decreases by at least a preset reflected-light printing surface determination threshold, the abnormality determiner may determine that an image has been formed on the printing surface of the recording medium currently being conveyed.

When the transmitted light amount decreases by more than the preset variation that is as much as one sheet of recording medium and the reflected light amount is within a preset reflected-light reusable paper determination threshold, the abnormality determiner may determine that an image has been formed on a surface opposite to the printing surface of the recording medium currently being conveyed.

When a transmitted light amount of light transmitted by a portion of the recording medium currently being conveyed decreases by more than the preset variation that is as much as one sheet of recording medium, the reflected light amount decreases by at least the preset reflected-light printing surface determination threshold, a transmitted light amount of light transmitted by the remaining portion of the recording medium currently being conveyed decreases by more than the preset variation that is as much as one sheet of recording medium, and the reflected light amount is within the preset reflected-light reusable paper determination threshold, the abnormality determiner may determine that an image has been printed on both surfaces of the recording medium currently being conveyed.

When the abnormality determiner determines that an image has been formed on the printing surface of the recording medium currently being conveyed, the printing operation may be stopped.

When the abnormality determiner determines that an image has been formed on the printing surface of the recording medium currently being conveyed, the recording medium currently being conveyed may be discharged without undergoing the printing operation, and a next recording medium may undergo printing.

When the abnormality determiner determines that an image has been formed on the printing surface of the recording medium currently being conveyed, and printing instructed to be performed on the recording medium currently being conveyed is single-sided printing, an arrangement of the two surfaces of the recording medium currently being conveyed is reversed, and then a printing operation may be performed.

When the abnormality determiner determines that an image has been formed on the surface opposite to the printing surface of the recording medium currently being conveyed, and printing instructed to be performed on the recording medium currently being conveyed is double-sided printing, the printing operation may be stopped.

When the abnormality determiner determines that an image has been formed on the surface opposite to the printing surface of the recording medium currently being conveyed, and printing instructed to be performed on the recording medium currently being conveyed is double-sided printing, the recording medium currently being conveyed may be discharged without undergoing the printing operation, and a next recording medium may undergo printing.

When the abnormality determiner determines that an image has been formed on both surfaces of the recording medium currently being conveyed, the printing operation may be stopped.

When the abnormality determiner determines that an image has been formed on both surfaces of the recording medium currently being conveyed, the recording medium currently being conveyed may be discharged without undergoing the printing operation, and a next recording medium may undergo printing.

A measuring internal Ts of the light receiving amount is expressed as in Inequality 2:

[Inequality 2]

$$T_s < (D_{min} \div v) \times \frac{1}{2} \times \frac{1}{3}$$

In Inequality 2, Dmin indicates a preset minimum value of a deviation between recording media when paper double feeding occurs, and v indicates a conveying speed of the recording medium. The abnormality determiner may measure the light receiving amount at the measuring interval Ts.

The light emitter may include a lens or aperture that adjusts the diameter of the light emitted by the light emitter so that the diameter of light radiated to the recording medium is less than the minimum value of the deviation between the recording media.

The image forming apparatus may further include a paper type determiner configured to determine, from a change in the transmitted light amount, a change in the specularly reflected light amount, and a change in the diffusively reflected light amount, a type of the recording medium currently being conveyed, and an abnormality determiner configured to determine, from the change in the transmitted light amount, the change in the specularly reflected light amount, the change in the diffusively reflected light amount, and the type of the currently-being-conveyed recording medium determined by the paper type determiner, normality or abnormality of the recording medium currently being conveyed.

When one of the transmitted light amount, the specularly reflected light amount, and the diffusively reflected light amount exceeds a preset medium detection threshold, the paper type determiner may determine that the recording medium is on the conveying path and determines the type of the recording medium currently being conveyed.

When the paper type determiner determines that the recording medium is on the conveying path and the diffusively reflected light amount is less than or equal to the preset medium detection threshold, the paper type determiner may determine that the recording medium currently being conveyed includes a film layer on a surface of the recording medium.

When it is determined that the recording medium currently being conveyed includes a film layer on a surface of the recording medium, and an output of the transmitted light receiver is equal to or greater than a preset saturation determination threshold, the paper type determiner may determine that the recording medium currently being conveyed includes a transparent sheet. When the output of the transmitted light receiver is less than or equal to a preset resin sheet determination threshold, the paper type determiner may determine that the recording medium currently being conveyed includes an opaque resin sheet layer.

When the paper type determiner determines that the recording medium is on the conveying path, and the output of the diffusively reflected light receiver is equal to or greater than a preset paper determination threshold, the paper type determiner may determine that the recording medium currently being conveyed includes a paper layer on a surface of the recording medium.

When it is determined that the recording medium currently being conveyed includes the paper layer on the surface of the recording medium, and the output of the transmitted light receiver is equal to or greater than the preset saturation determination threshold, the paper type determiner may determine that the recording medium currently being conveyed is tracing paper. When the output of the transmitted light receiver is equal to or greater than a preset common paper determination threshold, the paper type determiner may determine that the recording medium currently being conveyed is common paper.

The image forming apparatus may further include an abnormality determiner configured to determine normality or abnormality of the recording medium currently being conveyed, and a second conveying path for printing another surface of the recording medium currently being conveyed. The light emitter and the light receiver are arranged on the conveying path of the recording medium to be higher than a meeting point between the conveying path and the second conveying path, and detect the recording medium between the light emitter and the light receiver by using a light receiving amount detected by the light receiver. The abnormality determiner determines normality or abnormality of the recording medium currently being conveyed, from a time period during which the light receiving amount is changed.

BRIEF DESCRIPTION OF THE DRAWINGS

These and/or other aspects and advantages will become apparent and more readily appreciated from the following description of the embodiments, taken in conjunction with the accompanying drawings of which:

FIG. 16 is a graph showing a correlation between a sensor voltage and an elapsed time when double-feeding of printing paper has occurred, according to an embodiment;

DETAILED DESCRIPTION

Figure 1:
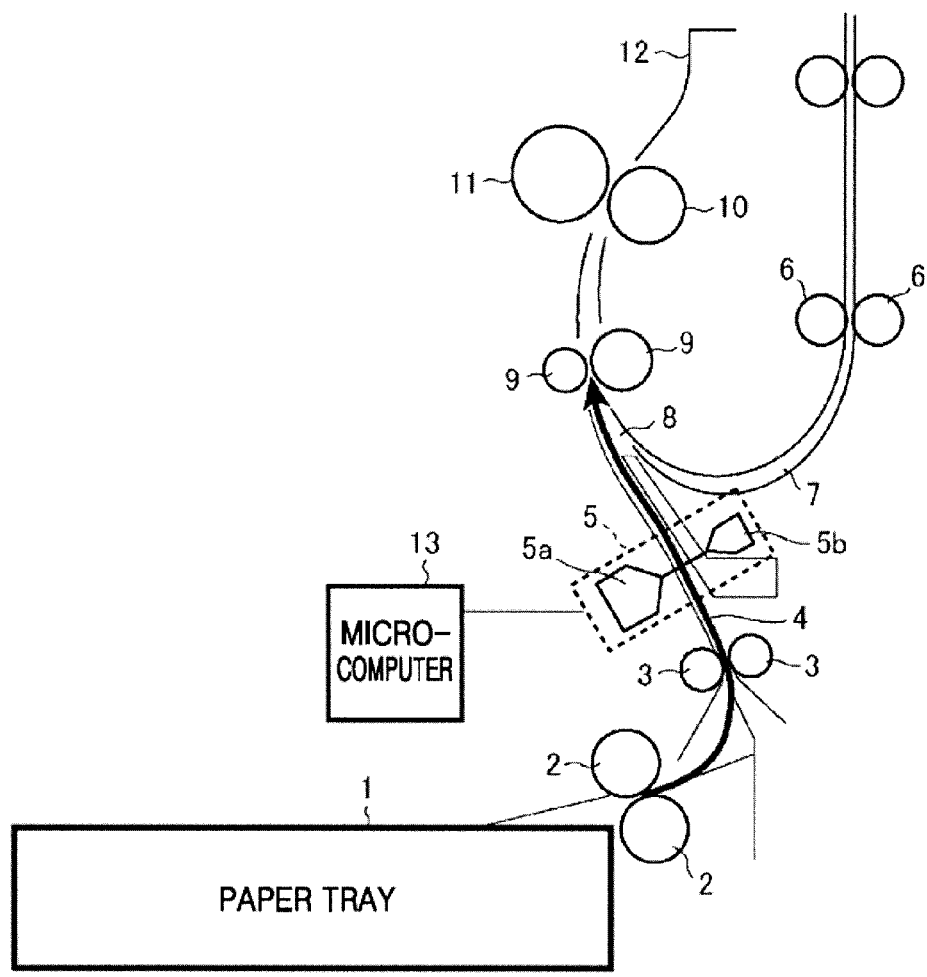
FIG. 1 is a schematic diagram of a portion of an image forming apparatus according to an embodiment.

Hereinafter, reference will now be made in detail to embodiments, examples of which are illustrated in the accompanying drawings, wherein like reference numerals refer to like elements throughout and sizes and thickness of components may be exaggerated for clarity. In this regard, the embodiments may have different forms and should not be construed as being limited to the descriptions set forth herein. Accordingly, the embodiments are merely described below, with reference to the attached drawings to explain aspects of the disclosure.

FIG. 1 is a schematic view of a portion of an image forming apparatus according to an embodiment.

Referring to FIG. 1, a paper tray 1 is a paper storage capable of storing printing paper.

A pickup roller 2 picks up a printing paper sheet from the paper tray 1.

A feeding roller 3 conveys the printing paper sheet picked up by the pickup roller 2 along a paper conveying path 4.

A sensor 5 is an optical sensor capable of detecting the printing paper sheet that is being conveyed, and may include two sensor units 5a and 5b provided near the paper conveying path 4. A reusable paper conveying path roller 6 conveys printing paper having one side that has been printed, along the reusable paper conveying path 7, during double-sided printing.

The paper conveying path 4 and the reusable paper conveying path 7 may meet at a meeting point 8. For example, the printing paper sheet fed by the feeding roller 3, or the printing paper sheet fed by the reusable paper conveying path roller 6 may meet by passing through the meeting point 8. A resist roller 9 supplies the printing paper sheets having passed through the meeting point 8 to a transfer roller 10.

The transfer roller 10 may face a photoconductor drum 11. For example, when a printing paper sheet is supplied to between the transfer roller 10 and the photoconductor drum 11 by the resist roller 9, the transfer roller 10 may rotate the printing paper sheet while pressing the printing paper sheet against the photoconductor drum 11. When a bias having a reverse polarity to the photoconductor drum 11 is applied to the transfer roller 10, the transfer roller 10 may transfer toner to the printing paper sheet.

An image forming conveyer 12 is a conveying path for conveying the printing paper sheet to which toner has been transferred by the transfer roller 10.

A micro-computer 13 is capable of various control processes of the image forming apparatus. For example, the micro-computer 13 may be implemented using a semiconductor integrated circuit having a central processing unit (CPU) mounted thereon, or a one-chip micro-computer.

The micro-computer 13 executes various programs to function as an output determiner that determines whether data output by a light receiver included in the sensor 5 is normal, or as a paper type determiner that determines the type of a currently-being-conveyed printing paper sheet by using only data determined to be normal by the output determiner from among the data output by the light receiver included in the sensors.

A voltage value of a sensor that represents a light receiving amount detected by each light receiver may be converted from an analog signal to a digital signal by an analog-to-digital converter (ADC) (not shown), and the digital signal may be transmitted to the micro-computer 13.

"Printing paper" as used herein may be, for example, common paper, an overhead projector (OHP) sheet, tracing paper, or a film, but any recording medium is possible as long as it may form a toner image thereon.

Figure 2:
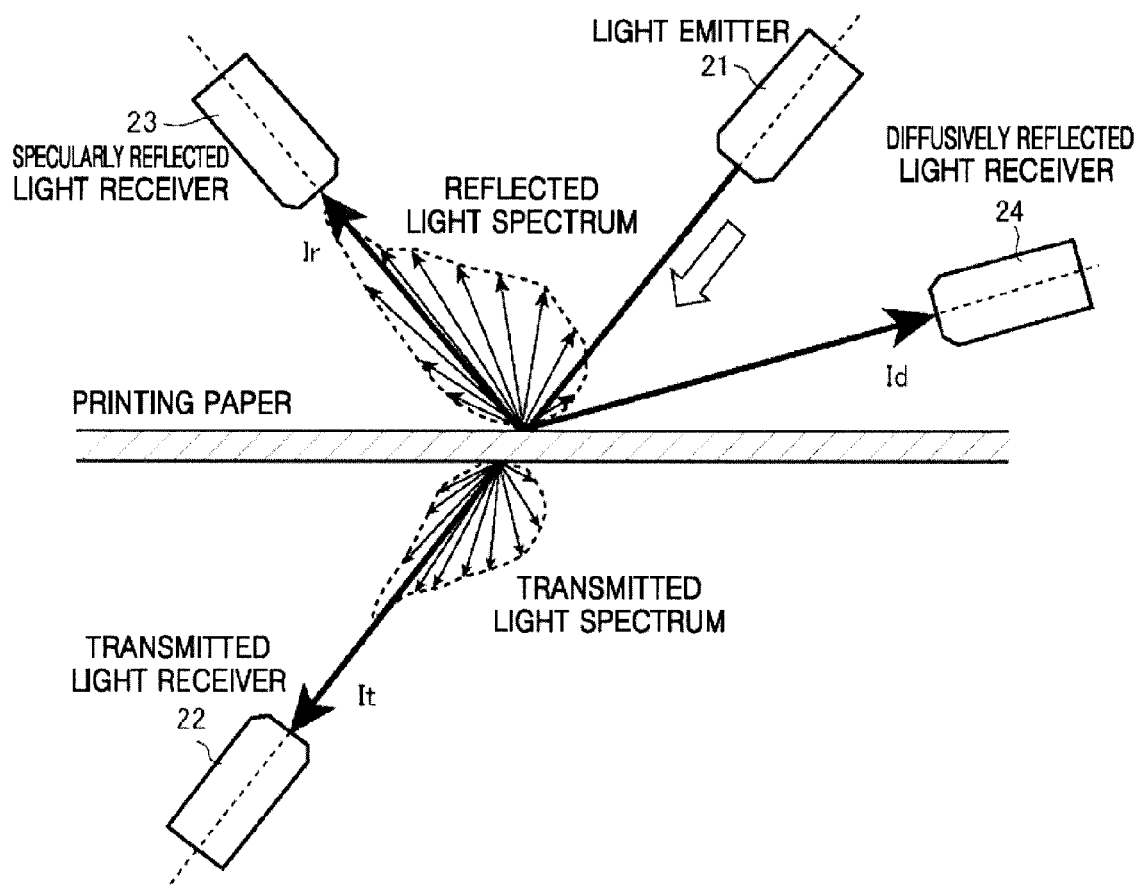
FIG. 2 is a schematic view of a sensor including an optical sensor, according to an embodiment.
Figure 3:
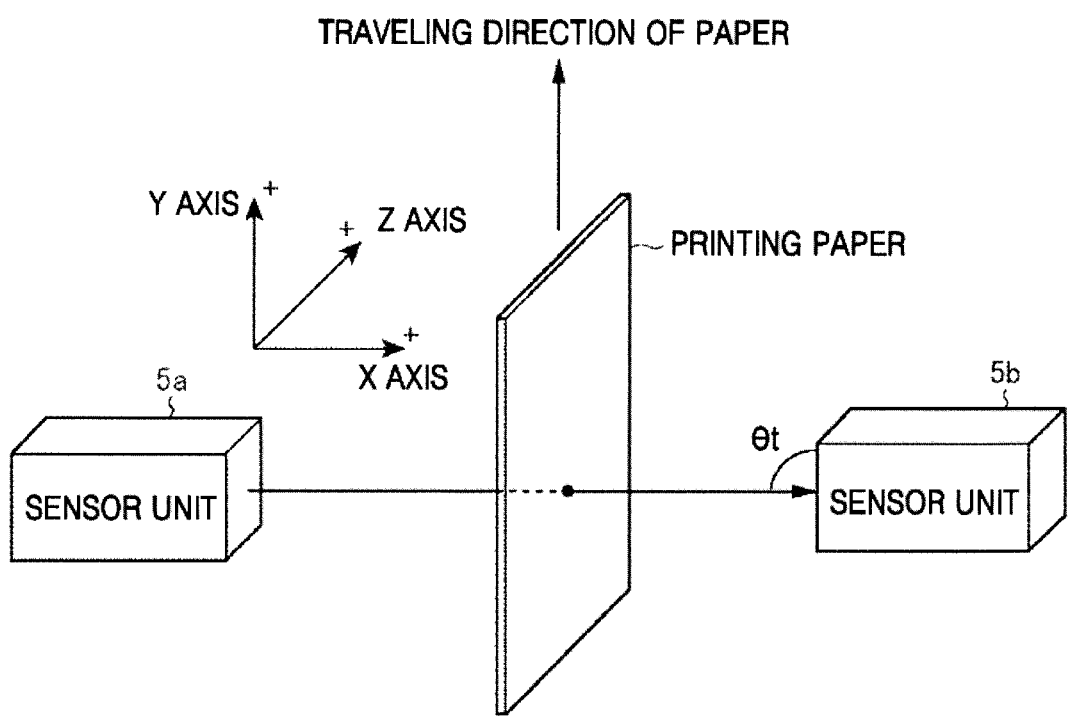
FIG. 3 is a schematic view illustrating a relationship between locations of sensor units of the sensor and a printing paper sheet, according to an embodiment.

FIG. 2 is a schematic view of the sensor 5 including an optical sensor according to an embodiment. FIG. 3 is a schematic view illustrating a relationship between locations of the sensor units 5a and 5b of the sensor 5 and a printing paper sheet, according to an embodiment.

Referring to FIGS. 2 and 3, the sensor unit 5a may include a light emitter 21, a specularly reflected light receiver 23, and a diffusively reflected light receiver 24, and the sensor unit 5b may include a transmitted light receiver 22.

The light emitter 21 emits light. For example, the light emitter 21 may be a light-emitting diode (LED), but embodiments are not limited thereto.

The transmitted light receiver 22 may be aligned with a path of the light emitted by the light emitter 21 in an almost straight line. For example, the transmitted light receiver 22 may include a light reception device that detects a transmitted light amount of light transmitted by the printing paper sheet on the paper conveying path 4 from among the light emitted by the light emitter 21.

The specularly reflected light receiver 23 may be disposed at a location toward which the light emitted by the light emitter 21 is specularly reflected by the printing paper sheet.

For example, the specularly reflected light receiver 23 may include a light reception device that detects a specularly reflected light amount of light specularly reflected by the printing paper sheet on the paper conveying path 4 from among the light emitted by the light emitter 21.

The diffusively reflected light receiver 24 may be disposed at a location toward which the light emitted by the light emitter 21 is diffusively reflected by the printing paper sheet. For example, the diffusively reflected light receiver 24 may include a light reception device that detects a diffusively reflected light amount of light diffusively reflected by the printing paper sheet on the paper conveying path 4 from among the light emitted by the light emitter 21.

For example, a photodiode (PD) or a phototransistor (PTr) may be used as the light reception devices included in the transmitted light receiver 22, the specularly reflected light receiver 23, and the diffusively reflected light receiver 24, but embodiments are not limited thereto.

Each of the transmitted light receiver 22, the specularly reflected light receiver 23, and the diffusively reflected light receiver 24 may include a plurality of detectors capable of independently outputting data. In other words, each of the transmitted light receiver 22, the specularly reflected light receiver 23 and the diffusively reflected light receiver 24 may include a plurality of detectors that independently detect light amounts and output data representing the light amounts.

The detectors combine detection results respectively output by detection devices with one another to output a result of the combination as a single detection result. In a method of combining a plurality of detection results output by the detection devices, the respective detection results of the detection devices may be simply averaged, or the respective detection results of the detection devices may be averaged by giving a weighted value according to locations where the detection devices are disposed. However, embodiments are not limited thereto, and any combining method may be used as long as a plurality of detection results output by detection devices are output as a single detection result.

An arrangement of the light emitter 21, the transmitted light receiver 22, the specularly reflected light receiver 23, and the diffusively reflected light receiver 24 may be determined according to a light diameter of a spot of light focused on the printing paper sheet on the paper conveying path 4. For example, the light diameter of the spot of light focused on the printing paper sheet on the paper conveying path 4 may be 4 mm.

When the printing paper sheet is not disposed on a light path in relation to an arrangement of each detector, each detector may be disposed on a concentric circle that provides a light-receiving intensity of 50 when a light-receiving intensity of the light emitted by the light emitter 21 with respect to an optical axis is 100. However, the arrangement of each detector is not limited thereto, and each detector may be disposed at any location as long as an output of each detector according to the amount of light emitted by the light emitter 21 may maintain linearity.

For convenience of explanation, in a coordinate system that serves as a basis in an embodiment, as shown in FIG. 3, an intersection point between an optical axis between the sensor units 5a and 5b and the printing paper sheet is used as an origin point. The optical axis is an X axis, a paper traveling direction is a Y axis direction, and an axis that intersects with the X axis and the Y axis is a Z axis. A plus direction of each axis is as illustrated in FIG. 3.

An operation of the image forming apparatus will now be described.

When a printing paper sheet stored in the paper tray 1 is picked up by the pickup roller 2, the printing paper sheet is fed along the paper conveying path 4 by the feeding roller 3.

Thereafter, the printing paper sheet fed by the feeding roller 3 may be inserted between the transfer roller 10 and the photoconductor drum 11 by the resist roller 9, and toner is transferred to the printing paper sheet between the transfer roller 10 and the photoconductor drum 11.

In this way, printing is performed on the printing paper sheet. During this printing, various setting values of the image forming apparatus are changed according to the type of the printing paper sheet. A printing process optimized for the printing paper sheet is performed.

Accordingly, when printing paper settings, such as a type or a thickness, are different from an actually-fed printing paper sheet, the original image quality performance is not secured. In the worst case, the image forming apparatus may not operate.

Printing paper settings are basically input by a user, and a paper setting on a paper tray is also performed by the user. Accordingly, the user may input erroneous settings or may perform an erroneous setting of printing paper on a paper tray.

To suppress degradation of a printing quality or a disorder of an image forming apparatus due to an error of the user, the image forming apparatus according to an embodiment may determine the type of printing paper by using a characteristic difference among the transmitted light amount of light transmitted by the printing paper, the reflected light amount of light specularly reflected by the printing paper, and the diffusively reflected light amount of light diffusively reflected by the printing paper, based on a difference accompanied according to different types of printing paper.

However, when the type of a printing paper sheet is determined using the sensor 5 that senses the transmitted light amount, the specularly reflected light amount, and the diffusively reflected light amount, traveling non-uniformity of the printing paper sheet that is conveyed on the paper conveying path 4 may occur, and accordingly, a location change, an angle change, or the like between the sensor 5 and the printing paper sheet may occur. In detail, traveling non-uniformity may occur on the paper conveying path 4 ranging from the pickup roller 2 to the resist roller 9. In particular, when the printing paper sheet is thin, this trend becomes worse, because printing paper is weaker as the printing paper is thinner. Traveling non-uniformity may also occur on the paper conveying path 4 because of a traveling speed of printing paper, a traveling posture of printing paper, such as an angle between the printing paper and the sensor 5, or the like.

According to an error to an initial installation location of each device, such as the light emitter 21 or each light receiver, an error may be generated to an arrangement angle of each device. When an impact or a vibration is applied to the image forming apparatus, an optical system arranged within the image forming apparatus may be affected. In other words, when a relative location or relative angle of the light emitter 21 or each light receiver changes, a change in a location or angle of the light emitter 21 or each light receiver may occur. Such a factor in the location or angle change of the sensor 5 will now be referred to as "a change factor" for convenience of explanation. When such a change factor is generated, light amounts detected by the transmitted light receiver 22, the specularly reflected light receiver 23, and the diffusively reflected light receiver 24, which constitute the sensor 5, may become non-uniform or may not be consistent with the original light amounts.

As described above, determination of a paper type by an optical unit may be made according to respective light receiving amounts of a transmitted light amount, a specularly reflected light amount, and a diffusively reflected light amount that vary according to paper types. However, when a change factor as described above is generated, the light receiving amounts of the transmitted light amount, the specularly reflected light amount, and the diffusively reflected light amount may include errors. When the type of printing paper is determined according to a light receiving amount including such an error, namely, abnormal data, the accuracy of the determination may degrade.

Accordingly, according to the embodiment, the output determiner (micro-computer 13) may determine whether data representing the light amounts detected by the transmitted light receiver 22, the specularly reflected light receiver 23, and the diffusively reflected light receiver 24 is normal. When the data is determined to be normal, the image forming apparatus may determine the type of printing paper by using the normal data. In other words, when the data representing the light amounts detected by the transmitted light receiver 22, the specularly reflected light receiver 23, and the diffusively reflected light receiver 24 is determined to be abnormal, it is considered that traveling non-uniformity occurs in the printing paper or the sensor 5 is out of order, and thus the abnormal data is not used to determine the type of printing paper.

Data determination by the output determiner (micro-computer 13) will now be described in detail.

As shown in FIG. 2, the sensor 5 receives transmitted light transmitted by the printing paper sheet by using the transmitted light receiver 22, and receives light specularly reflected by the printing paper by using the specularly reflected light receiver 23. When the printing paper sheet includes a fiber material, the light emitted by the light emitter 21 may be diffused by a fiber layer of the printing paper sheet, and the diffused light may be received by the diffusively reflected light receiver 24.

As shown in FIG. 2, a transmitted light spectrum, which is a spectrum of the transmitted light, may be represented by a plurality of vectors, and an intensity It of the transmitted light may vary according to a transmission angle thereof.

Similarly, as shown in FIG. 2, a reflected light spectrum, which is a spectrum of reflected light, may be represented by a plurality of vectors, and intensities Ir and Id of specularly and diffusively reflected lights may vary according to reflection angles thereof.

Because the intensity Ir is at a specular reflection angle (reflection angle=incidence angle), a specular reflection intensity is obtained. Because the intensity Id is at a diffusive reflection angle (reflection angle≠incidence angle), a diffusive reflection intensity not including the specular reflection intensity is obtained.

According to the embodiment, because each of the light reception devices respectively included in the transmitted light receiver 22, the specularly reflected light receiver 23, and the diffusively reflected light receiver 24 may include four detectors, a sum of light amounts detected by the four detectors of the transmitted light receiver 22 is a transmitted light amount ∫lt detected by the transmitted light receiver 22, and a sum of light amounts detected by the four detectors of the specularly reflected light receiver 23 is a specularly reflected light amount ∫lr detected by the specularly reflected light receiver 23. A sum of light amounts detected by the four detectors of the diffusively reflected light receiver 24 is a diffusively reflected light amount ∫ld detected by the diffusively reflected light receiver 24.

In detail, when transmitted light amounts respectively detected by four detectors a, b, c, and d that constitute the transmitted light receiver 22 are lta, ltb, ltc, and ltd, respectively, the transmitted light amount ∫lt detected by the transmitted light receiver 22 is calculated using Equation (1):

$$\int lt = lta + ltb + ltc + ltd \tag{1}$$

Similarly, the specularly reflected light amount ∫lr is calculated using Equation (2), and the diffusively reflected light amount ∫ld is calculated using Equation (3):

$$\int lr = lra + lrb + lrc + lrd \tag{2}$$

$$\int ld = lda + ldb + ldc + ldd \tag{3}$$

By including a plurality of detectors into which each light receiver is divided as described above, the detectors may detect a location or angle change in a spot corresponding to each light receiver. Accordingly, whether the light receiving amount has been changed due to a change factor, namely, whether acquired data is abnormal, may be determined.

In other words, when the optical system of the sensor 5 is affected by a change factor and thus a location or angle of a spot corresponding to each light receiver is changed, the light receiving amount of each light receiver is also changed. Conventional apparatuses do not determine whether a change in a light receiving amount is due to the type of printing paper or due to a change factor. However, according to the embodiment, the image forming apparatus may determine whether a change in a light receiving amount of each light receiver is due to a change factor, namely, whether the obtained data is abnormal, by detecting a change in the location or angle of a spot corresponding to each light receiver.

When printing paper is not arranged on a light path, the transmitted light amounts lta, ltb, ltc, and ltd may use values obtained by normalizing the output values of the four detectors to reference values. This is equally applied to the specularly received light and the diffusively received light.

Discussed below is a determination of normality or abnormality of data, based on a sum of light amounts detected by 4 detectors.

The output determiner (micro-computer 13) determines whether data, namely, a light receiving amount, obtained from the transmitted light amount ∫lt detected by the transmitted light receiver 22 is normal.

For example, when a printing paper sheet is conveyed from a location away from the transmitted light receiver 22, namely, when the printing paper sheet is close to the light emitter 21, a transmitted light that forms a large angle θt with the optical axis is not received by the transmitted light receiver 22, and only a transmitted light that forms a small angle θt with the optical axis is received by the transmitted light receiver 22. Accordingly, the transmitted light amount ∫lt detected by the transmitted light receiver 22 decreases.

On the other hand, when the printing paper sheet is conveyed from a location close to the transmitted light receiver 22, a transmitted light that forms a large angle θt with the optical axis is received by the transmitted light receiver 22, in contrast with when the printing paper sheet is conveyed from the location away from the transmitted light receiver 22. Accordingly, the transmitted light amount ∫lt detected by the transmitted light receiver 22 may increase.

Figure 4A:
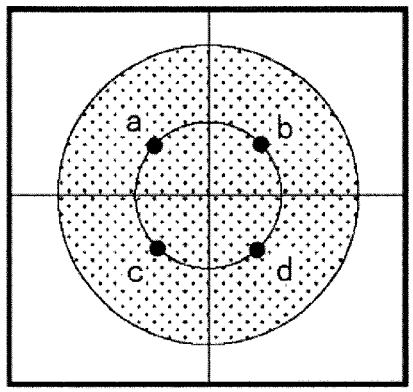
FIGS. 4A-4C are schematic views illustrating relationships between locations of a printing paper sheet with respect to a transmitted light receiver and a transmitted light amount of the transmitted light receiver, according to an embodiment.
Figure 4B:
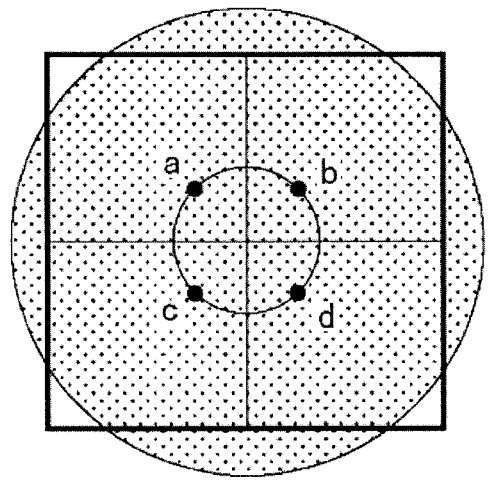
Figure 4C:
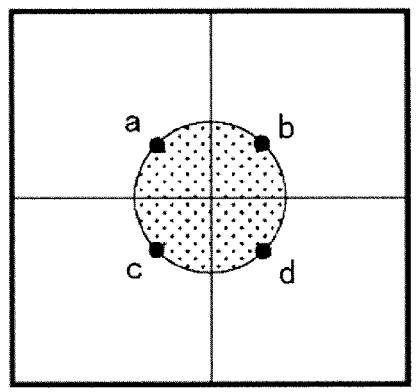

FIGS. 4A-4C are schematic views illustrating relationships between locations of a printing paper sheet with respect to the transmitted light receiver 22 and the transmitted light amount fit.

FIG. 4A illustrates a case where the printing paper sheet and the transmitted light receiver 22 are arranged, FIG. 4B illustrates a case where the printing paper sheet is away from the transmitted light receiver 22, and FIG. 4C illustrates a case where the printing paper sheet is close to the transmitted light receiver 22. In FIGS. 4A-4C, each circle indicates a transmitted light spot. In FIG. 4B, illustrating a spot that is spread compared with FIG. 4A, only a portion of light is received. In FIG. 4C, illustrating a too shrunk spot compared with FIG. 4A, since a percentage of an interval (area unable to receive light) between detectors increases, only a portion of light is received.

The output determiner sets 60% of a preset optimal total light amount of the transmitted light amount flt to be a lower limit fltref-under of a total light amount threshold, and sets 120% of the preset optimal total light amount of the transmitted light amount flt to be an upper limit fltref-upper of the total light amount threshold. In other words, a range of the total light amount threshold is at least 60% to less than 120% of the optimal total light amount. However, this is merely an example, and the range of the total light amount threshold is not limited to at least 60% to less than 120% of the preset optimal total light amount.

When the transmitted light amount flt detected by the transmitted light receiver 22 is equal to or greater than the upper limit fltref-upper of the total light amount threshold, the output determiner determines that the data representing the transmitted light amount fit, which is output by the transmitted light receiver 22, is abnormal.

When the transmitted light amount flt detected by the transmitted light receiver 22 is less than the lower limit fltref-under of the total light amount threshold, the output determiner determines that the data representing the transmitted light amount fit, which is output by the transmitted light receiver 22, is abnormal.

When the transmitted light amount flt detected by the transmitted light receiver 22 is equal to or greater than the lower limit fltref-under of the total light amount threshold and less than the upper limit fltref-upper of the total light amount threshold, the output determiner determines that the data representing the transmitted light amount fit, which is output by the transmitted light receiver 22, is normal.

The preset optimal total light amount of the transmitted light amount flt is set as an average value of the output values of all of the detectors detected by a normally-disposed transmitted light receiver 22 when a printing paper sheet as a basis is in a normal state and exists on the light path. According to the embodiment, the printing paper sheet as a basis is common paper, but embodiments are not limited thereto. The preset optimal total light amount of the transmitted light amount flt may be differently set according to different types of printing paper as a basis. A preset optimal total light amount of the specularly reflected light amount flt and a preset optimal total light amount of the diffusively reflected light amount fld may be determined as described above.

As described above, all threshold values according to the embodiment may be set as a threshold set for each printing paper as a basis, and may be variously selected according to printing paper as a basis, namely, printing paper typically used by a user, or a usage situation of the image forming apparatus. As described above, the output determiner may determine whether data, namely, a light receiving amount, obtained from the specularly reflected light amount flr detected by the specularly reflected light receiver 23 or the diffusively reflected light amount fld detected by the diffusively reflected light receiver 24 is normal.

For example, when the printing paper sheet is conveyed in a direction away from the specularly reflected light receiver 23 or the diffusively reflected light receiver 24, a specularly received light or diffusively received light that forms a large angle θr or θd with respect to the optical axis may not be received by the specularly reflected light receiver 23 or the diffusively reflected light receiver 24, and only a specularly received light or diffusively received light that forms a small angle θr or θd with respect to the optical axis may be received by the specularly reflected light receiver 23 or the diffusively reflected light receiver 24. Accordingly, the specularly reflected light amount flr or the diffusively reflected light amount fld respectively detected by the specularly reflected light receiver 23 or the diffusively reflected light receiver 24 may relatively decrease.

On the other hand, when the printing paper sheet is conveyed in a direction close to the specularly reflected light receiver 23 or the diffusively reflected light receiver 24, a specularly received light or diffusively received light that forms a large angle θr or θd with respect to the optical axis may be received by the specularly reflected light receiver 23 or the diffusively reflected light receiver 24. Accordingly, as compared with when the printing paper sheet is conveyed in a direction away from the specularly reflected light receiver 23 or the diffusively reflected light receiver 24, the specularly reflected light amount flr or the diffusively reflected light amount fld respectively detected by the specularly reflected light receiver 23 or the diffusively reflected light receiver 24 may relatively increase.

The output determiner may set 60% of the preset optimal total light amount of the specularly reflected light amount flr or the diffusively reflected light amount fld to be a lower limit flrref-under or fldref-under of a total light amount threshold, and may set 120% of the preset optimal total light amount of the specularly reflected light amount flr or the diffusively reflected light amount fld to be an upper limit flrref-upper or fldref-upper of the total light amount threshold. In other words, a range of the total light amount threshold is at least 60% to less than 120% of the optimal total light amount. However, embodiments are not limited thereto, and the range of the total light amount threshold may be variously set with respect to the optimal total light amount.

When the specularly reflected light amount flr or the diffusively reflected light amount fld detected by the specularly reflected light receiver 23 or the diffusively reflected light receiver 24 is equal to or greater than the upper limit flrref-upper or fldref-upper of the total light amount threshold or less than the lower limit flrref-under or fldref-under of the total light amount threshold, the output determiner determines that data representing the specularly reflected light amount flr or the diffusively reflected light amount fld, which is output by the specularly reflected light receiver 23 or the diffusively reflected light receiver 24, is abnormal.

When the specularly reflected light amount flr or the diffusively reflected light amount fld detected by the specularly reflected light receiver 23 or the diffusively reflected light receiver 24 is equal to or greater than the lower limit flrref-under or fldref-under of the total light amount threshold and is less than the upper limit flrref-upper or fldref-upper of the total light amount threshold, the output determiner determines that the printing paper sheet is at an appropriate location and the data representing the specularly reflected light amount flr or the diffusively reflected light amount fld, which is output by the specularly reflected light receiver 23 or the diffusively reflected light receiver 24, is normal.

According to the above-described change factor, the location of the spot may be changed or the shape thereof may be deformed. For example, when the printing paper sheet is bent and accordingly an angle of the printing paper sheet with respect to radiated light changes, the detected optical axis of reflected light or the like may deviate from a predetermined optical axis. In addition, when an error is generated to a disposition location or angle of each device, such as the light emitter 21 or the transmitted light receiver 22, or a relative location or angle of the light emitter 21 or the transmitted light receiver 22 changes due to an impact or vibration applied to the image forming apparatus, the detected optical axis of transmitted light or the like may deviate from a predetermined optical axis.

Figure 5A:
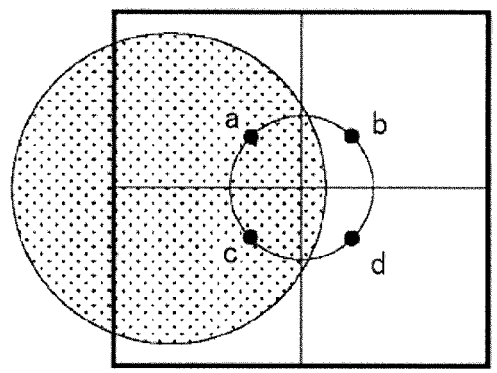
FIGS. 5A and 5B are schematic views illustrating a misalignment of a spot of transmitted light, according to an embodiment.
Figure 5B:
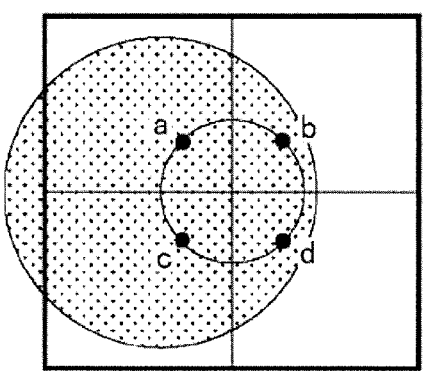

FIGS. 5A and 5B are schematic views illustrating a misalignment of a transmitted light spot in a Z-axis direction, according to an embodiment. That is, discussed below is a determination of normality or abnormality of data due to misalignment of a detected spot in a Z axis direction.

For example, FIG. 5A illustrates a case where the Z-direction axis misalignment of the transmitted light spot exceeds a threshold, and FIG. 5B illustrates a case where the Z-direction axis misalignment of the transmitted light spot is within an allowable range of the threshold.

For example, when the Z-direction axis misalignment of the transmitted light spot exceeds the threshold, a sum lta+ltc of the transmitted light amounts lta and ltc detected by the detectors a and c on the left column among the four detectors a, b, c, and d of the transmitted light receiver 22 may be greatly different from a sum ltb+ltd of the transmitted light amounts ltb and ltd detected by the detectors b and d on the right column among the four detectors a, b, c, and d.

On the other hand, when the Z-direction axis misalignment of the transmitted light spot is within the allowable range of the threshold, a difference between the sum lta+ltc of the transmitted light amounts lta and ltc detected by the detectors a and c on the left column and the sum ltb+ltd of the transmitted light amounts ltb and ltd detected by the detectors b and d on the right column may be relatively small.

Accordingly, the output determiner calculates the sum lta+ltc of the transmitted light amounts lta and ltc detected by the detectors a and c on the left column and the sum ltb+ltd of the transmitted light amounts ltb and ltd detected by the detectors b and d on the right column. As shown in Inequality (4) below, when an absolute value of a difference between the sum lta+ltc and the sum ltb+ltd is greater than a preset Z-axis determination maximum threshold Zthmax, the output determiner determines that the Z-direction axis misalignment of the transmitted light spot exceeds the allowable range of the threshold and is thus inappropriate, and determines that the data representing the transmitted light amount flt, which is output by the transmitted light receiver 22, is abnormal.

On the other hand, as shown in Inequality (5) below, when the absolute value of the difference between the sum lta+ltc and the sum ltb+ltd is less than or equal to a preset Z-axis determination minimum threshold Zthmin, the output determiner determines that the Z-direction axis misalignment of the transmitted light spot is within the allowable range of the threshold and is thus appropriate, and determines that the data representing the transmitted light amount flt, which is output by the transmitted light receiver 22, is normal.

$$|(lta+ltc)-(ltb+ltd)|>Zth\max \quad (4)$$

$$|(lta+ltc)-(ltb+ltd)|\leq Zth\min \quad (5)$$

The Z-axis determination maximum threshold Zthmax may be set to be, for example, 80% of the transmitted light amount flt detected by the transmitted light receiver 22.

The Z-axis determination minimum threshold Zthmin may be set to be, for example, 20% of the transmitted light amount flt detected by the transmitted light receiver 22. According to the above-described embodiment, when the absolute value of the difference between the sum lta+ltc and the sum ltb+ltd is greater than the Z-axis determination minimum threshold Zthmin and is less than or equal to the Z-axis determination maximum threshold Zthmax, the output determiner does not determine whether the data is normal or abnormal. Accordingly, whether to use the transmitted light amount flt detected by the transmitted light receiver 22 to determine the type of printing paper may be determined according to a precision for determining the type of printing paper. For example, when there is a need to increase the precision for determining the type of printing paper, the transmitted light amount flt represented by data of which normality or abnormality has not been determined may not be used to determine the type of printing paper. On the other hand, when a certain degree of determination precision is enough, the transmitted light amount flt may be used to determine the type of printing paper.

FIGS. 5A-5B illustrate the embodiment in which the Z-direction axis misalignment of the transmitted light spot is determined from the transmitted light amounts lta, ltb, ltc, and ltd detected by the four detectors a, b, c, and d that constitute the transmitted light receiver 22. However, similarly, a Z-direction axis misalignment of a specularly or diffusively reflected light spot may be determined from the light receiving amounts detected by four detectors a, b, c, and d that constitute the specularly reflected light receiver 23 or the diffusively reflected light receiver 24.

Discussed below is a determination of normality or abnormality of data due to detection of a misalignment of a spot in a Y-axis direction.

Figure 6A:
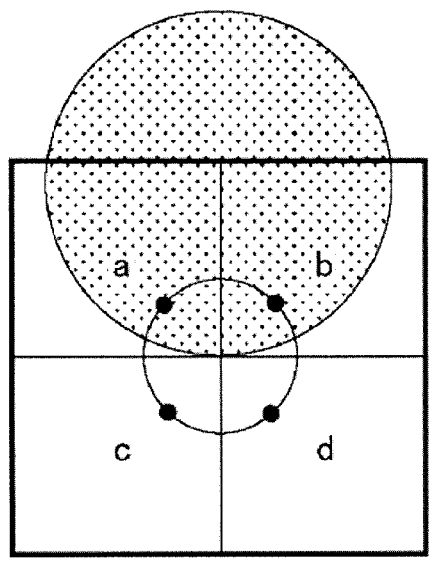
FIGS. 6A and 6B are schematic views illustrating a misalignment of a spot of transmitted light, according to an embodiment.
Figure 6B:
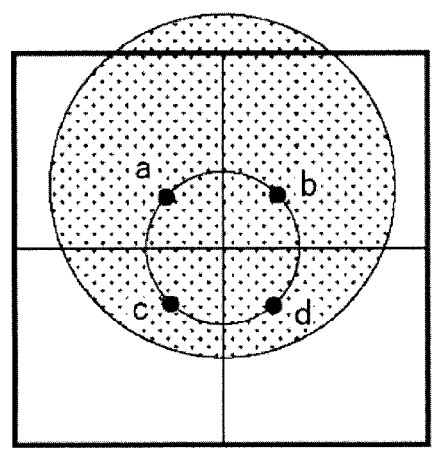

FIGS. 6A and 6B are schematic views illustrating a misalignment of a transmitted light spot in a Y-axis direction, according to an embodiment.

FIG. 6A illustrates a case where the Y-direction axis misalignment of the transmitted light spot exceeds a threshold, and FIG. 6B illustrates a case where the Y-direction axis misalignment of the transmitted light spot is within an allowable range of the threshold.

For example, when the Y-direction axis misalignment of the transmitted light spot exceeds the threshold, a sum lta+ltb of the transmitted light amounts lta and ltb detected by the detectors a and b on an upper side among the four detectors a, b, c, and d of the transmitted light receiver 22 may be greatly different from a sum ltc+ltd of the transmitted light amounts ltc and ltd detected by the detectors c and d on a lower side among the four detectors a, b, c, and d.

On the other hand, when the Y-direction axis misalignment of the transmitted light spot is within the allowable range of the threshold, a difference between the sum lta+ltb of the transmitted light amounts lta and ltb detected by the detectors a and b on the upper side and the sum ltc+ltd of the transmitted light amounts ltc and ltd detected by the detectors c and d on the lower side may be relatively small.

Accordingly, the output determiner calculates the sum lta+ltb of the transmitted light amounts lta and ltb detected by the detectors a and b on the upper side and the sum ltc+ltd of the transmitted light amounts ltc and ltd detected by the detectors c and d on the lower side. As shown in Inequality (6) below, when an absolute value of a difference between the sum lta+ltb and the sum ltc+ltd is greater than a preset Y-axis determination maximum threshold Ythmax, the output determiner determines that the Y-direction axis misalignment of the transmitted light spot is large and inappropriate, and determines that the data representing the transmitted light amount flt output by the transmitted light receiver 22 is abnormal.

On the other hand, as shown in Inequality (7) below, when the absolute value of the difference between the sum lta+ltb and the sum ltc+ltd is less than or equal to a preset Y-axis determination minimum threshold Ythmin, the output determiner determines that the Y-direction axis misalignment of the transmitted light spot is small and is thus appropriate, and determines that the data representing the transmitted light amount flt output by the transmitted light receiver 22 is normal.

$$|(lta+ltb)-(ltc+ltd)|>Zth\max \quad (6)$$

$$|(lta+ltb)-(ltc+ltd)|\leq Zth\min \quad (7)$$

The Y-axis determination maximum threshold Ythmax may be set to be, for example, 80% of the transmitted light amount flt detected by the transmitted light receiver 22.

The Y-axis determination minimum threshold Ythmin may be set to be, for example, 20% of the transmitted light amount flt detected by the transmitted light receiver 22.

According to the above-described embodiment, when the absolute value of the difference between the sum lta+ltb and the sum ltc+ltd is greater than the Y-axis determination minimum threshold Ythmin and is less than or equal to the Y-axis determination maximum threshold Ythmax, the output determiner does not determine whether the data is normal or abnormal. Accordingly, whether to use the transmitted light amount flt detected by the transmitted light receiver 22 to determine the type of printing paper may be determined according to a precision for determining the type of printing paper. For example, when there is a need to increase the precision for determining the type of printing paper, the transmitted light amount flt represented by data of which normality or abnormality has not been determined may not be used to determine the type of printing paper. On the other hand, when a certain degree of determination precision is enough, the transmitted light amount flt may be used to determine the type of printing paper.

FIGS. 6A and 6B illustrate the embodiment in which the Y-direction axis misalignment of the transmitted light spot is determined from the transmitted light amounts lta, ltb, ltc, and ltd detected by the four detectors a, b, c, and d that constitute the transmitted light receiver 22. However, similarly, a Y-direction axis misalignment of a specularly or diffusively reflected light spot may be determined from the light receiving amounts detected by the four detectors a, b, c, and d that constitute the specularly reflected light receiver 23 or the diffusively reflected light receiver 24.

Discussed below is a determination of normality or abnormality of data due to detection of a misalignment of a spot in a θ-direction shift axis.

Figure 7A:
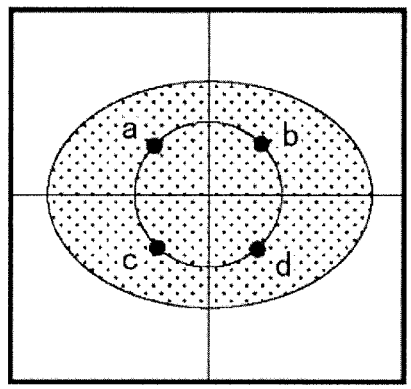
FIGS. 7A-7C are schematic views illustrating a misalignment of a spot of transmitted light, according to an embodiment.
Figure 7B:
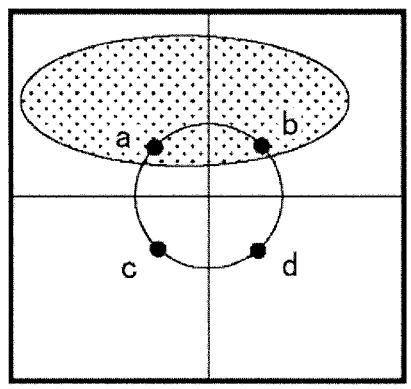
Figure 7C:
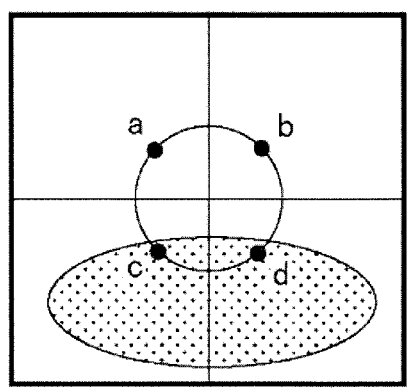

FIGS. 7A-7C are schematic views illustrating a misalignment of a transmitted light spot in a θ-direction shift axis, according to an embodiment. FIG. 7A illustrates an embodiment in which the θ-direction shift axis misalignment of the transmitted light spot is within an allowable range. FIGS. 7B and 7C illustrate inappropriate embodiments in which the θ-direction shift axis misalignment of the transmitted light spot exceeds a threshold.

For example, when the θ-direction shift axis misalignment of the transmitted light spot is large, the transmitted light spot is deformed into an oval shape as if being compressed in one direction, and thus the transmitted light amount flt detected by the transmitted light receiver 22 may relatively decrease (FIG. 7A).

When the θ-direction shift axis misalignment of the transmitted light spot is accompanied by a Y-direction axis misalignment of the transmitted light spot (FIGS. 7B and 7C), a sum lta+ltb of the transmitted light amounts lta and ltb detected by the detectors a and b on the upper side among the four detectors a, b, c, and d of the transmitted light receiver 22 may be greatly different from a sum ltc+ltd of the transmitted light amounts ltc and ltd detected by the detectors c and d on the lower side among the four detectors a, b, c, and d. On the other hand, when the θ-direction shift axis misalignment of the transmitted light spot (the Y-direction axis misalignment of the transmitted light spot that accompanies the θ-direction shift axis misalignment) is small, a difference between the sum lta+ltb of the transmitted light amounts lta and ltb detected by the detectors a and b on the upper side and the sum ltc+ltd of the transmitted light amounts ltc and ltd detected by the detectors c and d on the lower side may be relatively small.

Accordingly, as shown in Inequality (8) below, the output determiner determines whether the transmitted light amount flt detected by the transmitted light receiver 22 is less than or equal to a preset angle determination threshold θth1.

$$flt \leq \theta th1 \quad (8)$$

The angle determination threshold θth1 may be set to be, for example, 70% of an optimal total light amount.

When the transmitted light amount flt detected by the transmitted light receiver 22 is less than or equal to the angle determination threshold θth1, the θ-direction shift axis misalignment is large, and thus the printing paper sheet may be deformed. Accordingly, the output determiner calculates the sum lta+ltb of the transmitted light amounts lta and ltb detected by the detectors a and b on the upper side and the sum ltc+ltd of the transmitted light amounts ltc and ltd detected by the detectors c and d on the lower side. As shown in Inequality (9) below, when an absolute value of a difference between the sum lta+ltb and the sum ltc+ltd is greater than a preset θ-direction shift determination threshold θth2, the output determiner determines that the θ-direction shift axis misalignment (the Y-direction axis misalignment that accompanies the θ-direction shift axis misalignment) exceeds the threshold and is thus inappropriate, and determines that the data representing the transmitted light amount flt output by the transmitted light receiver 22 is abnormal.

On the other hand, when the absolute value of the difference between the sum lta+ltb and the sum ltc+ltd is less than or equal to the θ-direction shift determination threshold θth2, the output determiner determines that the θ-direction shift axis misalignment is within the allowable range and that the data representing the transmitted light amount flt output by the transmitted light receiver 22 is normal.

$$|(lta+ltb)-(ltc+ltd)|>\theta th2 \quad (9)$$

The θ-direction shift determination threshold θth2 may be set to be, for example, 50% of the transmitted light amount flt detected by the transmitted light receiver 22.

FIGS. 7A-7C illustrate the embodiment in which the θ-direction shift axis misalignment of the transmitted light spot is determined from the transmitted light amounts lta, ltb, ltc, and ltd detected by the four detectors a, b, c, and d that constitute the transmitted light receiver 22. However, similarly, a θ-direction shift axis misalignment of a specularly or diffusively reflected light spot may be determined from the light receiving amounts detected by the four detectors a, b, c, and d that constitute the specularly reflected light receiver 23 or the diffusively reflected light receiver 24.

Discussed below is a determination of normality or abnormality of data due to detection of a horizontal shift axis misalignment of a spot.

Figure 8A:
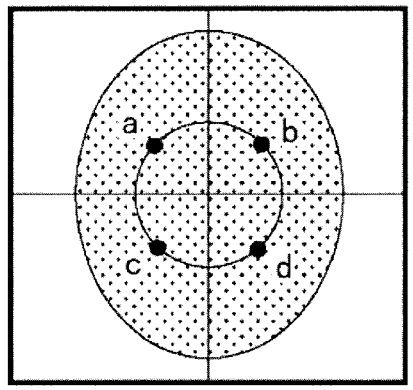
FIGS. 8A-8C are schematic views illustrating a misalignment of a spot of transmitted light, according to an embodiment.
Figure 8B:
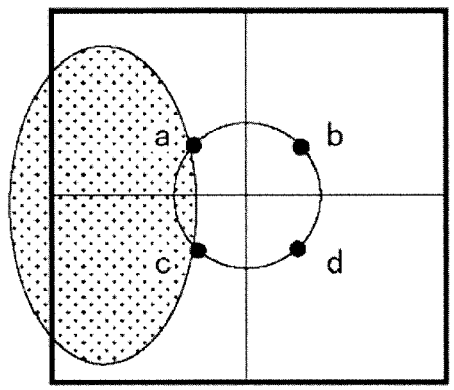
Figure 8C:
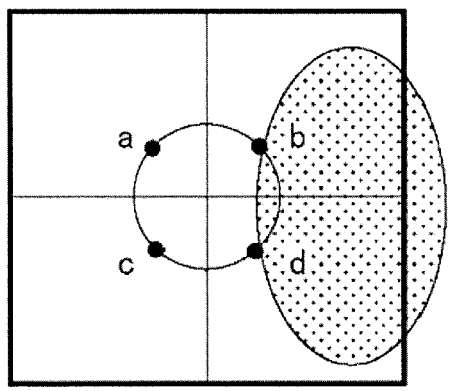

FIGS. 8A-8C are schematic views illustrating a misalignment of a transmitted light spot in a horizontal shift axis direction, according to an embodiment. FIG. 8A illustrates an embodiment in which the horizontal shift axis misalignment of the transmitted light spot is within an allowable range. FIGS. 8B and 8C illustrate embodiments in which the horizontal shift axis misalignment of the transmitted light spot exceeds a threshold and is not within an allowable range and is therefore inappropriate or abnormal.

For example, when the horizontal shift axis misalignment of the transmitted light spot is large, the transmitted light spot is deformed into an oval shape as if being compressed in one direction, and thus the transmitted light amount $\mathit{flt}$ detected by the transmitted light receiver 22 may relatively decrease.

When the horizontal shift axis misalignment of the transmitted light spot is accompanied by a Z-direction axis misalignment of the transmitted light spot, a sum lta+ltc of the transmitted light amounts lta and ltc detected by the detectors a and c on the left column among the four detectors a, b, c, and d of the transmitted light receiver 22 may be greatly different from a sum ltb+ltd of the transmitted light amounts ltb and ltd detected by the detectors b and d on the right column among the four detectors a, b, c, and d. On the other hand, when the horizontal shift axis misalignment (the Z-direction axis misalignment that accompanies the horizontal shift axis misalignment) is small, a difference between the sum lta+ltc of the transmitted light amounts lta and ltc detected by the detectors a and c on the left column and the sum ltb+ltd of the transmitted light amounts ltb and ltd detected by the detectors b and d on the right column may be relatively small.

Accordingly, as shown in Inequality (8) above, the output determiner determines whether the transmitted light amount $\mathit{flt}$ detected by the transmitted light receiver 22 is less than or equal to the preset angle determination threshold θth1.

When the transmitted light amount $\mathit{flt}$ detected by the transmitted light receiver 22 is less than or equal to the angle determination threshold θth1, the horizontal shift axis misalignment is large, and thus the printing paper sheet may be deformed. Accordingly, the output determiner calculates the sum lta+ltc of the transmitted light amounts lta and ltc detected by the detectors a and b on the left column and the sum ltb+ltd of the transmitted light amounts ltb and ltd detected by the detectors b and d on the right column. As shown in Inequality (10) below, when an absolute value of a difference between the sum lta+ltc and the sum ltb+ltd is greater than a preset horizontal shift determination threshold Xth1, the output determiner determines that the horizontal shift axis misalignment (the Z-direction axis misalignment that accompanies the horizontal axis misalignment) exceeds the threshold and is thus inappropriate, and determines that the data representing the transmitted light amount $\mathit{flt}$ output by the transmitted light receiver 22 is abnormal.

On the other hand, when the absolute value of the difference between the sum lta+ltc and the sum ltb+ltd is less than or equal to the horizontal shift determination threshold Xth1, the output determiner determines that the horizontal shift axis misalignment is within the allowable range and that the data representing the transmitted light amount $\mathit{flt}$ output by the transmitted light receiver 22 is normal.

$$|(lta+ltc)-(ltb+ltd)|>Xth1 \quad (10)$$

The horizontal shift determination threshold Xth1 may be set to be, for example, 50% of the transmitted light amount $\mathit{flt}$ detected by the transmitted light receiver 22.

FIGS. 8A-8C illustrate the embodiment in which the horizontal shift axis misalignment of the transmitted light spot is determined from the transmitted light amounts lta, ltb, ltc, and ltd detected by the four detectors a, b, c, and d that constitute the transmitted light receiver 22. However, similarly, a horizontal shift axis misalignment of a specularly or diffusively reflected light spot may be determined from the light receiving amounts detected by the four detectors a, b, c, and d that constitute the specularly reflected light receiver 23 or the diffusively reflected light receiver 24.

Discussed below is a determination of a X-θ direction shift axis misalignment of a spot.

Figure 9A:
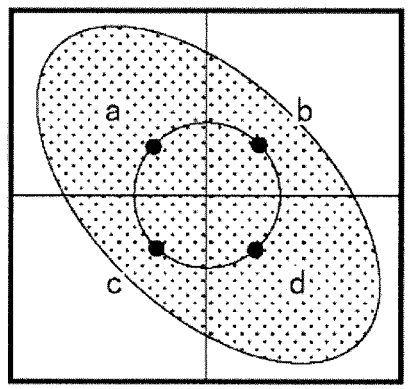
FIGS. 9A-9C are schematic views illustrating a misalignment of a spot of transmitted light, according to an embodiment.
Figure 9B:
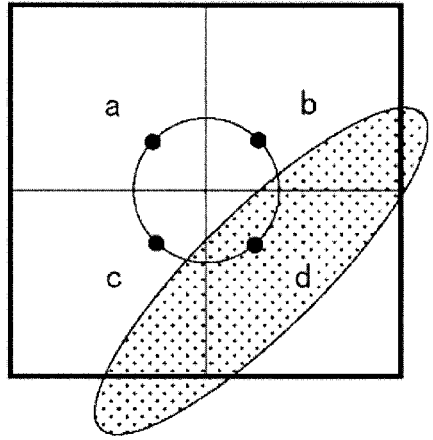
Figure 9C:
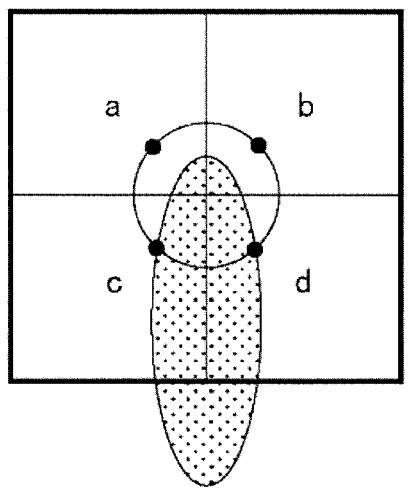

FIGS. 9A-9C are schematic views illustrating a misalignment of a transmitted light spot in an X-θ direction shift axis, according to an embodiment. FIG. 9A illustrates an embodiment in which the X-θ direction shift axis misalignment of the transmitted light spot is within an allowable range. FIGS. 9B and 9C illustrate embodiments in which the X-θ direction shift axis misalignment of the transmitted light spot exceeds a threshold and is not within an allowable range and is therefore inappropriate or abnormal.

For example, when the X-θ direction shift axis misalignment of the transmitted light spot is large, the transmitted light spot is deformed into an oval shape as if being compressed in one direction, and thus the transmitted light amount $\mathit{flt}$ detected by the transmitted light receiver 22 may decrease.

Due to the X-θ direction shift axis misalignment of the transmitted light spot, a sum lta+ltd of the transmitted light amounts lta and ltd detected by the detectors a and d on a diagonal line in one direction among the four detectors a, b, c, and d of the transmitted light receiver 22 may be greatly different from a sum ltb+ltc of the transmitted light amounts ltb and ltc detected by the detectors b and c on a diagonal line in the other direction among the four detectors a, b, c, and d. On the other hand, when the X-θ direction shift axis misalignment of the transmitted light spot is small, a difference between the sum lta+ltd of the transmitted light amounts lta and ltd detected by the detectors a and d and the sum ltb ltc of the transmitted light amounts ltb and ltc detected by the detectors b and c may relatively decrease.

Accordingly, as shown in Inequality (8) above, the output determiner determines whether the transmitted light amount $\mathit{flt}$ detected by the transmitted light receiver 22 is less than or equal to the preset angle determination threshold θth1.

When the transmitted light amount $\mathit{flt}$ detected by the transmitted light receiver 22 is less than or equal to the angle determination threshold θth1, the X-θ direction shift axis misalignment is large, and thus the printing paper sheet may be deformed. Accordingly, the output determiner calculates the sum lta ltd of the transmitted light amounts lta and ltd detected by the detectors a and d and the sum ltb+ltc of the transmitted light amounts ltb and ltc detected by the detectors b and c. As shown in Inequality (11) below, when an absolute value of a difference between the sum lta+ltd and the sum ltb+ltc is greater than a preset X-θ direction shift determination threshold Xθth1, the output determiner determines that the X-θ direction shift axis misalignment exceeds the threshold and is thus inappropriate, and determines that the data representing the transmitted light amount flt output by the transmitted light receiver 22 is abnormal.

On the other hand, when the absolute value of the difference between the sum lta+ltd and the sum ltb+ltc is less than or equal to the X-θ direction shift determination threshold Xθth1, the output determiner determines that the X-θ direction shift axis misalignment is within the allowable range of the threshold and that the data representing the transmitted light amount flt output by the transmitted light receiver 22 is normal.

$$|(lta+ltd)-(ltb+ltc)|>X\theta th1 \tag{11}$$

The X-θ direction shift determination threshold Xθth1 may be set to be, for example, 50% of the transmitted light amount flt detected by the transmitted light receiver 22.

FIGS. 9A-9C illustrate the embodiment in which the X-θ direction shift axis misalignment of the transmitted light spot is determined from the transmitted light amounts lta, ltb, ltc, and ltd detected by the four detectors a, b, c, and d that constitute the transmitted light receiver 22. However, similarly, a X-θ direction shift axis misalignment of a specularly or diffusively reflected light spot may be determined from the light receiving amounts detected by the four detectors a, b, c, and d that constitute the specularly reflected light receiver 23 or the diffusively reflected light receiver 24.

When an arrangement of the detectors a, b, c, and d is rotated by $\phi°$ about the origin, the y axis and the z axis may be re-set as $\phi°$-rotated axes, and various calculations may be performed as described above, and thus normality or abnormality of data may be determined.

An objective lens or a cylindrical lens may be arranged according to arrangement conditions of each detector, conditions, such as the light-receiving intensity of each detector, are corrected to be the same as those in the embodiment, and then various calculations are performed as described above. Thus, normality or abnormality of data may be determined.

The paper type determiner (micro-computer 13) may perform a type determination process of determining the type of the currently-being-conveyed printing paper sheet, by using only data determined to be normal by the output determiner from among the data output by the transmitted light receiver 22, the specularly reflected light receiver 23, and the diffusively reflected light receiver 24 included in the sensor 5.

For example, the paper type determiner performs the type determination process without using data determined to be abnormal by the output determiner, in order to increase the precision of the type determination process. Temporary storage of data for performing the type determination process (data representing each light receiving amount) may be storage of data except for the data determined to be abnormal, or may be storage of all data, including storing the data determined to be abnormal in correspondence with a flag indicating that the data is abnormal.

According to the embodiment, the micro-computer 13 may function as an abnormality determiner by executing various programs. When it is determined that the data representing each light receiving amount continuously has an error, the abnormality determiner determines that the sensor 5 is out of order or an error, such as a large misalignment of the installation location of the sensor 5 from its initial location, has occurred. When it is determined that the sensor 5 is abnormal, the abnormality determiner may indicate that the image forming apparatus is in an error state and may stop a printing process.

Whether the data representing each light receiving amount continuously has an error may be determined according to when it is determined that abnormality of data regarding a certain light receiving amount appears longer than a preset time period, when it is determined that abnormality of data regarding a certain light receiving amount appears more frequently than a preset frequency, or when it is determined that abnormality of data regarding a certain light receiving amount appears all the time.

Determination of the thickness of a printing paper sheet will now be illustrated as a type determination process and described below. The thickness of a printing paper sheet may be determined using the data representing the transmitted light amount flt output by the transmitted light receiver 22.

Figure 10:
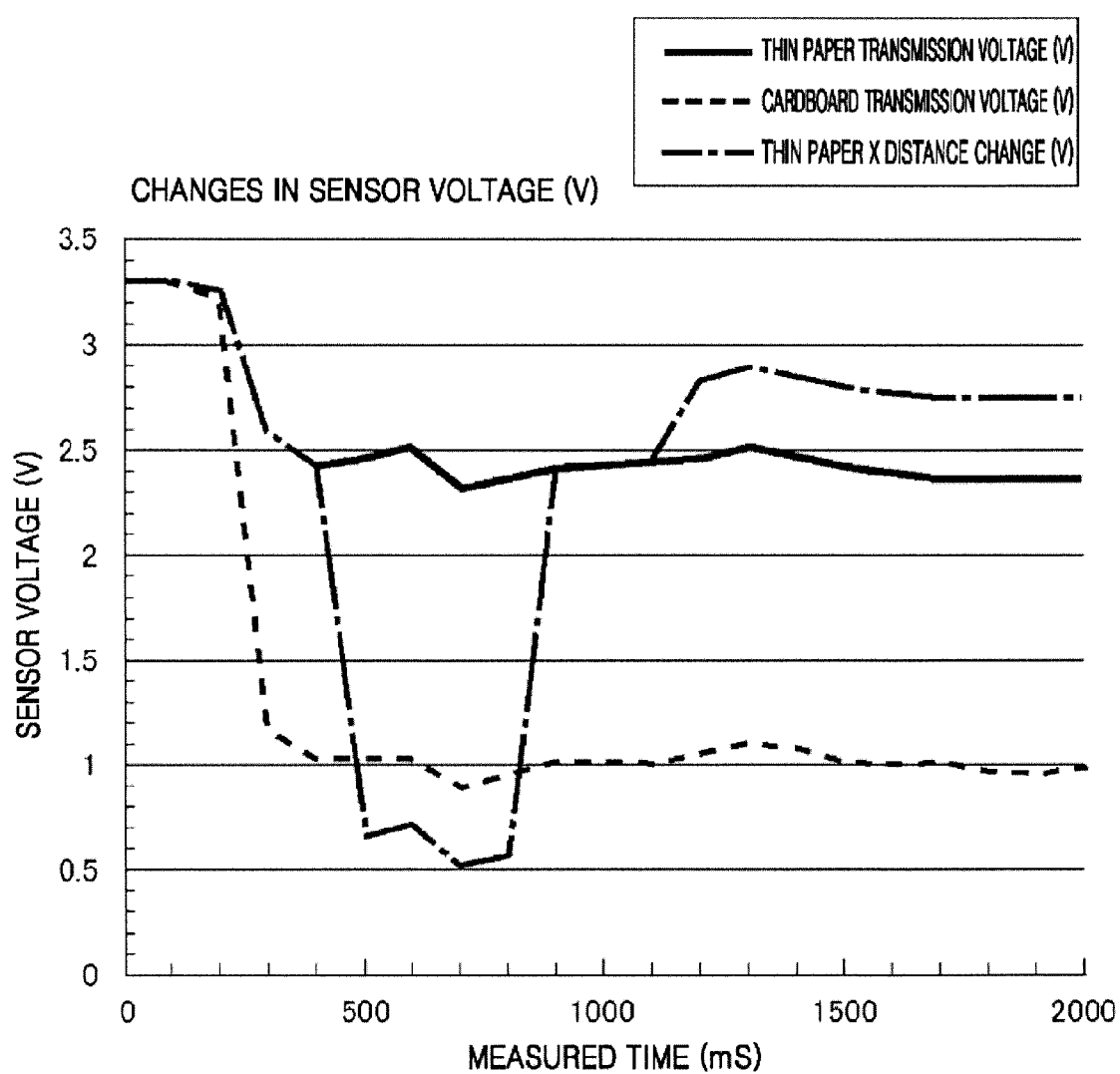
FIG. 10 is a graph showing a relationship between a sensor voltage (detection voltage) corresponding to a transmitted light amount detected by a transmitted light receiver and a thickness of a printing paper sheet, according to an embodiment.

FIG. 10 is a graph showing a relationship between a sensor voltage (detection voltage) corresponding to the transmitted light amount flt detected by the transmitted light receiver 22 and the thickness of a printing paper sheet, according to an embodiment.

Referring to FIG. 10, when a time of about 200 ms has passed after measurement of the sensor voltage begins, a leading end of the printing paper sheet reaches the sensor 5. Because a time point when the light emitted by the light emitter 21 is radiated onto the printing paper sheet is determined according to a time period taken for the leading end of the printing paper sheet to reach the sensor 5, a lower sensor voltage of the transmitted light receiver 22 is obtained after about 200 ms has lapsed than before about 200 ms passes.

In this case, a thick printing paper sheet transmits a small portion of the light emitted by the light emitter 21, and thus the sensor voltage of the transmitted light receiver 22 may be about 1 V, which is relatively small. The thick printing paper sheet will now be referred to as a cardboard.

On the other hand, a thin printing paper sheet transmits a large portion of the light emitted by the light emitter 21, and thus the sensor voltage of the transmitted light receiver 22 may be about 2.4 V, which is relatively large. The thin printing paper sheet will now be referred to as a thin paper sheet.

Accordingly, a sensor voltage of the transmitted light receiver 22 when a cardboard is conveyed and a sensor voltage of the transmitted light receiver 22 when a thin paper sheet is conveyed are previously input to the paper type determiner, the paper type determiner may compare the input sensor voltages with the sensor voltage corresponding to the transmitted light amount flt detected by the transmitted light receiver 22 to thereby determine the thickness of the currently-being-conveyed printing paper sheet.

However, as shown by a "thin paper X distance change (V)" in FIG. 10, when the printing paper sheet is close to or away from the transmitted light receiver 22 due to traveling non-uniformity of the printing paper sheet, the light receiving amount of light received by the transmitted light receiver 22 may be scattered, and thus the thickness of the printing paper sheet is unable to be properly determined.

In this connection, the image forming apparatus according to an embodiment is able to determine whether obtained data is abnormal data due to a change factor. Accordingly, by not using the abnormal data, the thickness of printing paper may be determined with high precision.

Figure 11:
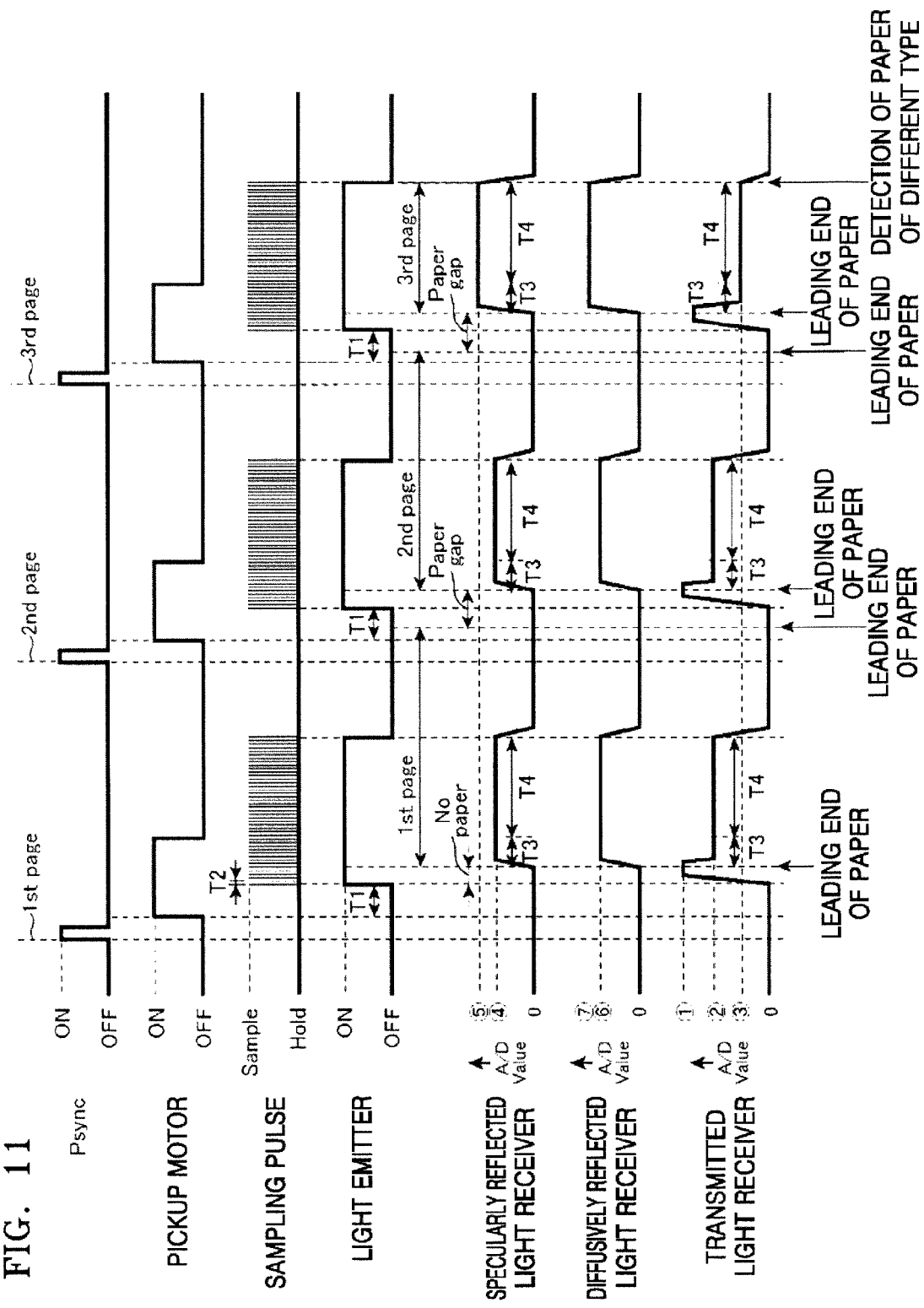
FIG. 11 is a graph showing sensing timings of a transmitted light receiver, a specularly reflected light receiver, and a diffusively reflected light receiver that constitute a sensor, according to an embodiment.

FIG. 11 is a graph showing sensing timings of the transmitted light receiver 22, the specularly reflected light receiver 23, and the diffusively reflected light receiver 24 that constitute the sensor 5, according to an embodiment.

In FIG. 11, a pickup motor drives the pickup roller 2, and, when a signal Psync instructing a driving start is ON, the pickup motor drives the pickup roller 2 to pick up a printing paper sheet from the paper tray 1.

When a time period T1 passes after rotation of the pickup roller 2 begins, the light emitter 21 emits light. The time period T1 may be set to be shorter than a time period required for the leading end of the printing paper sheet to reach the sensor 5.

The transmitted light receiver 22, the specularly reflected light receiver 23, and the diffusively reflected light receiver 24 detect light amounts while the light emitter 21 is emitting light.

The output determiner samples data representing the light amounts detected by the transmitted light receiver 22, the specularly reflected light receiver 23, and the diffusively reflected light receiver 24 at intervals of a time period T2 and determines whether the data is normal.

The paper type determiner determines the type of the currently-being-conveyed printing paper sheet, by using data determined to be normal by the output determiner. FIG. 11 illustrates an embodiment in which a different type of printing paper from a type that is previously set in the image forming apparatus is detected while the type of a third printing paper sheet is being determined.

As can be seen from the above description, according to an embodiment, since the output determiner is included to determine normality or abnormality of the data output by the transmitted light receiver 22, the specularly reflected light receiver 23, and the diffusively reflected light receiver 24 that constitute the sensor 5, the type of the currently-being-conveyed printing paper sheet or normality or abnormality of the sensor 5 may be determined using only data determined to be normal by the output determiner from among the data output by the transmitted light receiver 22, the specularly reflected light receiver 23, and the diffusively reflected light receiver 24. Accordingly, the possibility of mis-determining the type of printing paper may be reduced.

The sensor 5 according to an embodiment may include the transmitted light receiver 22, the specularly reflected light receiver 23, and the diffusively reflected light receiver 24, and the output determiner may determine whether the data representing the light receiving amounts detected by the transmitted light receiver 22, the specularly reflected light receiver 23, and the diffusively reflected light receiver 24 is normal. However, embodiments are not limited thereto, and the sensor 5 may include one or two light receivers among the transmitted light receiver 22, the specularly reflected light receiver 23, and the diffusively reflected light receiver 24, and the output determiner may determine whether data representing the light receiving amounts detected by one or two light receivers is normal.

According to an embodiment, each of the transmitted light receiver 22, the specularly reflected light receiver 23, and the diffusively reflected light receiver 24 may include four detectors, but embodiments are not limited thereto. For example, the number of detectors included in each light receiver may be at least two. However, when two detectors are included, only one-dimensional displacement may be measured with respect to a spot misalignment. When three detectors are included, a two-dimensional measurement is possible. Similar to the embodiment, when four detectors are arranged in a lattice shape, high-precision measurement may be performed.

According to an embodiment, each of the transmitted light receiver 22, the specularly reflected light receiver 23, and the diffusively reflected light receiver 24 may include four detectors, and the four detectors may be arranged in a lattice shape.

In this case, arrangement locations of the transmitted light receiver 22, the specularly reflected light receiver 23, and the diffusively reflected light receiver 24 may be the same as that shown in FIG. 2. However, before the specularly reflected light receiver 23 and the diffusively reflected light receiver 24 are actually installed, when a printing paper sheet is set at an appropriate location on the paper conveying path 4, the light emitter 21 may emit light and may previously measure a transmitted light spectrum distribution, a reflected light spectrum distribution, and a diffused light spectrum distribution around the locations at which the transmitted light receiver 22, the specularly reflected light receiver 23, and the diffusively reflected light receiver 24 are arranged.

Figure 12:
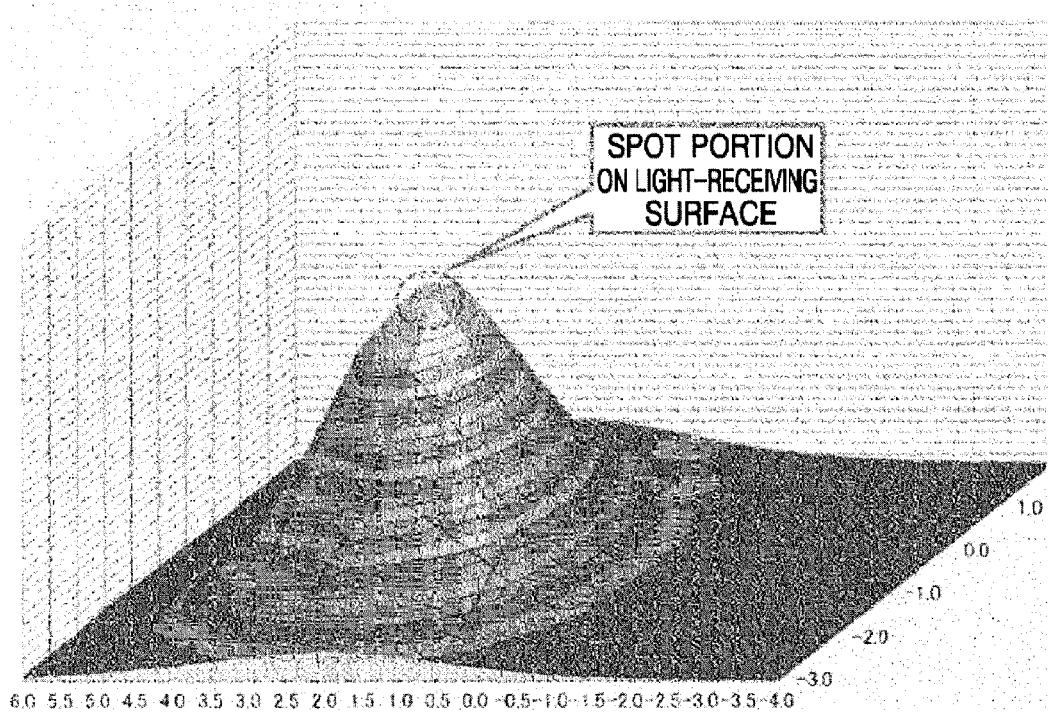
FIG. 12 is a graph showing an intensity distribution of a transmitted light spectrum according to an embodiment.

FIG. 12 is a graph showing an intensity distribution of a transmitted light spectrum according to an embodiment. A vertical axis of FIG. 12 indicates the light-receiving intensity of transmitted light. As the light-receiving intensity increases, a measurement result appears on an upper portion of the graph. A horizontal axis of FIG. 12 indicates a location distribution of a transmitted light spectrum.

FIG. 12 illustrates an embodiment where the wavelength of the light emitted by the light emitter 21 is around an infrared light wavelength band, for example, 930 nm.

Referring to FIG. 12, the transmitted light receiver 22 is disposed such that a location where the light-receiving intensity is highest, which is indicated by "a spot portion on a light-receiving surface", may be a center of the four detectors of the transmitted light receiver 22. Similarly, the specularly reflected light receiver 23 and the diffusively reflected light receiver 24 may be disposed such that a location where a light-receiving intensity is highest is a center of the four detectors of each of the specularly reflected light receiver 23 and the diffusively reflected light receiver 24.

However, in a layout of various components of the image forming apparatus, the transmitted light receiver 22, the specularly reflected light receiver 23, and the diffusively reflected light receiver 24 may not be disposed at the locations where the light-receiving intensities thereof are highest.

Accordingly, in a transmitted light spectrum distribution, a specularly reflected light spectrum distribution, and a diffusively reflected light spectrum distribution, when the transmitted light receiver 22, the specularly reflected light receiver 23, and the diffusively reflected light receiver 24 are disposed at locations where their light-receiving intensities are A %, not at the locations where their light-receiving intensities are highest, the light amounts detected by the transmitted light receiver 22, the specularly reflected light receiver 23, and the diffusively reflected light receiver 24 may be multiplied by 100/A and thus may be corrected.

Accordingly, even when the transmitted light receiver 22, the specularly reflected light receiver 23, and the diffusively reflected light receiver 24 are not disposed at the locations where their light-receiving intensities are highest, this case may be treated the same as the case where the transmitted light receiver 22, the specularly reflected light receiver 23, and the diffusively reflected light receiver 24 are disposed at the locations where their light-receiving intensities are highest.

This correction may be performed by the output determiner or by the transmitted light receiver 22, the specularly reflected light receiver 23, and the diffusively reflected light receiver 24. Alternatively, the correction may be performed by the paper type determiner.

This correction may increase the degree of freedom with respect to a design of the image forming apparatus.

In a second embodiment, each of the transmitted light receiver 22, the specularly reflected light receiver 23, and the diffusively reflected light receiver 24 included in the sensor 5 and arranged in a lattice shape is rotated by 45° with respect to the arrangement of the first embodiment.

Differences between the first and second embodiments in terms of determination of normality or abnormality of data will now be described.

Figure 28:
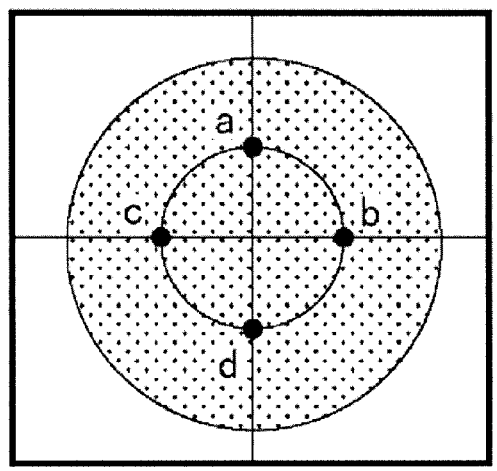
FIG. 28 is a schematic view illustrating a relationship between a location of a printing paper sheet with respect to the transmitted light receiver and a transmitted light amount of the transmitted light receiver, according to an embodiment.

FIG. 28 illustrates a transmitted light spot for the transmitted light receiver 22 rotated 45° with respect to the arrangement of the first embodiment.

Discussed below is a determination of normality or abnormality of data due to detection of a Z-axis misalignment of a spot.

As shown in Inequality (12) below, when an absolute value of a difference between an output value ltc of the detector c, namely, a detector on the left column, and an output value ltb of the detector b, namely, a detector on the right column, is less than or equal to the preset Z-axis determination minimum threshold Zthmin, the Z-axis misalignment of the transmitted light spot may be within the allowable range of the threshold, and thus the output determiner determines that the data representing the transmitted light amount flt output by the transmitted light receiver 22 is normal.

$$|ltc-ltb| \leq Zthmin \quad (12)$$

This determination is equally applied to the specularly reflected light receiver 23 or the diffusively reflected light receiver 24.

Discussed below is a determination of normality or abnormality of data due to detection of a Y-axis misalignment of a spot.

As shown in Inequality (13) below, when an absolute value of a difference between an output value lta of the detector a, namely, a detector on the upper side, and an output value ltd of the detector d, namely, a detector on the lower side, is less than or equal to the preset Y-axis determination minimum threshold Zthmin, the Y-axis misalignment of the transmitted light spot may be within the allowable range of the threshold, and thus the output determiner determines that the data representing the transmitted light amount flt output by the transmitted light receiver 22 is normal.

$$|lta-ltd| \leq Zthmin \quad (13)$$

This determination is equally applied to the specularly reflected light receiver 23 or the diffusively reflected light receiver 24.

Discussed below is a determination of normality or abnormality of data due to detection of a θ-direction and horizontal shift axis misalignments of a spot.

In above-described second embodiment, the same process as the first embodiment is performed by combining determination of normality or abnormality of data according to a sum of light amounts, determination of normality or abnormality of data due to detection of a Z-axis misalignment of a spot, and determination of normality or abnormality of data due to detection of a Y-axis misalignment of a spot, thereby performing the determination of normality or abnormality of data due to detections of a θ-shift axis misalignment and a horizontal shift axis misalignment of a spot.

With regard to the detection of the horizontal shift axis misalignment, data may be determined to be normal when the output value lta of the detector a and the output value ltd of the detector d are greater than the output value ltc of the detector c and the output value ltb of the detector b.

With regard to the detection of the θ-shift axis misalignment, data may be determined to be normal when the output value ltb of the detector b and the output value ltc of the detector c are greater than the output value lta of the detector a and the output value ltd of the detector d.

According to the second embodiment as described above, similar to the first embodiment, type determination of the printing paper being conveyed or determination of normality or abnormality of the sensor 5 may be performed using only the data determined to be normal by the output determiner. Accordingly, the possibility of mis-determining the type of printing paper may be reduced.

A third embodiment is different from the first embodiment in that each of the transmitted light receiver 22, the specularly reflected light receiver 23, and the diffusively reflected light receiver 24 included in the sensor 5 includes three detectors.

Differences between the first and third embodiments in terms of determination of normality or abnormality of data will now be described.

Figure 29:
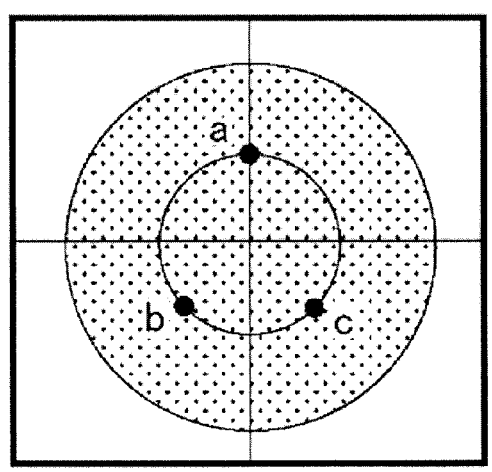
FIG. 29 is a schematic view illustrating a relationship between a location of a printing paper sheet with respect to the transmitted light receiver and a transmitted light amount of the transmitted light receiver, according to an embodiment.

FIG. 29 is a schematic view illustrating a transmitted light spot by a transmitted light receiver 22 including three detectors, according to the third embodiment.

Discussed below is a determination of normality or abnormality of data due to detection of a Z-axis misalignment of a spot.

A detector b is set as a detector arranged on the left column and a detector c is set as a detector arranged on the right column, and the same process as the first embodiment is performed, and thus determination of normality or abnormality of data due to detection of a Z-axis misalignment of a spot is performed.

Discussed below is a determination of normality or abnormality of data due to detection of a Y-axis misalignment of a spot.

A detector a is set as a detector arranged on the upper side, and the detectors b and c are set as a detector arranged on the lower side. In this case, an output value of the detector arranged on the lower side is an average value of the output values of the detectors b and c. Thereafter, the same process as the first embodiment is performed to thereby perform the determination of normality or abnormality of data due to detection of a Z-axis misalignment of a spot.

Discussed below is a determination of normality or abnormality of data due to detections of a θ-direction shift axis misalignment and a horizontal shift axis alignment of a spot.

In the above-described third embodiment, the same process as the first embodiment is performed by combining determination of normality or abnormality of data according to a sum of light amounts, determination of normality or abnormality of data due to detection of a Z-axis misalignment of a spot, and determination of normality or abnormality of data due to detection of a Y-axis misalignment of a spot, thereby performing the determination of normality or abnormality of data due to detections of a θ-shift axis misalignment and a horizontal shift axis alignment of a spot.

According to the third embodiment as described above, similar to the first embodiment, type determination of the currently-being-conveyed printing paper sheet or determination of normality or abnormality of the sensor 5 may be performed using only the data determined to be normal by the output determiner. Accordingly, the possibility of misdetermining the type of printing paper may be reduced.

Figure 13:
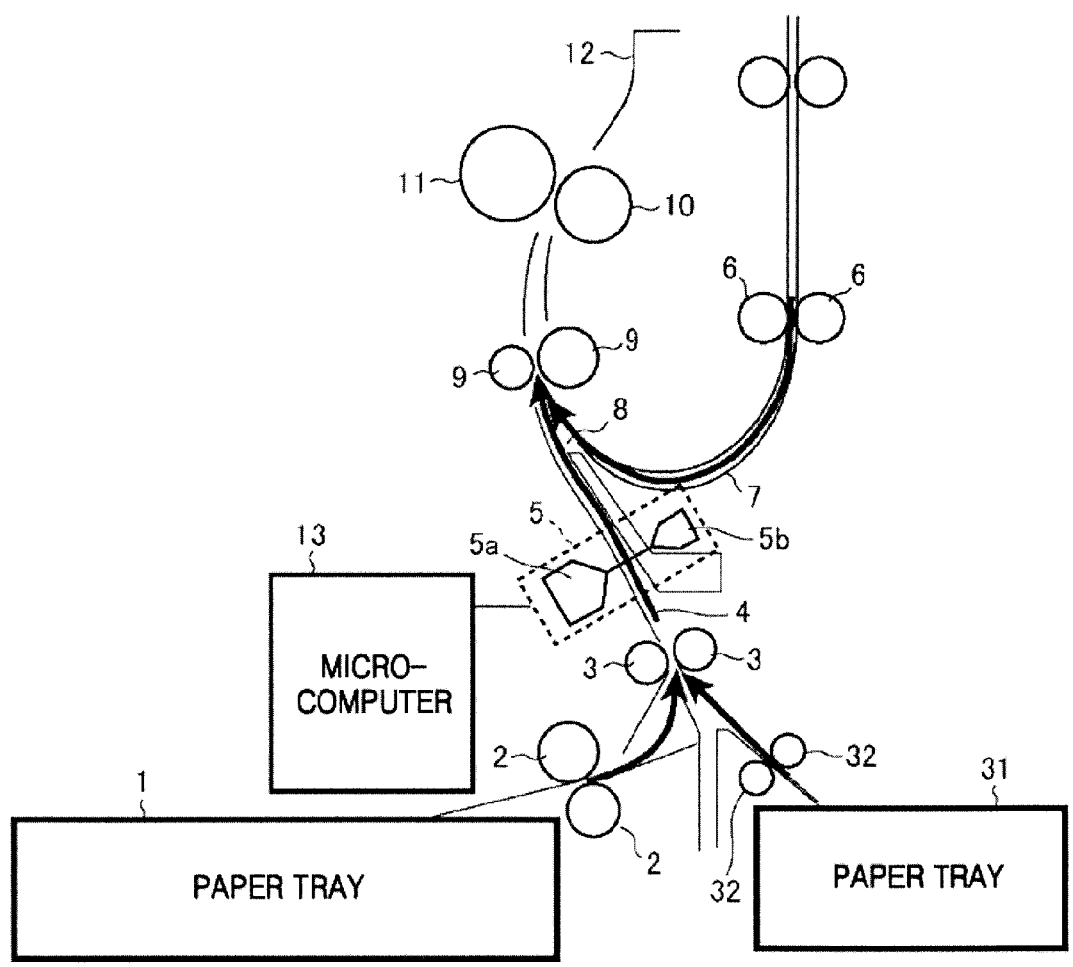
FIG. 13 is a schematic diagram of a portion of an image forming apparatus according to an embodiment.

FIG. 13 is a schematic view of an image forming apparatus according to a fourth embodiment. In FIG. 13, the same reference numerals as those in FIG. 1 (the first embodiment) denote elements that are the same as or correspond to as those in FIG. 1 (the first embodiment), and thus descriptions thereof will be omitted or simplified for convenience of explanation.

The image forming apparatus according to the fourth embodiment is able to determine double feeding of printing paper in advance.

A paper tray 31 may store printing paper and is different from the paper tray 1.

A pickup roller 32 picks up a printing paper sheet from the paper tray 31. In the fourth embodiment, the feeding roller 3 feeds the printing paper sheet picked up by the pickup roller 2 or the printing paper sheet picked up by the pickup roller 32 along the paper conveying path 4.

According to the embodiment, the micro-computer 13 may function as an abnormality determiner by executing various programs. As will be described later, when a time period during which the transmitted light amount detected by the transmitted light receiver 22 changes is greater than a preset transmitted light paper double-feeding determination threshold Thlt, the abnormality determiner may determine that double-feeding of the printing paper has occurred.

In the image forming apparatus, double feeding of printing paper may cause a difference in a printing location, a difference in the number of pages to be printed, and a destruction of the image forming apparatus due to passing of thicker printing paper than a preset thickness. Accordingly, when double feeding of printing paper occurs, a printing process needs to be paused or stopped. Two printing paper sheets corresponding to sheet double feeding will now be referred to as double-fed paper. Conventional sheet double-feeding detection techniques are as follows.

For example, Japanese Patent Application No. 1997-100048, describes a technique of measuring a length of a printing paper sheet and determining that sheet double-feeding has occurred when the measured length exceeds a preset sheet length.

Japanese Patent Application No. 2008-044754 describes a technique of providing a sensor for sensing the thickness of a printing paper sheet, setting a thickness of a first printing paper sheet sensed by the sensor as a reference thickness, and determining that sheet double-feeding has occurred when a second printing paper sheet and its subsequent paper sheets are thicker than the reference thickness.

Japanese Patent Application No. 2008-290810 describes a technique of providing a sensor for sensing the thickness of a printing paper sheet and determining that sheet double-feeding has occurred, when the thickness of the paper sheet sensed by the sensor is greater than a thickness set by a user.

Japanese Patent Application No. 1994-32496 describes a technique of providing a sensor for sensing the thickness of a printing paper sheet by using transmitted light and determining that sheet double-feeding has occurred, when the thickness of the paper sheet sensed by the sensor has changed.

However, in the technique described by Japanese Patent Application No. 1997-100048, sheet double-feeding cannot be detected until a trailing end of the printing paper sheet passes through a conveying path. Thus, for example, during double-sided printing, double-fed sheets may block a transfer path of a preceding paper sheet on which a second image is formed, and the preceding paper sheet may need to be discarded. In this case, printing paper is unnecessarily consumed or discarded, and thus a printing operator may not know from what page printing needs to be resumed, after sheet double-feeding is addressed. In addition, because of non-uniformity or the like of a sheet length, when sheet double-feeding having a small deviation occurs, the sheet double-feeding may not be detected.

In the technique described by Japanese Patent Application No. 2008-044754, even when sheet double-feeding occurs in the first printing paper sheet, the sheet double-feeding may not be detected.

In the technique described by Japanese Patent Application No. 2008-290810, when the thickness set by the user is erroneous, occurrence of sheet double-feeding may not be properly detected. In addition, because thickness setting by a user is required, when an automatic thickness determination function or the like is used to enable co-existence of various sheet thicknesses, occurrence of sheet double-feeding may not be detected.

In the technique described by Japanese Patent Application No. 1994-32496, when the deviation of sheet double-feeding is fine, occurrence of the sheet double-feeding may not be detected. Accordingly, a special mechanism needs to be provided to increase the deviation, and this mechanism addition causes an increase in costs or in the size of an image forming apparatus. Double-fed sheets and a reusable sheet may not be distinguished from each other. The reusable sheet denotes a paper sheet having one surface that has been printed on.

In the fourth embodiment, occurrence of sheet double-feeding may be detected from a leading end portion of currently-being-conveyed printing paper, and occurrence of sheet double-feeding may be detected from a leading printing paper sheet. Moreover, setting of a sheet thickness by a user is not necessary, and occurrence of sheet double-feeding may be detected even when sheet double-feeding having a fine deviation occurs.

As can be seen from FIG. 2, the light emitted by the light emitter 21 is directly received by the transmitted light receiver 22 when no printing paper sheets are conveyed, and thus the transmitted light amount detected by the transmitted light receiver 22 increases. However, while a printing paper sheet is being conveyed, the light received by the transmitted light receiver 22 decreases because of the light sensed by the printing paper, and thus the transmitted light amount detected by the transmitted light receiver 22 decreases.

Figure 14A:
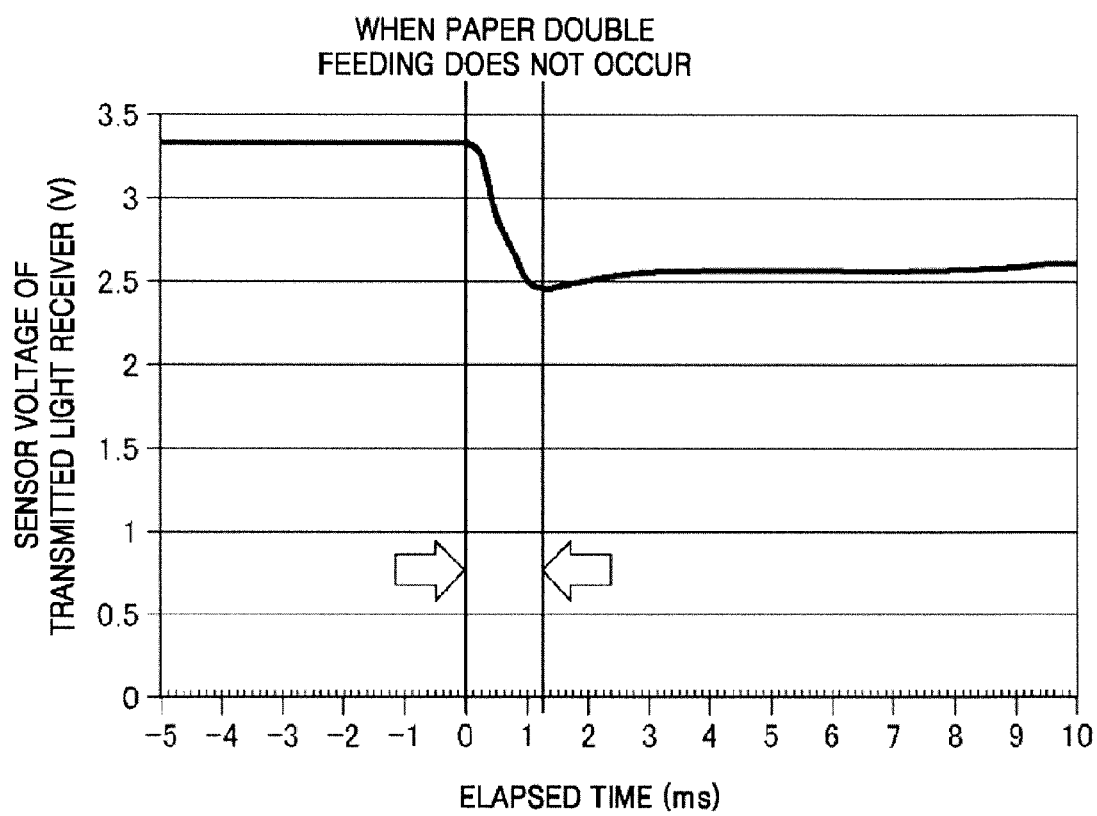
FIG. 14A is a graph showing a correlation between a detection voltage detected by a sensor and an elapsed time when double-feeding of printing paper does not occur, according to an embodiment.
Figure 14B:
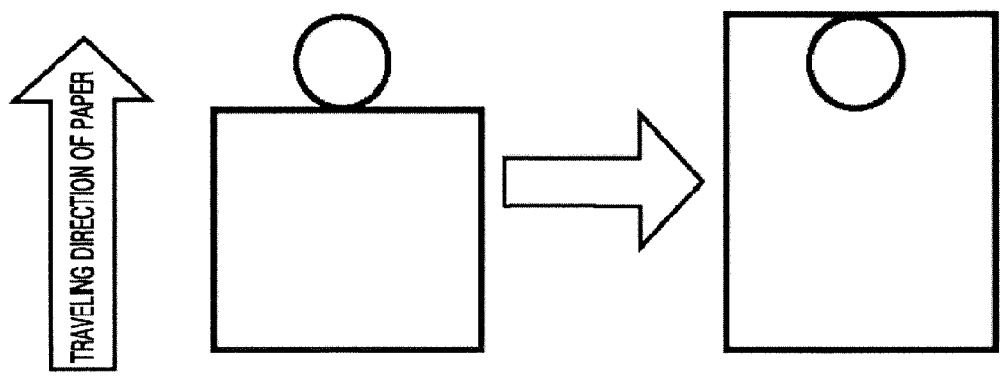
FIG. 14B is a schematic view illustrating a change of the light emitted by a light emitter and radiated to a printing paper sheet from a state where a spot of the radiated light does not contact the printing paper sheet to a state where the spot contacts the printing paper sheet, according to an embodiment.

FIG. 14A is a graph showing a correlation between a detection voltage detected by a sensor and an elapsed time when double-feeding of printing paper does not occur, according to an embodiment. FIG. 14B is a schematic view illustrating a change of the light emitted by the light emitter 21 and radiated to the printing paper sheet from a state where a spot of the radiated light does not contact the printing paper sheet to a state where the spot contacts the printing paper sheet, according to an embodiment. In FIG. 14B, a circle indicates the spot of the light emitted by the light emitter 21 and radiated to the printing paper sheet.

Referring to FIG. 14A, before a leading end portion of the printing paper sheet reaches the spot of the radiated light, namely, when the elapsed time as shown in the graph is a time period before "0", the spot of the radiated light does not contact the printing paper sheet, and thus the transmitted light amount detected by the transmitted light receiver 22 may be relatively large. For example, a sensor voltage of the transmitted light receiver 22 at this time may be about 3.3 V.

When the leading end portion of the printing paper sheet reaches the spot of the radiated light, an area of the spot of the radiated light that contacts the printing paper sheet may increase over time, and thus the transmitted light amount detected by the transmitted light receiver 22 may gradually decrease, and the sensor voltage of the transmitted light receiver 22 may decrease. For example, a sensor voltage of the transmitted light receiver 22 at this time may be about 2.6 V. As shown in FIG. 14A, a stable time period during which the spot of the radiated light does not contact the printing paper sheet, namely, a section of the elapsed time before 0 ms, is obtained. A changing time period during which the leading end portion of the printing paper sheet is caught by the spot of the radiated light, namely, a section of the elapsed time between 0 ms and 1.2 ms, is obtained. A stable time period during which the spot of the radiated light contacts the entire printing paper sheet, namely, a section of the elapsed time after 1.2 ms, is obtained. A change time period of a light receiving amount may be differently determined according to the size of the spot and a conveying speed of the printing paper sheet.

Figure 15A:
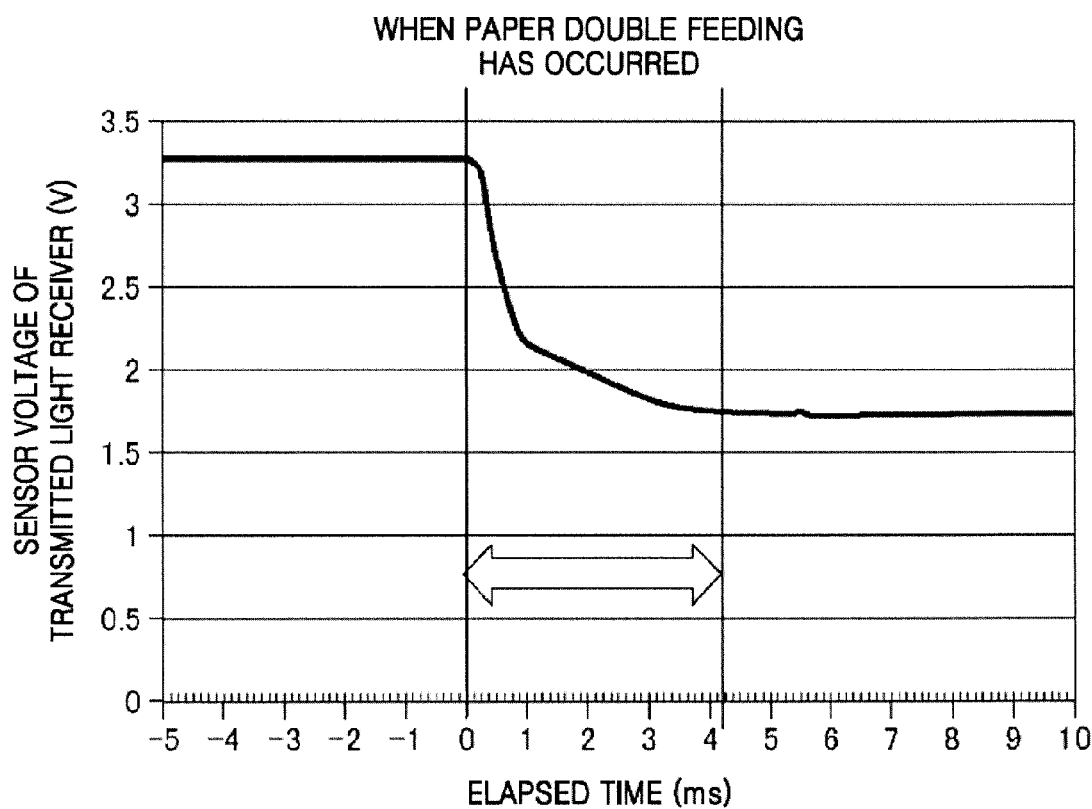
FIG. 15A is a graph showing a correlation between a detection voltage detected by a sensor and an elapsed time when double-feeding of printing paper has occurred, according to an embodiment.
Figure 15B:
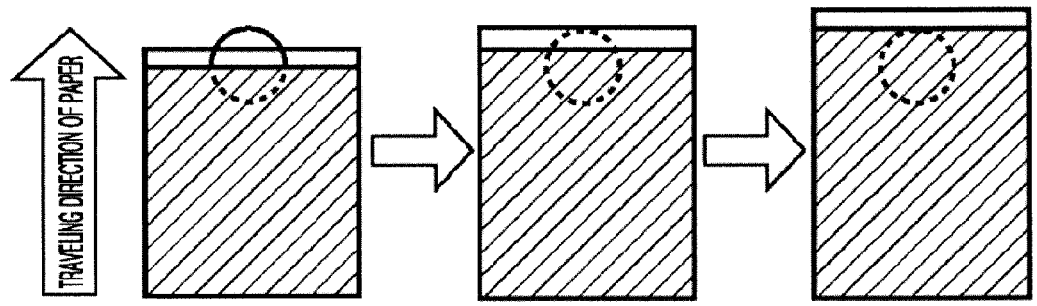
FIG. 15B is a schematic view illustrating a change in the location of light (spot of light) that is radiated to printing paper, according to an embodiment.

FIG. 15A is a graph showing a correlation between a detection voltage detected by a sensor and an elapsed time when double-feeding of printing paper has occurred, according to an embodiment. FIG. 15B is a schematic view illustrating a change in the location of light (spot) that is radiated to printing paper, according to an embodiment. In FIG. 15B, a hatched portion indicates a completely overlapping portion between a first printing paper sheet and a second printing paper sheet, and a white portion on the hatched portion indicates a portion of the first printing paper sheet that is not overlapped by the second printing paper sheet.

Referring to FIG. 15A, before a leading end portion of a printing paper sheet reaches the transmitted light receiver 22 (i.e., when the elapsed time as shown in the graph is a time period before "0"), the light (spot) emitted by the light emitter 21 does not contact the printing paper sheet, and thus the transmitted light amount detected by the transmitted light receiver 22 may be relatively large. For example, a sensor voltage of the transmitted light receiver 22 may be about 3.3 V.

When the leading end portion of the printing paper sheet reaches the spot of the radiated light, an area of the spot that contacts the printing paper sheet increases over time, and thus the transmitted light amount detected by the transmitted light receiver 22 may gradually decrease.

However, the white portion corresponding to the portion of the first printing paper sheet not overlapped by the second printing paper sheet has a thickness corresponding to the thickness of one printing paper sheet, whereas the hatched portion corresponding to the completely overlapping portion between the first and second printing paper sheets has a thickness corresponding to a sum of the thicknesses of two printing paper sheets.

Accordingly, in the case of double-fed paper in which the first printing paper sheet and the second printing paper sheet are misaligned with each other, similar to the case where double-feeding of printing paper has not occurred, the sensor voltage of the transmitted light receiver 22 decreases first. However, as the spot contacts the completely overlapping portion between the first and second printing paper sheets of the double-fed paper, the sensor voltage of the transmitted light receiver 22 further decreases to reach about 1.8 V.

Thus, in the case of double-fed paper in which the first printing paper sheet and the second printing paper sheet are misaligned with each other, compared with the case where double-feeding of printing paper has not occurred, the sensor voltage decreases over a long time period, and the sensor voltage is reduced to correspond to a thickness corresponding to two printing paper sheets. In other words, in the case of sheet double feeding in which the first and second printing paper sheets are misaligned with each other, a change time period of the sensor voltage is longer than in the case where double-feeding of printing paper has not occurred. In other words, sheet double feeding may be determined according to a change time period of the light receiving amount.

Accordingly, the abnormality determiner (micro-computer 13) observes the transmitted light amount detected by the transmitted light receiver 22 and calculates a time period T during which the transmitted light amount changes.

When the abnormality determiner observes the transmitted light amount detected by the transmitted light receiver 22, the abnormality determiner obtains the sensor voltage of the transmitted light receiver 22 at regular time intervals, and calculates the time period T during which the transmitted light amount changes. Thus, to detect paper double-feeding having a misalignment between the first and second printing paper sheets, the time interval for obtaining the sensor voltage, namely, an observing interval Ts of the transmitted light amount, needs to be set as "a time period that enables measurement of a minimum deviation that is to be detected".

A moving time period of the minimum deviation may be determined by a conveying speed v of printing paper, and a time period obtained by multiplying the moving time period of the minimum deviation by "½ as a sampling theory" and "over-sampling of ⅓ for noise measures" may be defined as the measuring interval Ts of the transmitted light amount.

Accordingly, the measuring interval Ts of the transmitted light amount is determined to satisfy Inequality 14 below.

[Inequality 3] (14)

$$T_s < (D_{min} \div v) \times \frac{1}{2} \times \frac{1}{3}$$

where Dmin is a preset value and indicates a minimum value of a deviation between paper sheets that may be generated during sheet double-feeding. For example, Dmin may be set to be one of 0 to 1 mm.

Until a fall of the sensor voltage of the transmitted light receiver 22 is completed, the abnormality determiner repeatedly obtains the transmitted light amount detected by the transmitted light receiver 22 at the measuring interval Ts, and calculates the change time period T of the transmitted light amount with respect to the leading end portion of the printing paper sheet.

When double feeding of printing paper has not occurred, as shown in FIG. 14A, a time period of about 1.2 ms is measured as the change time period T of the transmitted light amount with respect to the leading end portion of the printing paper.

On the other hand, when double feeding having a misalignment between two sheets has occurred, as shown in FIG. 15A, a time period of about 4.2 ms is measured as the change time period T of the transmitted light amount with respect to the leading end portion of the printing paper.

When the abnormality determiner measures the change time period T of the transmitted light amount at the leading end portion of the printing paper sheet, the abnormality determiner compares the measured change time period T with a preset transmitted light paper double-feeding determination threshold Thlt. When the change time period T is greater than the transmitted light paper double-feeding determination threshold Thlt, the abnormality determiner determines that double-feeding of the currently-being-conveyed printing paper is occurring.

On the other hand, when the change time period T is less than or equal to the transmitted light paper double-feeding determination threshold Thlt, the abnormality determiner determines that the currently-being conveyed printing paper is not double-fed.

Accordingly, the transmitted light paper double-feeding determination threshold Thlt may be set to be 1.2 ms<Thlt<4.2 ms, but embodiments are not limited thereto.

When the abnormality determiner determines that the currently-being conveyed printing paper is being double-fed, and preceding printing paper that is being conveyed prior to the currently-being conveyed printing paper is undergoing printing, the micro-computer 13 pauses the conveyance of the currently-being conveyed printing paper. After the preceding printing paper is completely printed and then completely discharged, the micro-computer 13 determines that an error has occurred to the image forming apparatus, and controls a paper conveying mechanism of the image forming apparatus to stop an on-going printing operation.

When no preceding printing paper exists, the micro-computer 13 immediately determines that an error has occurred to the image forming apparatus, and controls the paper conveying mechanism of the image forming apparatus to stop an on-going printing operation.

The paper conveying mechanism of the image forming apparatus may include the pickup rollers 2 and 32, the feeding roller 3, and the resist roller 9.

The abnormality determiner determines whether printing paper is being double-fed, by measuring the change time period T of the transmitted light amount. In other words, the abnormality determiner does not determine occurrence or non-occurrence of double feeding of printing paper by directly measuring the thickness of the printing paper. Thus, even when printing paper of which thickness is unclear is conveyed, the abnormality determiner may determine whether the printing paper is being double fed.

Since the change time period T of the transmitted light amount may be changed not only due to double feeding of printing paper but also due to an image already printed on the printing paper, the diameter of a spot may be adjusted so that a valid diameter of the light received by the transmitted light receiver 22 is less than a leading end margin of the printing paper that is a printing-impossible area of the printing paper.

When the spot diameter is too small, a consecutive change as shown in FIG. 15A does not occur, but a two-step change may occur. Thus, as shown in FIG. 15B, the diameter of light (spot) when the light (spot) contacts the printing paper may be set to be greater than a minimum value of a deviation between paper sheets that is generated when sheet double feeding occurs. When the spot diameter is less than the deviation between paper sheets and thus a change in the light receiving amount is represented in stages, paper double feeding according to a change time period of the light receiving amount may be determined according to respective change time periods of the change stages or according to an overall time period of the change stages. When the light emitter 21 includes a lens, the spot diameter may be adjusted by adjusting the diameter of the light emitted by the light emitter 21 by using the lens. When the light emitter 21 includes an aperture, a desired spot diameter may be obtained by adjusting the diameter of the aperture.

According to the fourth embodiment, the abnormality determiner determines whether current printing paper is being double-fed, from a change, over time, in the transmitted light amount detected by the transmitted light receiver 22. However, when the amount of the light emitted by the light emitter 21 is insufficient, namely, when the transmitted light may not be detected, the change time period T of the transmitted light amount during paper double feeding may not be measured. Thus, occurrence of paper double feeding may not be detected.

FIG. 16 is a graph showing a correlation between a sensor voltage and an elapsed time when paper double feeding, for example, double feeding of a cardboard, occurs when the amount of the light emitted by the light emitter 21 is insufficient, according to an embodiment.

When double feeding of printing paper occurs, the change time period T of the transmitted light amount $f_{lt}$ may be about 4.2 ms in the example of FIGS. 15A and 15B. However, when double-feeding of cardboard occurs, the amount of the light emitted by the light emitter 21 may be insufficient. In other words, in the case where the transmitted light may not be detected, as shown in FIG. 16, when about 1.8 ms has passed, the sensor voltage of the transmitted light receiver 22 is about 0V, and thereafter the change time period T of the transmitted light amount is unable to be measured.

Accordingly, the amount of the light emitted by the light emitter 21 may be adjusted so that the sensor voltage of the transmitted light receiver 22 is greater than 0V even when two printing paper sheets having the largest thicknesses among a plurality of printing paper sheets that may be used in the image forming apparatus are overlapped with each other.

When one printing paper sheet having the largest thickness is conveyed, the sensor voltage of the transmitted light receiver 22 may become greater than 0V, and thus an increase in the change time period T of the transmitted light amount during paper double feeding may be detected.

Alternatively, when one printing paper sheet having the largest thickness among a plurality of printing paper sheets that may be covered by the image forming apparatus of FIG. 13 is being conveyed, the amount of the light emitted by the light emitter 21 may be adjusted so that the sensor voltage of the transmitted light receiver 22 is greater than 0V. When the transmitted light amount detected by the transmitted light receiver 22 is less than or equal to transmitted light corresponding to the adjusted light amount (including the case where the transmitted light cannot be detected), it may be determined that the thickness of the printing paper sheet has an error.

As can be seen from the above, according to the fourth embodiment, when the change time period T of the transmitted light amount detected by the transmitted light receiver 22 is greater than the preset transmitted light paper double-feeding determination threshold Thlt, the abnormality determiner may determine that the currently-being-conveyed printing paper is being double-fed. Thus, occurrence of double feeding may be detected from the leading end portion of the currently-being-conveyed printing paper, and at the same time occurrence of double feeding may be detected from a first printing paper sheet. Moreover, setting of a sheet thickness by a user is not necessary, and, even when sheet double-feeding has a fine deviation, occurrence of sheet double-feeding may be detected.

In other words, detection of sheet double-feeding may be firmly and quickly performed without using a pre-registration of the thickness of printing paper, the number of print-outs, or the type of printing paper. Accordingly, a cost-effective image forming apparatus that obtains a printing result not having a deviation of a printing location or a misalignment and omission of pages, without discarding a leading paper sheet, may be provided.

Moreover, since the sensor 5 including the transmitted light receiver 22 is disposed in front of the meeting point 8 between the paper conveying path 4 and the reusable paper conveying path 7 (a second conveying path), occurrence of paper double feeding may be detected before the currently-being-conveyed printing paper reaches the meeting point 8.

Accordingly, when double feeding of the currently-being-conveyed printing paper has been detected, the image forming apparatus may stop the printing paper being conveyed along the paper conveying path 4 in front of the meeting point 8 and may send the printing paper on the reusable paper conveying path 7 to the resist roller 9 to thereby conduct printing with respect to the printing paper.

In this case, after the printing paper on the reusable paper conveying path 7 has been completed printing and is then discharged, the abnormality determiner recognizes the image forming apparatus in an error state. When the image forming apparatus is recognized in an error state, the user does not need to remove paper that is being double fed. In this case, when a mechanism that returns paper being double-fed back to the paper tray 1 or the paper tray 31 is included in the paper conveying mechanism of the image forming apparatus, the user does not need to remove the double-fed paper but the mechanism may automatically return the double-fed paper back to the paper tray 1 or the paper tray 31. In this case, the image forming apparatus may be automatically restored from the error state. When the image forming apparatus is restored from the error state, the image forming apparatus resumes printing from the page of the double-fed paper.

One or more of the first through third embodiments may be implemented simultaneously with the fourth embodiment.

In other words, since the micro-computer 13 according to the fourth embodiment functions as an output determiner, the micro-computer 13 may perform the above-described paper double feeding determination according to the fourth embodiment after removing abnormal data among the data representing the sensor voltage, namely, the light receiving amount, obtained by the transmitted light receiver 22.

Although the sensor 5 according to the embodiment is the same as that according to the first embodiment for simplification of explanation, when only the paper double feeding determination according to the fourth embodiment is performed, a specularly reflected light receiver or a diffusively reflected light receiver may be unnecessary, and, instead of a light receiver that includes a plurality of detectors, a single detector may be included.

In the fourth embodiment, when the change time period T1 of the transmitted light amount detected by the transmitted light receiver 22 is greater than the preset transmitted light paper double-feeding determination threshold Thlt, the abnormality determiner may determine that double-feeding of printing paper is occurring. In a fifth embodiment, when a change time period T1 of the specularly reflected light amount detected by the specularly reflected light receiver 23 is greater than a preset reflected-light paper double-feeding determination threshold Thlr, the abnormality determiner may determine that double-feeding of printing paper is occurring.

The image forming apparatus according to the fifth embodiment is the same as that of FIG. 13 (the fourth embodiment), and thus a description thereof will be omitted or simplified for convenience of explanation.

In the fifth embodiment, similar to the fourth embodiment, the micro-computer 13 functions as the abnormality determiner by performing various programs. Thus, when a change time period of the specularly reflected light amount detected by the specularly reflected light receiver 23 is greater than the preset reflected-light paper double-feeding determination threshold Thlr, the micro-computer 13 determines that double-feeding of printing paper is occurring.

As shown in FIG. 2, when no printing paper is conveyed, the light emitted by the light emitter 21 is not reflected by any printing paper and is accordingly not received by the specularly reflected light receiver 23. Thus, the reflected light amount detected by the specularly reflected light receiver 23 is 0. However, when a printing paper sheet is conveyed, the light emitted by the light emitter 21 is reflected by the printing paper, and thus the reflected light amount detected by the specularly reflected light receiver 23 increases.

Figure 17A:
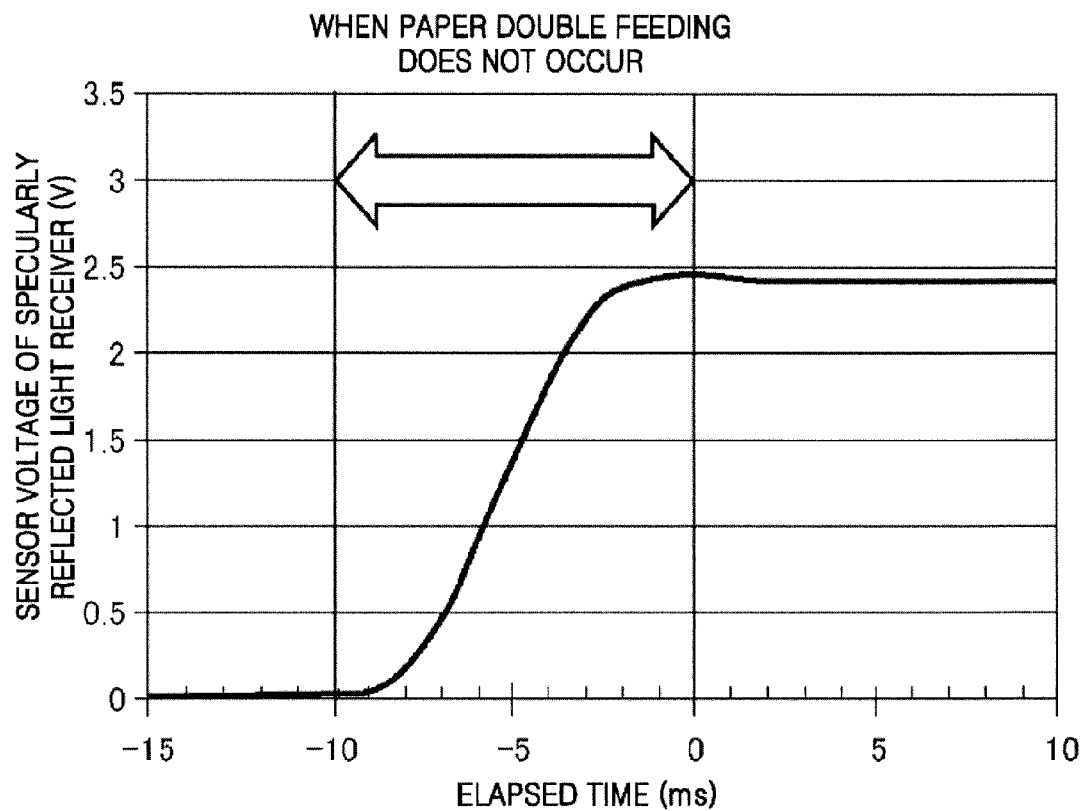
FIG. 17A is a graph showing a correlation between a sensor voltage (detection voltage) and an elapsed time when double-feeding of printing paper does not occur, according to an embodiment.
Figure 17B:
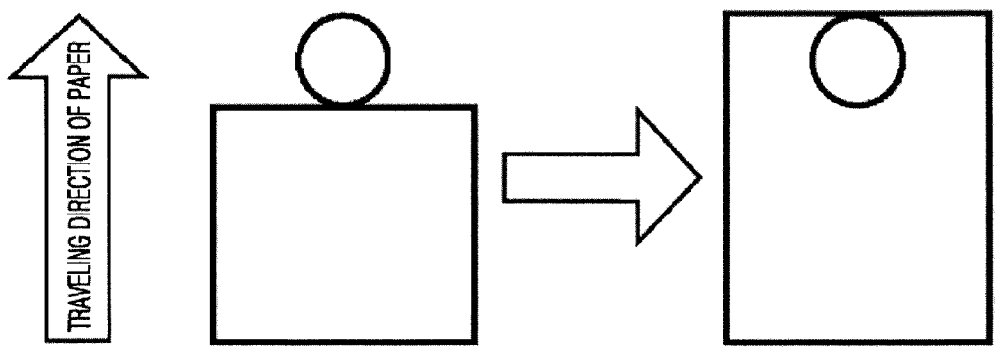
FIG. 17B is a schematic view illustrating a change of a spot of the light emitted by the light emitter and radiated to a printing paper sheet from a state where the spot of the radiated light does not contact the printing paper sheet to a state where the spot contacts the printing paper sheet, according to an embodiment.

FIG. 17A is a graph showing a correlation between a sensor voltage (detection voltage) corresponding to a reflected light amount detected by the specularly reflected light receiver 23 and an elapsed time when double-feeding of printing paper does not occur, according to an embodiment. FIG. 17B is a schematic view illustrating a change of a spot of the light emitted by the light emitter 21 and radiated to a printing paper sheet from a state where the spot of the radiated light does not contact the printing paper sheet to a state where the spot contacts the printing paper sheet, according to an embodiment. In FIG. 17B, a circle indicates the spot of the light emitted by the light emitter 21 and radiated to the printing paper sheet.

Referring to FIG. 17A, before a leading end of the printing paper sheet reaches the spot of the radiated light, namely, when the elapsed time as shown in the graph is a time period before "−10 ms", the spot of the emitted light does not contact the printing paper sheet, and thus the reflected light amount detected by the specularly reflected light receiver 23 is 0, and the sensor voltage of the specularly reflected light receiver 23 is 0V.

When the leading end of the printing paper sheet reaches the spot of the radiated light, an area of the spot of the radiated light that contacts the printing paper sheet increases over time. Thus, the reflected light amount detected by the specularly reflected light receiver 23 may gradually increase, and the sensor voltage of the specularly reflected light receiver 23 may accordingly increase. For example, the sensor voltage of the specularly reflected light receiver 23 may be increased up to about 2.4 V.

Figure 18A:
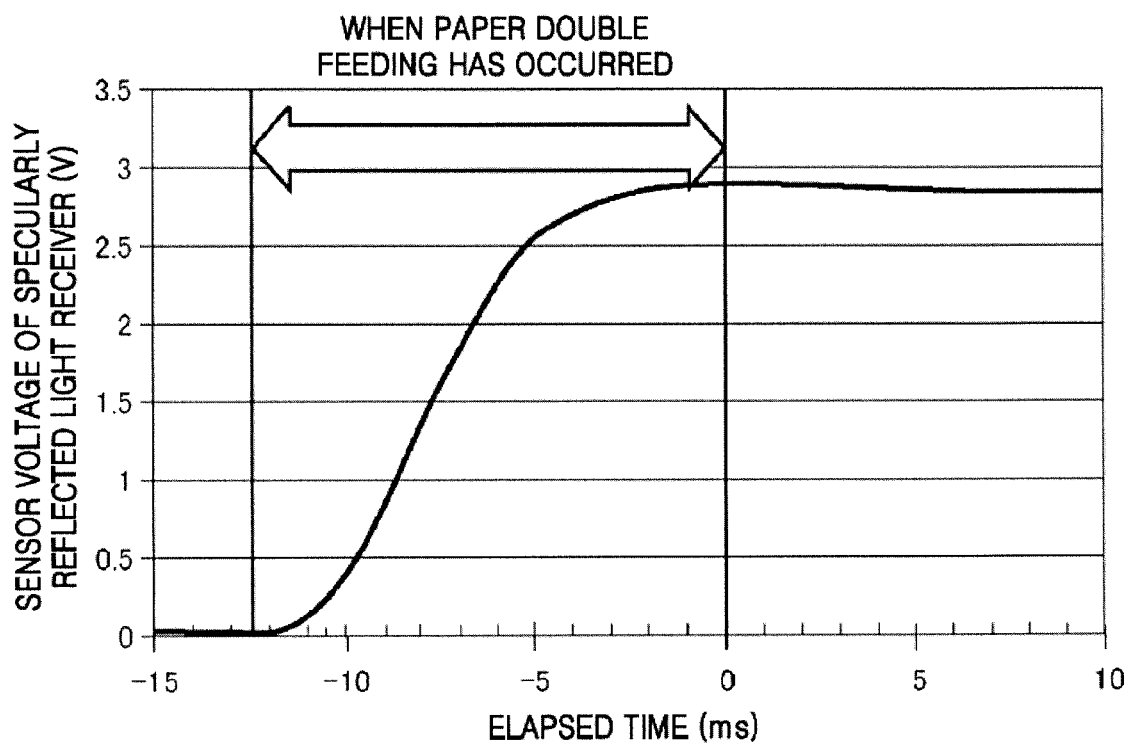
FIG. 18A is a graph showing a correlation between a detection voltage of a sensor and an elapsed time when double-feeding of printing paper has occurred, according to an embodiment.
Figure 18B:
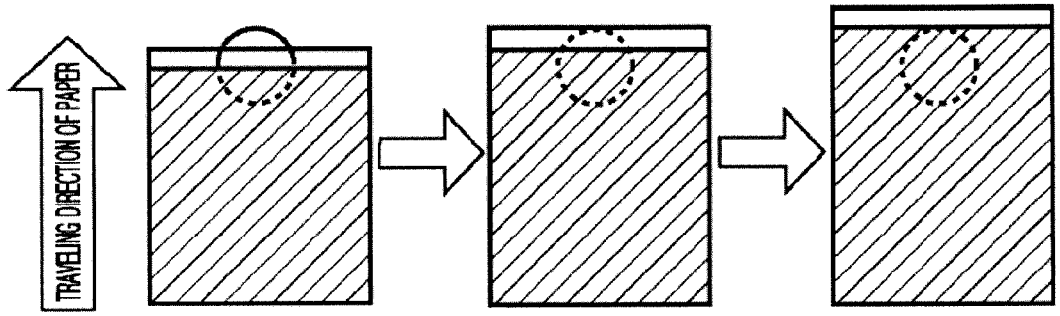
FIG. 18B is a schematic view illustrating a change in the location of a spot of light that is radiated to printing paper, according to an embodiment.

FIG. 18A is a graph showing a correlation between a sensor voltage (detection voltage) corresponding to a reflected light amount detected by the specularly reflected light receiver 23 and an elapsed time when double-feeding of printing paper has occurred, according to an embodiment. FIG. 18B is a schematic view illustrating a change in the location of a spot of light that is radiated to printing paper, according to an embodiment.

In FIG. 18B, a hatched portion indicates a completely overlapping portion between a first printing paper sheet and a second printing paper sheet, and a white portion on the hatched portion indicates a portion of the first printing paper sheet that is not overlapped by the second printing paper sheet.

Referring to FIG. 18A, before a leading end portion of the printing paper reaches the specularly reflected light receiver 23, namely, when the elapsed time is a time period before "−13.5 ms", the spot of the light emitted by the light emitter 21 and radiated to the printing paper does not contact the printing paper, and thus the reflected light amount detected by the specularly reflected light receiver 23 is 0 and the sensor voltage of the specularly reflected light receiver 23 is 0V.

When the leading end portion of the printing paper reaches the spot of the radiated light, an area of the spot of the radiated light that contacts the printing paper may increase over time, and thus light reflected by the printing paper may increase, and accordingly the reflected light amount detected by the specularly reflected light receiver 23 may gradually increase.

However, the white portion corresponding to the portion of the first printing paper sheet not overlapped by the second printing paper sheet has a thickness corresponding to the thickness of one printing paper sheet, whereas the hatched portion corresponding to the completely overlapping portion between the first and second printing paper sheets has a thickness corresponding to a sum of the thicknesses of two printing paper sheets.

Accordingly, in the case of paper double-feeding in which the first and second printing paper sheets are misaligned with each other, the sensor voltage of the transmitted light receiver 22 first increases, similar to the case where double-feeding of printing paper has not occurred. However, as the spot is caught by the overlapping portion between the first and second printing paper sheets, the sensor voltage of the specularly reflected light receiver 23 may further increase to reach about 2.8 V.

Thus, in the case of paper double-feeding in which the first and second printing paper sheets are misaligned with each other, compared with the case where double-feeding of printing paper has not occurred, the sensor voltage increases over a long time period, and the sensor voltage is increased to correspond to a thickness of two printing paper sheets. In other words, in the case of paper double feeding where two sheets are misaligned with each other, a change time period of the sensor voltage increases compared with the case where double-feeding of printing paper has not occurred.

Accordingly, the abnormality determiner (micro-computer 13) observes the reflected light amount detected by the specularly reflected light receiver 23 and measures a time period T during which the reflected light amount changes.

A measuring interval Ts of the reflected light amount may be set to be equal to the measuring interval Ts of the transmitted light amount according to the fourth embodiment.

Until the increase of the sensor voltage of the specularly reflected light receiver 23 is completed, the abnormality determiner repeatedly obtains the reflected light amount detected by the specularly reflected light receiver 23 at the measuring interval Ts, and measures the change time period T of the reflected light amount at the leading end portion of the printing paper.

When double feeding of printing paper has not occurred, as shown in FIG. 17A, the change time period T of the reflected light amount at the leading end portion of the printing paper was measured to be about 10 ms.

On the other hand, when double feeding in which paper sheets are misaligned with each other has occurred, as shown in FIG. 18A, the change time period T of the reflected light amount at the leading end portion of the printing paper was measured to be about 13.5 ms.

When the abnormality determiner measures the change time period T of the reflected light amount at the leading end portion of the printing paper, the abnormality determiner compares the measured change time period T with the preset reflected-light paper double-feeding determination threshold Thlr. When the change time period T is greater than the reflected light paper double-feeding determination threshold Thlr, the abnormality determiner determines that the printing paper is being double-fed.

On the other hand, when the change time period T is less than or equal to the reflected-light paper double-feeding determination threshold Thlt, the abnormality determiner determines that the printing paper is not double-fed.

Accordingly, in an embodiment as illustrated in FIGS. 17A and 18A, the reflected light paper double-feeding determination threshold Thlr may be set to be 10 ms<Thlr<13.5 ms, but embodiments are not limited thereto.

When the abnormality determiner determines that the currently-being-conveyed printing paper is being double-fed, the image forming apparatus may operate equally to the fourth embodiment, and adjustments of a spot diameter and a measuring interval may be the same as those according to the fourth embodiment. When the fifth embodiment is used together with the first embodiment, the micro-computer 13 may function as an output determiner, similar to the fourth embodiment.

As can be seen from the above description, according to the fifth embodiment, the same effect as that according to the fourth embodiment may be obtained.

The image forming apparatus according to a sixth embodiment has the same structure as that of FIG. 13 (the fourth embodiment), and thus a description thereof will be omitted or simplified for convenience of explanation.

According to the embodiment, the micro-computer 13 may function as an abnormality determiner by executing various programs. For example, when the micro-computer 13 functions as an abnormality determiner, the micro-computer 13 may monitor changes in the transmitted light amount and the reflected light amount and may determine whether the currently-being-conveyed printing paper is being double-fed from the monitored changes in the transmitted light amount and the reflected light amount.

Figure 19A:
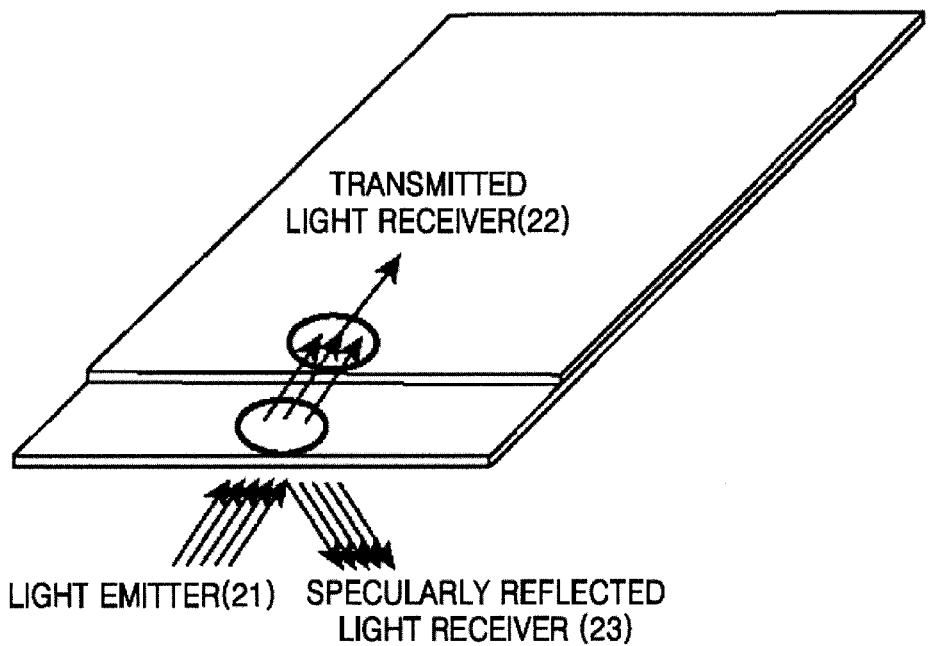
FIG. 19A is a schematic view illustrating a case where a deviation between two printing paper sheets in a double feeding state is greater than a valid diameter (spot diameter) of the light received by the transmitted light receiver, according to an embodiment.
Figure 19B:
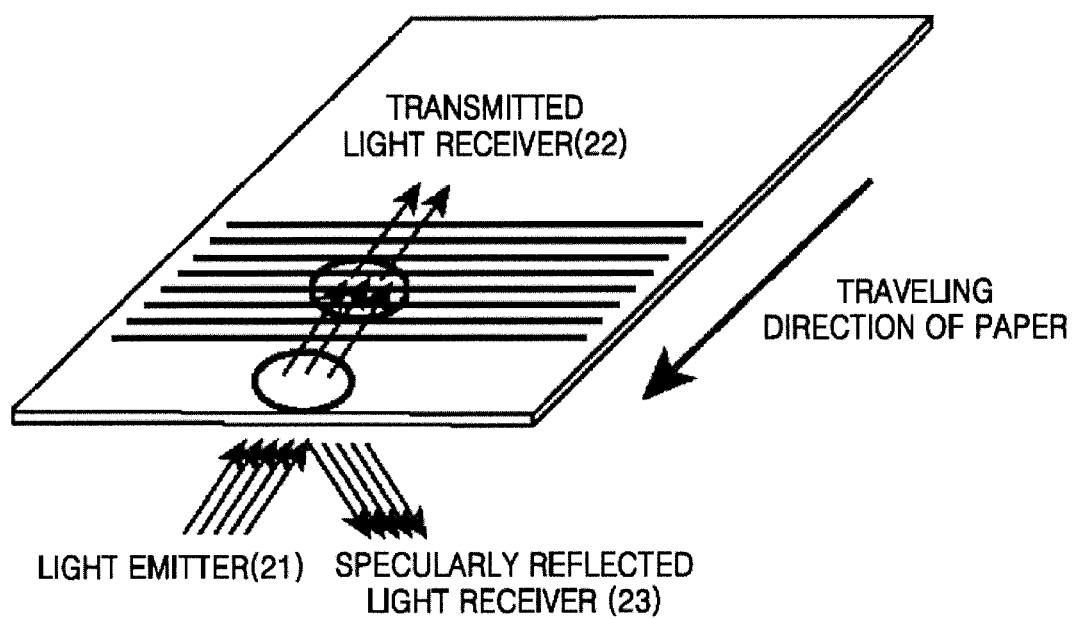
FIG. 19B is a schematic view illustrating a printing paper sheet having an image formed on a surface thereof that faces the transmitted light receiver, according to an embodiment.

FIG. 19A is a schematic view illustrating a case where a deviation between two printing paper sheets in a double feeding state is greater than a valid diameter (spot diameter) of the light received by the transmitted light receiver 22, according to an embodiment. FIG. 19B is a schematic view illustrating a printing paper sheet having an image formed on a surface thereof that faces the transmitted light receiver 22, according to an embodiment. In FIG. 19B, a horizontal-line portion is an image-formed portion.

Figure 20:
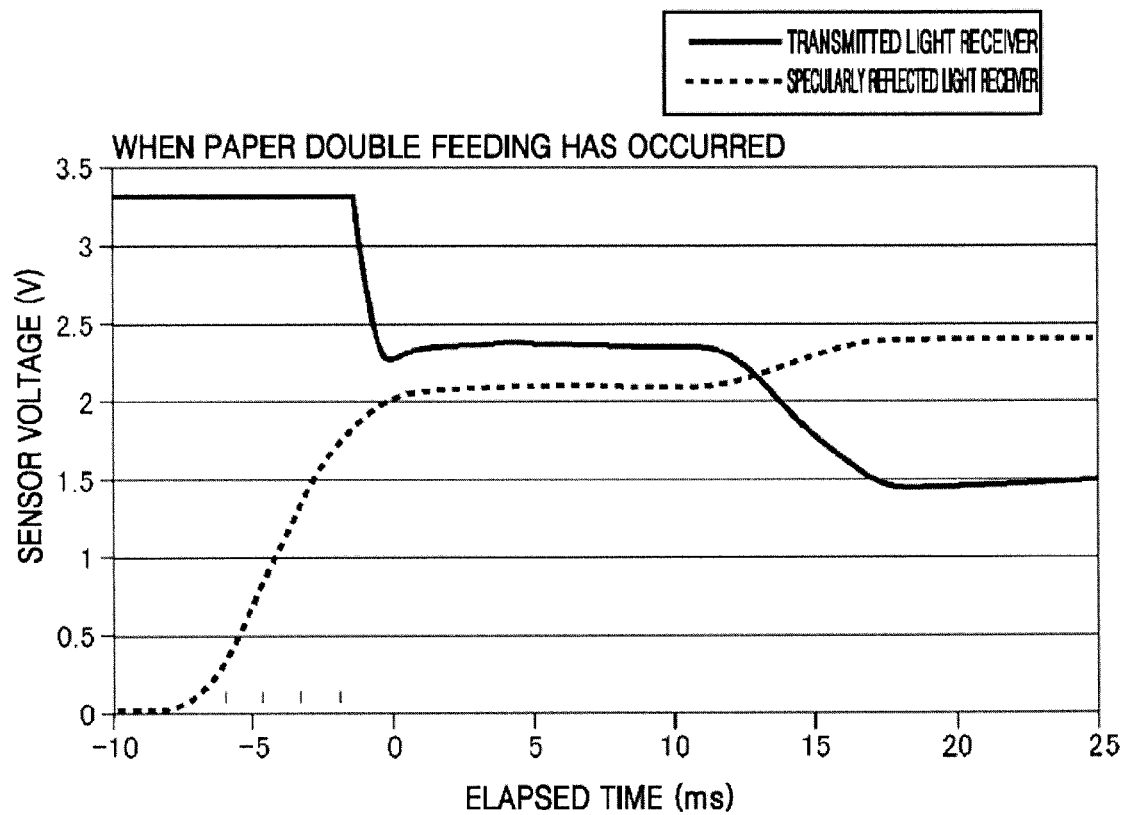
FIG. 20 is a graph showing a correlation between a detection voltage of a sensor and an elapsed time when double-feeding of printing paper has occurred, according to an embodiment.

FIG. 20 is a graph showing a correlation between detection voltages of a sensor respectively corresponding to a transmitted light amount detected by the transmitted light receiver 22 and a reflected light amount detected by the specularly reflected light receiver 23 and an elapsed time when double-feeding of printing paper has occurred, according to an embodiment.

Figure 21:
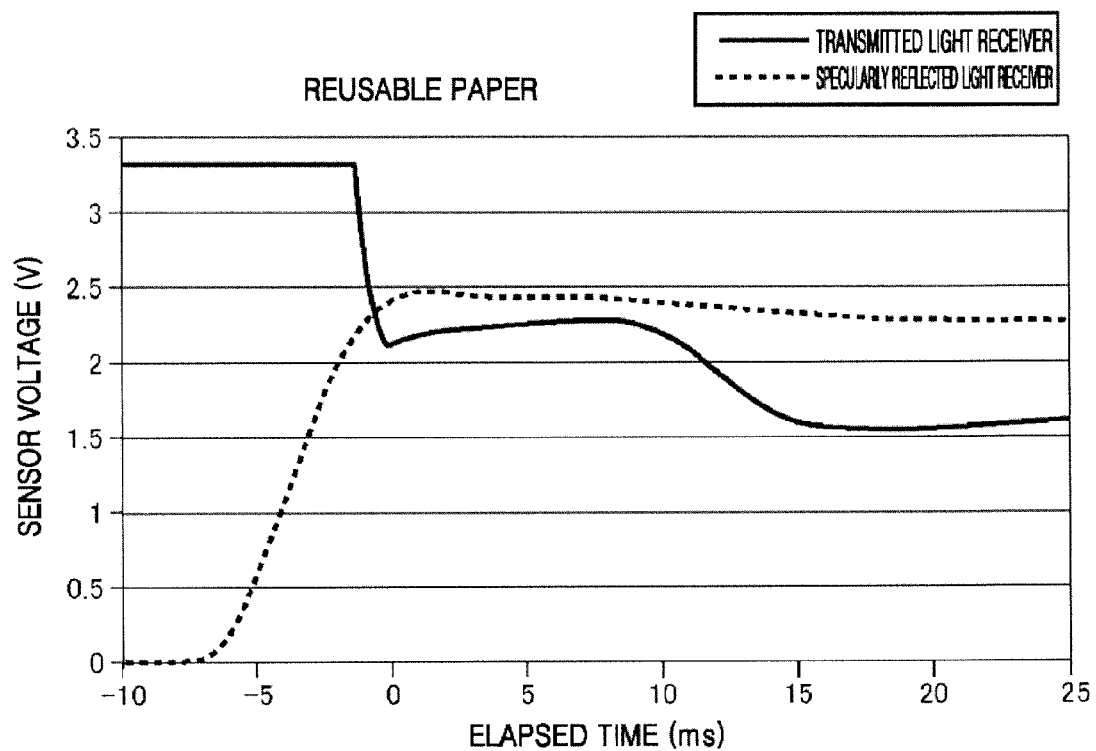
FIG. 21 is a graph showing a correlation between a detection voltage of a sensor and an elapsed time, when one sheet of reusable paper is conveyed, according to an embodiment.

FIG. 21 is a graph showing a correlation between detection voltages of a sensor respectively corresponding to a transmitted light amount detected by the transmitted light receiver 22 and a reflected light amount detected by the specularly reflected light receiver 23 and an elapsed time when one printing paper sheet having an image formed on a surface thereof that faces the transmitted light receiver 22, namely, a reusable paper sheet, is conveyed, according to an embodiment.

Referring to FIG. 19A, when paper double feeding in which two printing paper sheets are misaligned with each other has occurred, a deviation between the two printing paper sheets is greater than a valid diameter of a spot of the light emitted by the light emitter 21 and radiated to printing paper, and a leading end of the first printing paper sheet reaches the spot of the radiated light, the spot of the radiated light is decreased in a light amount by the first printing paper sheet. Thus, the transmitted light amount detected by the transmitted light receiver 22 may be reduced compared with before the leading end of the first printing paper sheet reaches the spot of the radiated light. For example, as shown in the graph of FIG. 20, the transmitted light amount is reduced from an elapsed time of about −2 ms.

Thereafter, when the second printing paper sheet reaches the spot of the radiated light, an area of the radiated spot that contacts the two overlapped printing paper sheets increases over time, and thus the transmitted light amount detected by the transmitted light receiver 22 may gradually decrease. For example, as shown in the graph of FIG. 20, the transmitted light amount is gradually reduced from an elapsed time of about 12 ms.

In the image forming apparatus of FIG. 13, a reusable paper sheet, which is a printing paper sheet having an image formed on one surface thereof, may be conveyed, and printing may be performed on a not-printed surface of the reusable paper sheet. For example, when a reusable paper sheet is conveyed, whether or not paper double feeding has occurred may not be determined only with the transmitted light.

As shown in FIG. 21, when a time period of about 9 ms has lapsed, the light emitted by the light emitter 21 is decreased at an image-forming location due to toner that forms an image, the transmitted light amount detected by the transmitted light receiver 22 may decrease.

As such, in some cases, a change in the transmitted light amount during paper double feeding in which two printing paper sheets are misaligned with each other may be greatly similar to a change in the transmitted light amount when a printing paper sheet has an image formed on one surface thereof. Accordingly, in some cases, occurrence or non-occurrence of paper double feeding may not be accurately determined by using only the change time period T of the transmitted light amount detected by the transmitted light receiver 22.

Thus, according to the sixth embodiment, not only a change in the transmitted light amount detected by the transmitted light receiver 22 but also a change in the reflected light amount detected by the specularly reflected light receiver 23 may be monitored, and double-fed paper and reusable printing paper may be distinguished from each other. This will now be described in more detail.

When the light emitted by the light emitter 21 has a high transmittance like infrared light and, as shown in FIG. 20, two printing paper sheets are being double-fed, the reflected light amount detected the specularly reflected light receiver 23 may also increase.

When a reusable printing paper sheet having no images on a surface thereof that faces the light emitter 21, namely, having an image on only a surface thereof that faces the transmitted light receiver 22, is being conveyed, even when the light emitted by the light emitter 21 contacts a location on the image-formed surface, the reflected light amount detected by the specularly reflected light receiver 23 rarely changes, as shown in FIG. 21.

When the transmitted light amount detected by the transmitted light receiver 22 decreases as the leading end of the printing paper reaches the spot of the radiated light, and then the transmitted light amount detected by the transmitted light receiver 22 decreases again, the abnormality determiner (micro-computer 13) checks a change in the reflected light amount detected by the specularly reflected light receiver 23.

In other words, when the transmitted light amount detected by the transmitted light receiver 22 decreases and then the transmitted light amount detected by the transmitted light receiver 22 decreases again, namely, when the transmitted light amount detected by the transmitted light receiver 22 decreases by more than a preset threshold corresponding to a variation in the transmitted light amount that is as much as one paper sheet, the abnormality determiner (micro-computer 13) checks a change in the reflected light amount detected by the specularly reflected light receiver 23.

When the transmitted light amount detected by the transmitted light receiver 22 has decreased by more than the preset threshold corresponding to the variation in the transmitted light amount that is as much as one paper sheet, the abnormality determiner checks whether the reflected light amount detected by the specularly reflected light receiver 23 increases by more than a preset threshold, namely, a threshold corresponding to a variation in the reflected light amount that is as much as one paper sheet.

When the increase in the reflected light amount detected by the specularly reflected light receiver 23 has exceeded the preset threshold, the abnormality determiner determines that the currently-being-conveyed printing paper is being double-fed. When the increase in the reflected light amount detected by the specularly reflected light receiver 23 is less than or equal to the preset threshold, the abnormality determiner determines that a reusable paper sheet, namely, a printing paper sheet having an image on a surface thereof that faces the transmitted light receiver 22, is being conveyed.

When the abnormality determiner determines that a reusable paper sheet is being conveyed, a current image forming operation proceeds.

When the abnormality determiner determines that the currently-being-conveyed printing paper is being double-fed, the abnormality determiner stops conveying the currently-being-conveyed printing paper. When a preceding printing paper that undergoes printing does not exist, the abnormality determiner processes the image forming apparatus as being in an error state. The preceding printing paper that undergoes printing will now be referred to as a preceding paper sheet.

On the other hand, when a preceding paper sheet exists, the abnormality determiner detects a leading end of the currently-being-conveyed printing paper and then estimates a location of the leading end of the printing paper from a time period until the printing paper is stopped and a conveying speed of the printing paper.

The abnormality determiner determines whether the currently-being-conveyed printing paper disturbs a conveying path of the leading paper sheet, according to the estimated location. When the abnormality determiner determines that the currently-being-conveyed printing paper does not disturb the conveying path of the leading paper sheet, the leading paper sheet is completely printed and then discharged, and then the abnormality determiner processes the image forming apparatus as being in an error state.

When the abnormality determiner determines that the currently-being-conveyed printing paper disturbs the conveying path of the leading paper sheet, the abnormality determiner immediately processes the image forming apparatus as being in an error state.

When the image forming apparatus is processed as being in an error state, the user needs to remove the paper that is being double fed. According to an embodiment, when a mechanism that returns the paper currently being double-fed back to the paper tray 1 or the paper tray 31 is included in the paper conveying mechanism of the image forming apparatus, the user does not need to remove the double-fed paper but the mechanism that returns the paper currently being double-fed back to the paper tray 1 or the paper tray 31 may automatically return the double-fed paper back to the paper tray 1 or the paper tray 31. In this case, the image forming apparatus may be automatically restored from the error state to a normal state. When the image forming apparatus is restored from the error state to the normal state, the image forming apparatus resumes printing from the page of the double-fed printing paper.

As can be seen from the above description, according to the sixth embodiment, since the abnormality determiner is able to determine whether the currently-being-conveyed printing paper is being double-fed from the change in the transmitted light amount detected by the transmitted light receiver 22 and the change in the reflected light amount detected by the specularly reflected light receiver 23, even when reusable paper is used as the printing paper, the abnormality determiner may accurately detect occurrence or non-occurrence of double feeding.

Moreover, according to the sixth embodiment, since the abnormality determiner is able to detect paper double-feeding at the timing when an overlapped portion of the double-fed paper reaches the installation location of the sensor 5, passing of the double-fed paper may be minimized, and consequently, destruction of an apparatus when paper having an abnormal thickness is conveyed may be prevented.

In addition, since reusable paper and double-fed paper may be distinguished from each other with high precision, mis-determination with respect to paper double feeding due to erroneous setting of a printing paper type may be prevented, and accordingly, normal image formation may be provided within the shortest time.

To secure a gradational change as shown in FIGS. 20 and 21, a lens is mounted on the light emitter 21 and adjusts the spot diameter of the light emitted by the light emitter 21 and radiated to printing paper. Accordingly, as shown in FIG. 19A, a spot diameter when a spot contacts the printing paper may be less than a minimum value of a deviation between two paper sheets that is generated during paper double feeding. In addition, by mounting an aperture on the light emitter 21 and setting the diameter of the aperture such that a desired spot diameter is obtained, the spot diameter when the spot contacts the printing paper may be less than the minimum value of the deviation between two paper sheets that is generated during paper double feeding. According to the embodiment, double-fed paper and reusable paper may be distinguished from each other according to whether the increase in the reflected light amount detected by the specularly reflected light receiver 23 exceeds the preset threshold corresponding to the variation in the reflected light amount that is as much as one paper sheet. However, instead that the reflected light amount is compared with a threshold by using a gradational change in the reflected light amount as shown in FIGS. 20 and 21, the distinguishment may be made based on only a timing of a change in the reflected light amount. In other words, when a reduction in the transmitted light amount occurs in two stages and an increase in reflected light is detected at a second reduction in the transmitted light amount, the abnormality determiner determines that the currently-being-conveyed printing paper is being double-fed. On the other hand, when no increases in the reflected light are detected, the abnormality determiner determines that reusable paper is being conveyed.

One or more of the first through third embodiments may be implemented simultaneously with the sixth embodiment. In other words, the micro-computer 13 may further include an output determiner in addition to the abnormality determiner, and thus the output determiner may remove abnormal data from the data obtained by the transmitted light receiver 22 or the specularly reflected light receiver 23 and then perform the determination of the sixth embodiment.

An image forming apparatus according to a seventh embodiment has the same structure as that of FIG. 13 (the fourth embodiment), and thus a description thereof will be omitted or simplified for convenience of explanation.

According to the embodiment, the micro-computer 13 may function as an abnormality determiner by executing various programs. For example, when the micro-computer 13 functions as an abnormality determiner, the micro-computer 13 may monitor changes in the transmitted light amount and the reflected light amount and may determine whether an image has already been formed on a printing surface of the currently-being-conveyed printing paper from the monitored changes in the transmitted light amount and the reflected light amount. In the image forming apparatus of FIG. 13, the printing paper sheet picked up by the pickup roller 2 from the paper tray 1 is conveyed to the feeding roller 3, and the printing paper sheet picked up by the pickup roller 32 from the paper tray 31 is conveyed to the feeding roller 3.

The printing paper sheets conveyed to the feeding roller 3 are conveyed to the image forming conveyer 12, which is an image transferring location, by the feeding roller 3 and the resist roller 9, and an image is formed on the printing paper sheets.

A printing surface on which an image is formed has an upper surface which is a printing paper sheet stored in the paper tray 1, and a lower surface which is a printing paper sheet stored in the paper tray 31.

When an operator who performs printing uses a paper sheet having one surface that has been printed on, the operator needs to set printing paper in each of the paper trays 1 and 31 such that a surface of the printing paper on which an image is formed is a not-printed surface.

In addition, the operator needs to prevent a paper sheet that has been double-sided printed from entering the paper trays 1 and 31. When the operator wrongly disposes a printing paper set surface or mixes a paper sheet that has been double-sided printed with the paper sheets stored in the paper trays 1 and 31, or when the operator instructs to perform double-sided printing on reusable paper by mistake, conventional image forming apparatuses do not obtain a correct printing result even when a printing operation is properly completed.

Accordingly, in the seventh embodiment, the micro-computer 13 may determine whether an image has already been formed on the printing surface of printing paper.

Figure 22:
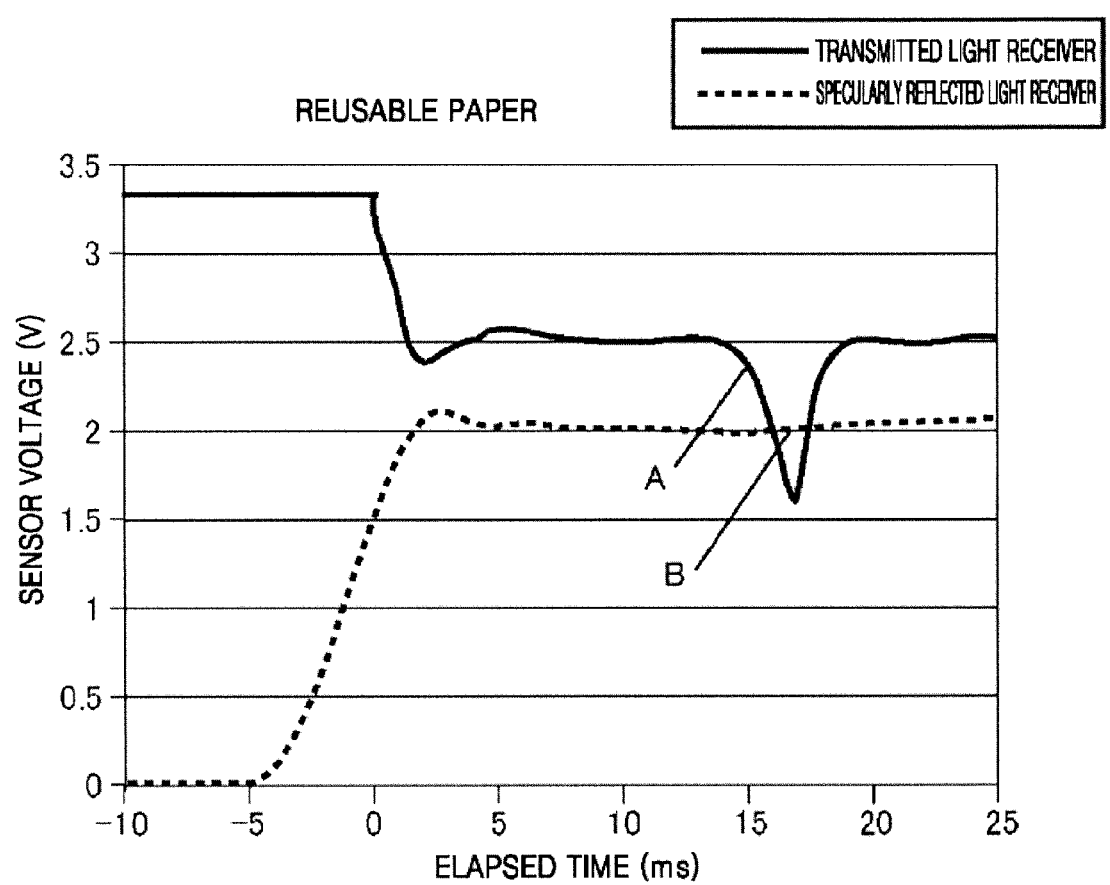
FIG. 22 is a graph showing a correlation between a detection voltage of a sensor and an elapsed time, when one surface and the other surface of reusable paper are properly arranged and set in a paper tray, according to an embodiment.

FIG. 22 is a graph showing a correlation between sensor voltages (detection voltages) respectively corresponding to a transmitted light amount detected by the transmitted light receiver 22 and a reflected light amount detected by the specularly reflected light receiver 23 and an elapsed time when one surface and the other surface of reusable paper are properly disposed and are set in the paper trays 1 and 31, according to an embodiment.

Figure 23:
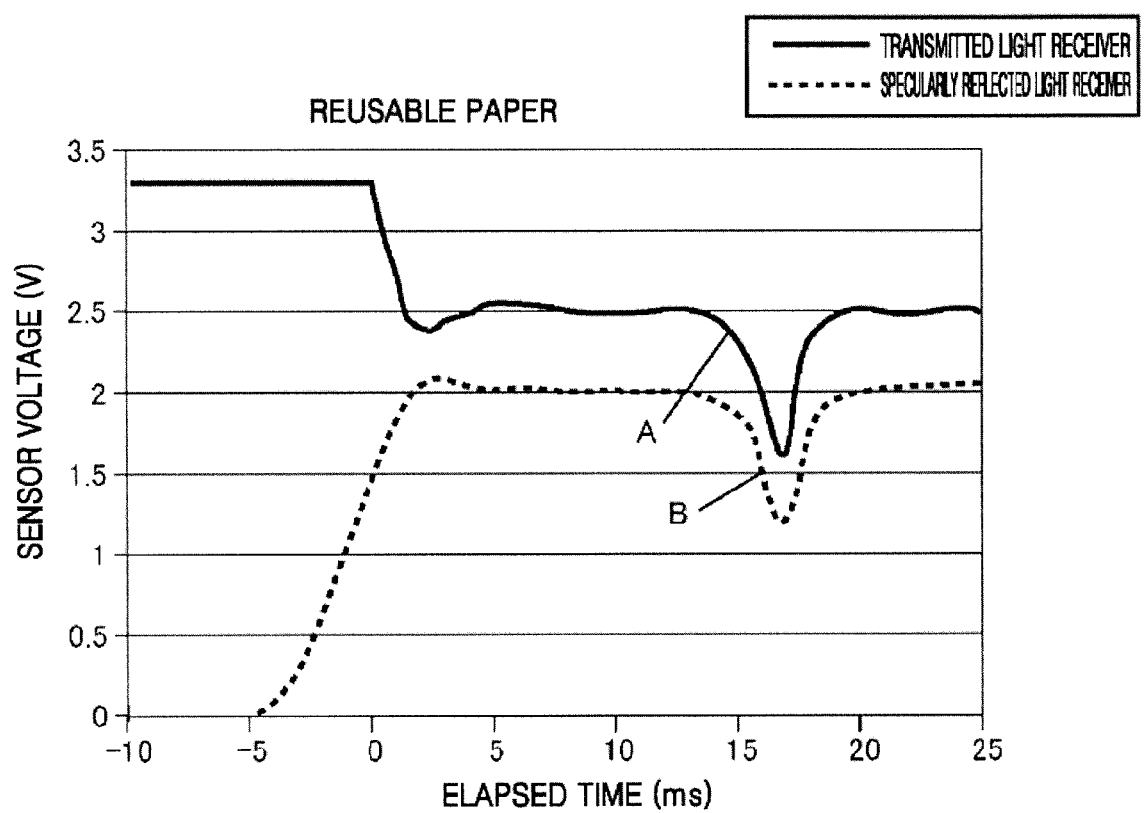
FIG. 23 is a graph showing a correlation between a detection voltage of a sensor and an elapsed time, when one surface and the other surface of reusable paper are improperly arranged and set in a paper tray, according to an embodiment.

FIG. 23 is a graph showing a correlation between sensor voltages (detection voltages) respectively corresponding to a transmitted light amount detected by the transmitted light receiver 22 and a reflected light amount detected by the specularly reflected light receiver 23 and an elapsed time when one surface and the other surface of reusable paper are improperly disposed and are set in the paper trays 1 and 31, according to an embodiment.

When the light emitted by the light emitter 21 and radiated to printing paper contacts an image formed on the printing paper, the radiated light is absorbed by ink or toner that forms the image. Thus, regardless of whether the image is formed on one surface or the other surface of the printing paper, the transmitted light amount detected the transmitted light receiver 22 decreases.

However, when the light emitted by the light emitter 21 contacts an image formed on the printing paper, the reflected light amount detected by the specularly reflected light receiver 23 decreases when the image is formed on a surface that faces the light emitter 21, namely, the surface contacted by the radiated light, and rarely changes when the image is formed on the other surface, namely, a surface not contacted by the radiated light.

The abnormality determiner (micro-computer 13) monitors the transmitted light amount detected by the transmitted light receiver 22 and the reflected light amount detected by the specularly reflected light receiver 23. When the transmitted light amount decreases and a total amount of the decrease exceeds the preset transmitted light determination threshold Thpene, the abnormality determiner (micro-computer 13) checks a change in the reflected light amount detected by the specularly reflected light receiver 23. As the transmitted light determination threshold Thpene, for example, a decrement of the transmitted light amount that is as much as one printing paper sheet may be considered.

When a total decrement sum of the transmitted light amount exceeds the transmitted light determination threshold Thpene, the abnormality determiner checks whether a total decrement sum of the reflected light amount detected by the specularly reflected light receiver 23 exceeds a preset reflected-light printing surface determination threshold Thtype.

The abnormality determiner also checks whether the reflected light amount is within a preset reflected-light reusable paper determination threshold Threvers.

As shown in FIG. 22, when about 17 ms has passed, the total decrement sum of the transmitted light amount exceeds the transmitted light determination threshold Thpene and the reflected light amount detected by the specularly reflected light receiver 23 does not increase and is within the reflected light reusable paper determination threshold Threvers, the abnormality determiner determines that printing has been completed with the surface other than the printing surface of the printing paper and the printing surface of the printing paper has not yet undergone printing, namely, determines that the printing paper is reusable paper properly set in the paper trays 1 and 31.

On the other hand, as shown in FIG. 23, when about 17 ms has passed, the total decrement sum of the transmitted light amount exceeds the transmitted light determination threshold Thpene, and the total decrement sum of the reflected light amount detected by the specularly reflected light receiver 23 exceeds the reflected light printing surface determination threshold Thtype, the abnormality determiner determines that printing has been completed on the printing surface of the printing paper and one surface and the other surface of the printing paper are improperly disposed in the paper tray 1 or 31.

When a timing when both the transmitted light amount and the reflected light amount are reduced in FIG. 23 and a timing when the transmitted light amount is reduced but the reflected light amount is not reduced in FIG. 22 coexist, the abnormality determiner determines that printing has already been performed on both surfaces of the printing paper. For example, although not shown in the drawings, when the A-B state of FIG. 22 alternates with the A-B state of FIG. 23, the abnormality determiner may determine that printing has already been performed on both surfaces of the printing paper.

When the total decrement sum of the transmitted light amount does not exceed the transmitted light determination threshold Thpene, the abnormality determiner may determine that both surfaces of the printing paper are blank.

When the abnormality determiner determines that both surfaces of the printing paper are blank, the current printing process continues. When the abnormality determiner determines that printing has not yet been performed on the printing surface of printing paper of which one surface has completed printing, and the current printing is one-sided printing, the current printing continues.

In a case 1 where the currently-being-conveyed printing paper is determined as printing paper of which one surface has already completed printing and thus the printing surface has already completed printing but a currently-set printing process is double-sided printing, or in a case 2 where the currently-being-conveyed printing paper is determined as printing paper of which both surfaces have already completed printing, an image is not formed on the printing paper, the printing paper is continuously conveyed and then discharged, and the image is formed on the next print paper sheet. In this case, the printing operator is informed of the discharge of the printing paper. When there exists a paper tray other than the paper tray 1 or 31 from which the printing paper sheet has been picked up, the printing paper may be returned to the paper tray 1 or 31, and a printing paper sheet may be picked up from the other paper tray to continue printing.

Instead of the printing paper being discharged and printing being performed on the next printing paper sheet, the abnormality determiner may determine that an error has occurred, and may stop an operation of the image forming apparatus. If the printing paper is able to be stopped at a location that does not block a path of a preceding printing paper sheet when an operation of the image forming apparatus is stopped, after printing is completed with respect to the preceding printing paper, the image forming apparatus may be processed as being in an error state. On the other hand, if the printing paper blocks the path of the preceding printing paper sheet, the abnormality determiner may immediately process the image forming apparatus as being in an error state.

When the abnormality determiner determines that two surfaces of the currently-being-conveyed printing paper, one surface of which has already been printed on, are wrongly arranged on the paper tray 1 or the paper tray 31 and a current printing process is one-sided printing, the two surfaces of the currently-being-conveyed printing paper may be reversely arranged, and printing may be performed on the printing surface of the printing paper after the reversal of the surface arrangement.

In some cases, printing may be performed again on the printing-completed surface of the printing paper. Thus, a user of the image forming apparatus may input a setting of invalidating the determination of the abnormality determiner.

As can be seen from the above description, according to the seventh embodiment, since the abnormality determiner may determine whether an image has already been formed on the printing surface of the currently-being-conveyed printing paper, if the printing operator wrongly sets the printing surface of the printing paper, image formation on the printing paper may be stopped, and the wrong setting may be corrected to obtain a proper printing result. In addition, since the printing operator may recognize the wrong setting of the printing surface in an early printing stage, the number of correcting operations by the printing operator may be reduced.

Usability of one or more of the first through third embodiments together with the seventh embodiment, or matters related to adjustment of the spot diameter of radiated light, are the same as those described with reference to the sixth embodiment.

Examples of the printing paper used in the image forming apparatus may include not only paper formed of pulp, so called common paper, but also surface-coated paper (e.g., glossy paper) or a sheet formed of resin (e.g., an OHP sheet).

When a sheet is used, the image forming apparatus needs to operate in an operational mode dedicated for the type of sheet. When the image forming apparatus does not operate in the operational mode dedicated for the type of sheet, the image forming apparatus may be destroyed.

In conventional apparatuses, a unit for detecting a sheet including resin, such as an OHP sheet, may be provided via a combination of a mechanical input device and an optical sensor, but a detection reaction speed is slow. Thus, when a preceding paper sheet is arranged when a sheet including resin was detected, the preceding paper sheet may be wasted. Moreover, in conventional apparatuses, a resin sheet on which an image has already been drawn may not be detected.

According to an eighth embodiment, not only when printing paper is common paper using pulp but also when printing paper is a sheet including resin (e.g., an OHP sheet), the type of printing paper may be determined.

The image forming apparatus according to the eighth embodiment is substantially the same as that of FIG. 13 (the fourth embodiment), and thus a description thereof will be omitted or simplified for convenience of explanation.

According to the embodiment, the micro-computer 13 may function as a paper type determiner by executing various programs. For example, when the micro-computer 13 functions as a paper type determiner, the micro-computer 13 may determine the type of a currently-being-conveyed printing paper sheet from a change in the transmitted light amount detected by the transmitted light receiver 22, a change in the specularly reflected light amount detected by the specularly reflected light receiver 23, and a change in the diffusively reflected light amount detected by the diffusively reflected light receiver 24. The micro-computer 13 may also function as an abnormality determiner by executing various programs. For example, the micro-computer 13 may determine normality or abnormality of the currently-being-conveyed printing paper sheet from the change in the transmitted light amount detected by the transmitted light receiver 22, the change in the specularly reflected light amount detected by the specularly reflected light receiver 23, the change in the diffusively reflected light amount detected by the diffusively reflected light receiver 24, and the type of the currently-being-conveyed printing paper sheet determined by the paper type determiner.

Figure 24:
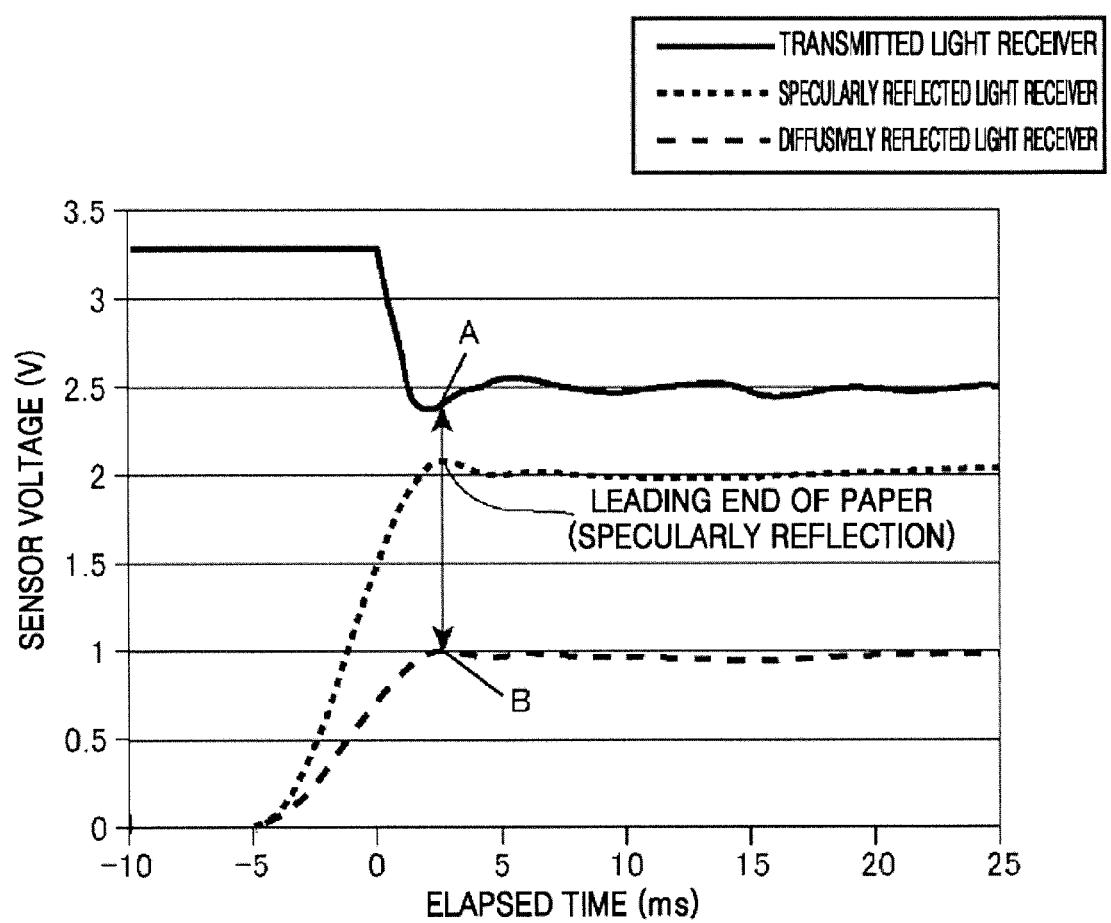
FIG. 24 is a graph showing a correlation between a detection voltage of a sensor and an elapsed time, when printing paper currently being conveyed is common paper, according to an embodiment.

FIG. 24 is a graph showing a correlation between detection voltages of a sensor respectively corresponding to a transmitted light amount, a specularly reflected light amount, and a diffusively reflected light amount with respect to common paper and an elapsed time when a currently-being-conveyed printing paper sheet is common paper, according to an embodiment.

Figure 25:
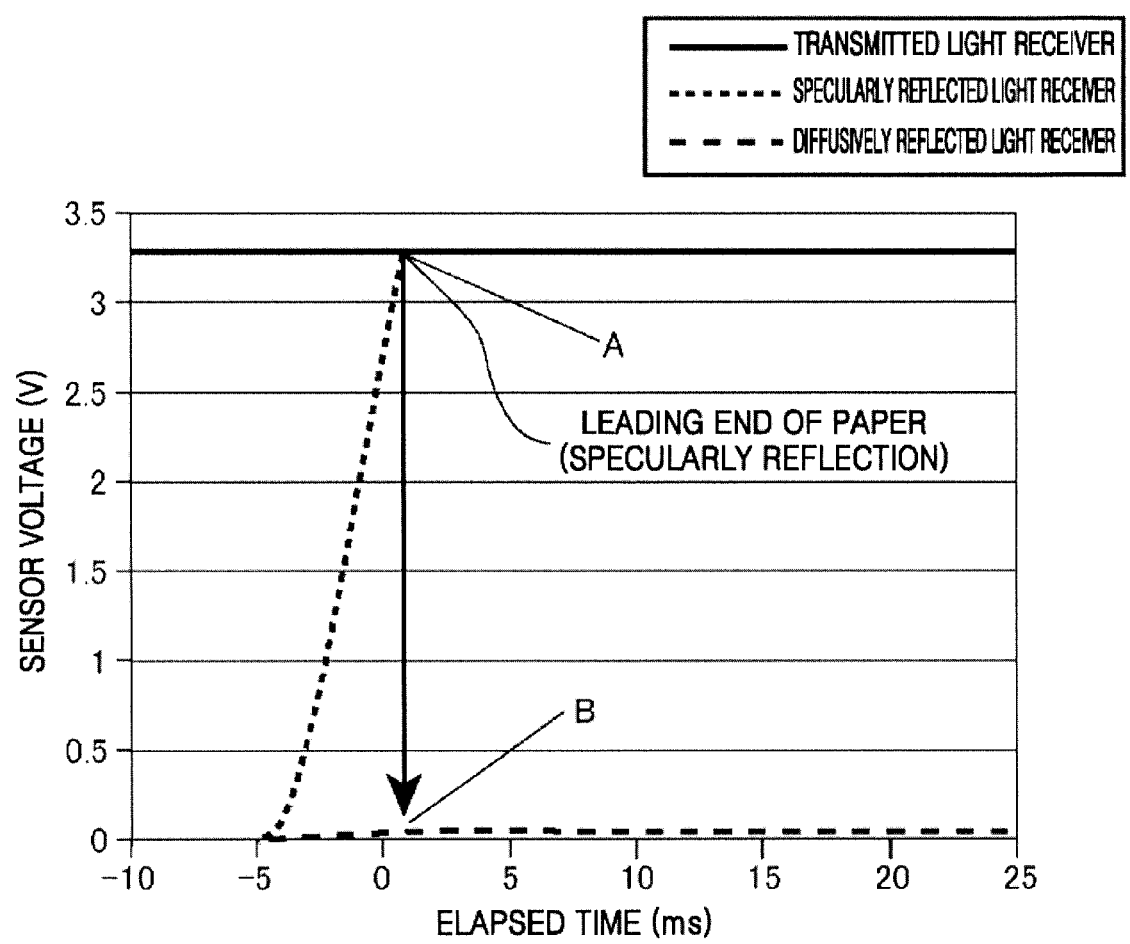
FIG. 25 is a graph showing a correlation between a detection voltage of a sensor and an elapsed time, when printing paper currently being conveyed is a transparent overhead projector (OHP) sheet, according to an embodiment.

FIG. 25 is a graph showing a correlation between detection voltages of a sensor respectively corresponding to a transmitted light amount, a specularly reflected light amount, and a diffusively reflected light amount with respect to a transparent OHP sheet and an elapsed time when a currently-being-conveyed printing paper sheet is a transparent OHP sheet, according to an embodiment.

Figure 26:
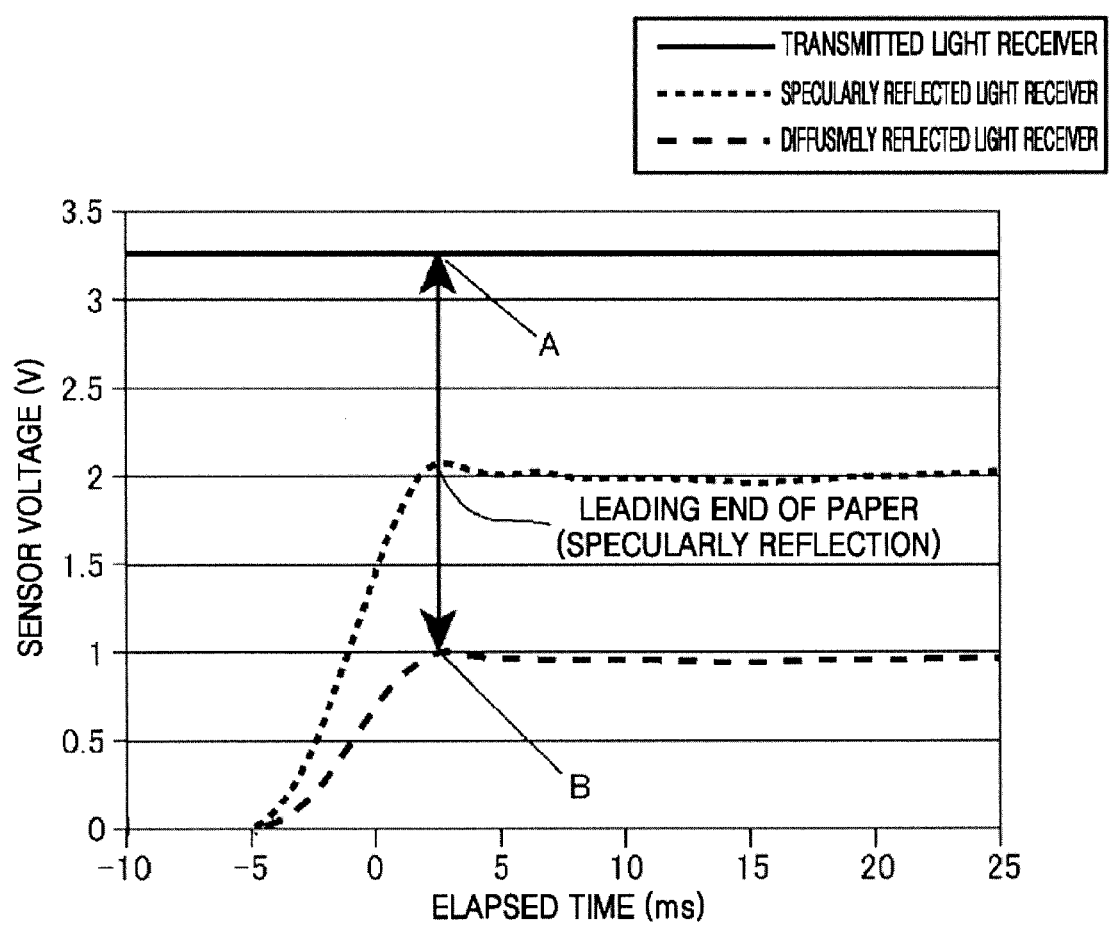
FIG. 26 is a graph showing a correlation between a detection voltage of a sensor and an elapsed time, when printing paper currently being conveyed is highly transparent paper such as tracing paper, according to an embodiment.

FIG. 26 is a graph showing a correlation between detection voltages of a sensor respectively corresponding to a transmitted light amount, a specularly reflected light amount, and a diffusively reflected light amount with respect to a highly transparent paper sheet and an elapsed time when a currently-being-conveyed printing paper sheet is a highly transparent paper sheet, such as tracing paper, according to an embodiment.

Figure 27:
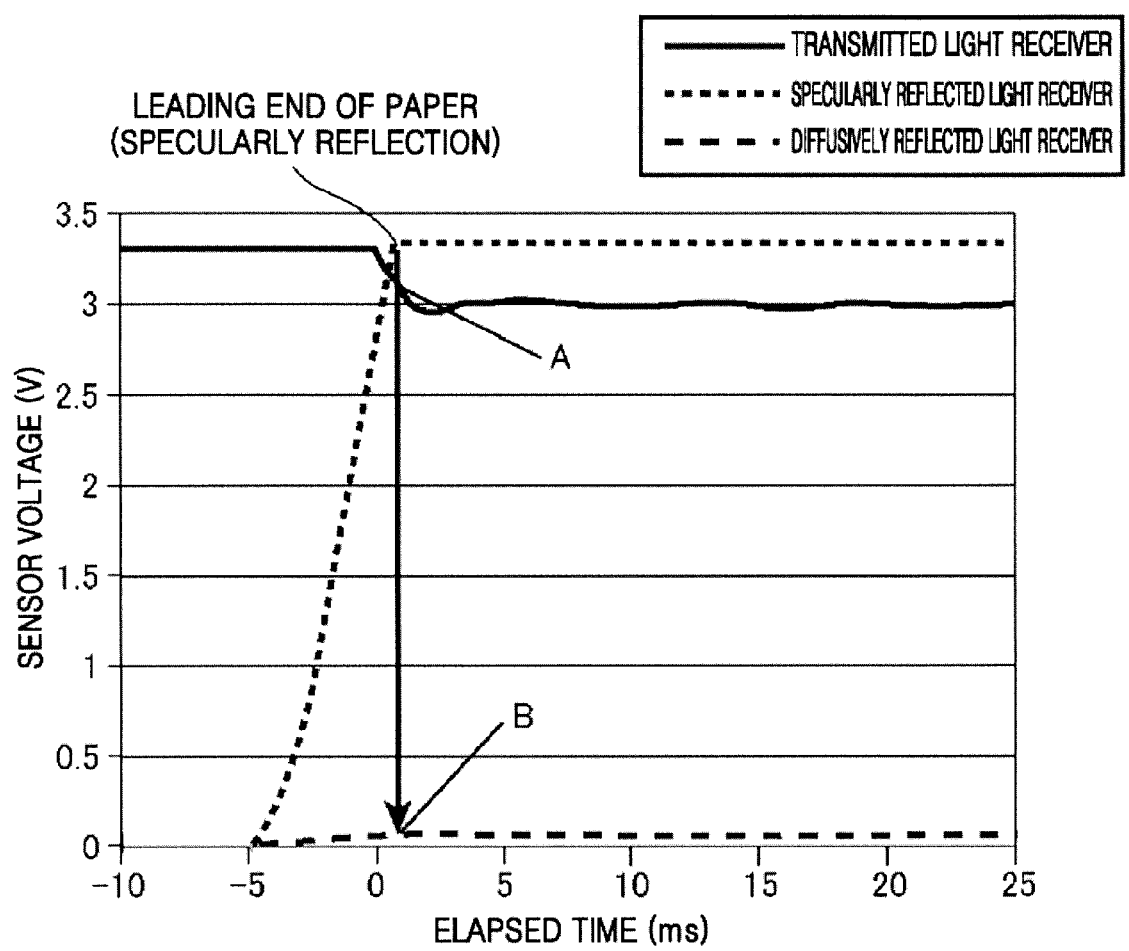
FIG. 27 is a graph showing a correlation between a detection voltage of a sensor and an elapsed time, when printing paper currently being conveyed is an opaque resin sheet, according to an embodiment.

FIG. 27 is a graph showing a correlation between detection voltages of a sensor respectively corresponding to a transmitted light amount, a specularly reflected light amount, and a diffusively reflected light amount with respect to an opaque resin sheet and an elapsed time when a currently-being-conveyed printing paper sheet is an opaque resin sheet, according to an embodiment.

According to the eighth embodiment, the sensor 5 adjusts a light amount of the light emitter 21 and a light-receiving gain of each light receiver so that the transmitted light receiver 22, the specularly reflected light receiver 23, and the diffusively reflected light receiver 24 may receive lights at the same radiating location emitted by the light emitter 21 at the same timing and compare the received lights with one another.

A detection range of the transmitted light receiver 22, the specularly reflected light receiver 23, and the diffusively reflected light receiver 24, namely, a spot of the radiated light of the light emitter 21, may be adjusted to be disposed on a blank area of a leading end portion of the printing paper corresponding to a non-printing portion of the printing paper in a traveling direction of the printing paper. For example, when a reusable sheet or the like is used, a printed portion thereof may not undergo a determination which will be described below. In this case, by adjusting the spot location of the radiated light of the light emitter 21 by using the sensor 5, determination may be performed using the blank area of the leading end portion of the printing paper.

For example, each light receiver may be arranged lower than a meeting point of a printing paper sheet picked up from each paper supply tray in a conveying path of printing paper. Alternatively, each light receiver may be arranged to be higher than the meeting point 8 by at least the blank area of the leading end portion of the printing paper in the conveying path of printing paper. Accordingly, when a difference between printing paper types is detected according to a method below and conveyance of the printing paper is stopped according to a result of the detection, the conveyance of the printing paper may be stopped in front of the meeting point 8 without blocking a conveying path from the reusable paper conveying path 7, and thus printing of a preceding paper sheet may continue.

The paper type determiner (micro-computer 13) detects what light receiver has detected the leading end portion of the printing paper, according to the transmitted light amount detected by the transmitted light receiver 22, the specularly reflected light amount detected by the specularly reflected light receiver 23, and the diffusively reflected light amount detected by the diffusively reflected light receiver 24. In other words, the paper type determiner (micro-computer 13) monitors whether each of the transmitted light, the specularly received light, and the diffusively received light has changed by at least a medium detection threshold set for a sensor of each of the transmitted light, the specularly received light, and the diffusively received light.

The medium detection threshold is a value that is equal to, slightly greater than, or less than the transmitted light amount, the specularly reflected light amount, and the diffusively reflected light amount respectively detected by the transmitted light receiver 22, the specularly reflected light receiver 23, and the diffusively reflected light receiver 24, when a printing paper sheet that is highest or lowest in transmittance, specular reflectance, and diffusive reflectance, from among a plurality of types of printing paper sheets handled by the image forming apparatus, exists on the paper conveying path 4.

When the paper type determiner has determined that the printing paper exists on the paper conveying path 4, and when the diffusively reflected light amount detected by the diffusively reflected light receiver 24 is sufficiently small and is less than or equal to the medium detection threshold as shown in FIG. 25 or 27, the paper type determiner determines that the printing paper sheet on the paper conveying path 4 is a printing paper sheet coated with a film layer.

According to the eighth embodiment, the printing paper sheet coated with a film layer denotes a coated sheet, a transparent OHP sheet, or an opaque resin sheet.

When the printing paper sheet on the paper conveying path 4 is determined as a printing paper sheet coated with a film layer and the transmitted light amount detected by the transmitted light receiver 22 is detected as a saturated state or as a value that is almost the same as the amount of light emitted by the light emitter 21 and received directly by the transmitted light receiver 22 as shown in FIG. 25, the paper type determiner determines that the printing paper on the paper conveying path 4 is a transparent sheet, for example, an OHP sheet.

On the other hand, as shown in FIG. 27, when the transmitted light amount detected by the transmitted light receiver 22 is detected as not a saturated state but a value that is lower than a preset resin sheet determination threshold, the paper type determiner determines that the printing paper on the paper conveying path 4 is a coated sheet or an opaque resin sheet. For example, the preset resin sheet determination threshold may be, for example, 3.1V.

The saturated state denotes a state in which a light amount that exceeds a maximum value of the amount of light that can be received by the transmitted light receiver 22 is received. Accordingly, according to the embodiment, when an output of the transmitted light receiver 22 exceeds a preset saturation determination threshold, the paper type determiner determines that this case is a saturated state. For example, the preset saturation determination threshold may be, for example, 3.3V. This will be equally applied to below.

When the diffusively reflected light amount detected by the diffusively reflected light receiver 24 is equal to or greater than the medium detection threshold, the paper type determiner compares the diffusively reflected light amount with a preset paper determination threshold Thd. At this time, the paper type determiner may use a value that is standardized in relation to the light receiving amount of the diffusively reflected light amount. In this case, a standardized value as described above may be used as the paper determination threshold Thd.

As shown in FIG. 24 or 26, when the detected diffusively reflected light amount is equal to or greater than the paper determination threshold Thd, the paper type determiner determines that the printing paper sheet on the paper conveying path 4 is a printing paper sheet including a paper on its surface.

For example, printing paper including a paper layer in the above-described embodiment may be common paper or tracing paper.

When the printing paper sheet on the paper conveying path 4 is determined as a printing paper sheet including a paper layer and the transmitted light amount detected by the transmitted light receiver 22 is detected as a saturated state as shown in FIG. 26, the paper type determiner determines that the printing paper sheet on the paper conveying path 4 is a tracing paper sheet.

On the other hand, as shown in FIG. 24, when the transmitted light amount detected by the transmitted light receiver 22 is lower than a preset common paper determination threshold, the paper type determiner determines that the printing paper sheet on the paper conveying path 4 is a common paper sheet. The preset common paper determination threshold may be, for example, 2.6V.

When the paper type determiner (micro-computer 13) determines the type of the printing paper sheet on the paper conveying path 4, the abnormality determiner (micro-computer 13) determines whether the determined type conforms to the type of printing paper according to an operational mode set in the image forming apparatus.

If the type of printing paper determined by the paper type determiner does not conform to the set type of printing paper according to the operational mode, the abnormality determiner stops conveying the currently-being-conveyed printing paper. At this time, when a preceding paper sheet is undergoing printing, after the printing of the preceding paper sheet is completed, the abnormality determiner changes the operational mode so that the type of printing paper according to the operational mode is consistent with the type of printing paper determined by the paper type determiner. After changing the operational mode, the abnormality determiner resumes the conveyance of the printing paper and continues printing.

When no preceding paper sheets exist, the abnormality determiner changes the operational mode so that the type of printing paper according to the operational mode is consistent with the type of printing paper determined by the paper type determiner, and then resumes the conveyance of the printing paper and continues printing.

Alternatively, when the type of printing paper according to the operational mode is not consistent with the type of printing paper determined by the paper type determiner and the preceding paper sheet is undergoing printing, the abnormality determiner stops conveying the currently-being-conveyed printing paper. After the printing of the preceding paper sheet is completed, the abnormality determiner may stop an operation of the image forming apparatus. When no preceding paper sheets exist, the abnormality determiner may immediately stop an operation of the image forming apparatus.

Alternatively, when the type of printing paper determined by the paper type determiner is not consistent with the type of printing paper according to the operational mode, the abnormality determiner may return the currently-being-conveyed printing paper to a paper tray that conforms to the type of printing paper determined by the paper type determiner, and may continue printing by picking up a printing paper sheet from a paper tray that stores paper sheets corresponding to the printing paper type according to the operational mode. Since the above-described process is performed on the premise that "a paper tray that conforms to the type of printing paper determined by the paper type determiner" exists, existence or absence of the paper tray may be determined. When no trays exist, printing may be conducted according to one of the above-described processes.

As can be seen from the above description, according to the eighth embodiment, since the paper type determiner may determine the type of a currently-being-conveyed printing paper sheet from a change in the transmitted light amount detected by the transmitted light receiver 22, a change in the specularly reflected light amount detected by the specularly reflected light receiver 23, and a change in the diffusively reflected light amount detected by the diffusively reflected light receiver 24, even when not only a sheet using pulp but also a sheet using resin (e.g., an OHP sheet) is used as printing paper, the paper type determiner may determine the type of the currently-being-conveyed printing paper sheet.

In other words, according to the eighth embodiment, since the same sensor 5 is used as a unit for detecting the leading end portion of a paper sheet and a unit for determining the type of the paper sheet, an area of a printing paper sheet from which the type of the printing paper sheet is determined is a blank area of a leading end portion of the printing paper sheet. Accordingly, in the stage where the blank area of the leading end portion, which is beyond the printing range of the printing paper sheet, is conveyed, it may be determined whether the printing paper sheet is paper or a film. Thus, even when an image has already been formed on the printing paper, the type of printing paper may be properly determined.

Moreover, since whether the printing paper sheet is paper or a film may be determined when the printing paper sheet is conveyed, the conveying performance of the printing paper sheet is not sacrificed. In addition, since the sensor 5 is provided in front of the meeting point 8 and the type of printing paper may be determined within a short distance corresponding to the blank area of the leading end portion, the conveyance of the printing paper on the paper conveying path 4 may be stopped without blocking the conveying path of the printing paper conveyed from the reusable paper conveying path 7, and at this state printing of a preceding paper sheet may continue.

According to one or more embodiments disclosed herein, an image forming apparatus is capable of preventing misdetermination of the type of printing paper.

According to one or more embodiments disclosed herein, an image forming apparatus is capable of detecting an abnormal state, such as paper double feeding or conveyance of a sheet of which the printing surface has completed printing.

According to one or more embodiments disclosed herein, an image forming apparatus is capable of determining the type of printing paper.

Although an output determiner, a paper type determiner, an abnormality determiner, and a paper type determiner are configured by the micro-computer 13 and programs executed by the micro-computer 13 in one or more of the above-described embodiments, one or all of the determiners may be configured by a dedicated circuit or the like.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been shown and described with reference to the figures, it will be understood by those of ordinary skill in the art that various changes in form and details may be made therein without departing from the principles and spirit of the disclosure, the scope of which is defined by the following claims and their equivalents.

What is claimed is:

1. An image forming apparatus, comprising:
    a light emitter configured to radiate light to a recording medium;
    a light receiver including a plurality of detectors configured to receive a portion of the light radiated to the recording medium and to respectively output independent detection results; and
    an output determiner configured to determine a change in at least one of a conveying state of the recording medium and a relative arrangement between the light emitter and the light receiver, according to independent detection results respectively output by the plurality of detectors,
    wherein the light receiver includes at least one of a transmitted light receiver configured to detect an amount of light transmitted by the recording medium from the light radiated by the light emitter, a specularly reflected light receiver configured to detect an amount of light specularly reflected by the recording medium from the light radiated by the light emitter, and a diffusively reflected light receiver configured to detect an amount of light diffusively reflected by the recording medium from the light radiated by the light emitter.

2. The image forming apparatus of claim 1, wherein the independent detection results respectively output by the plurality of detectors are light receiving amounts detected by the plurality of detectors or degrees of relative change of the light receiving amounts.

3. The image forming apparatus of claim 2, wherein, when a sum of the light receiving amounts of the plurality of detectors exceeds an upper bound of a range of a preset total light amount threshold or is less than a lower bound of the range of the preset total light amount threshold, the output determiner determines that the at least one of the conveying state of the recording medium and the relative arrangement between the light emitter and the light receiver is abnormal.

4. The image forming apparatus of claim 1, wherein the light receiver includes at least three detectors, and each of the at least three detectors includes at least one detection device.

5. The image forming apparatus of claim 4, wherein
    the at least three detectors are arranged at regular intervals, and
    the output determiner determines whether the at least one of the conveying state of the recording medium and the relative arrangement between the light emitter and the light receiver is abnormal, according to a difference between light receiving amounts of the at least three detectors.

6. The image forming apparatus of claim 5, wherein
the at least three detectors are arranged at different locations in a direction perpendicular to a conveying direction of the recording medium on a plane defined by the recording medium, and
the output determiner determines whether the at least one of the conveying state of the recording medium and the relative arrangement between the light emitter and the light receiver is abnormal, according to a difference between light receiving amounts of the at least three detectors.

7. The image forming apparatus of claim 5, wherein
the at least three detectors are arranged at different locations in a conveying direction of the recording medium, and
the output determiner determines whether the at least one of the conveying state of the recording medium and the relative arrangement between the light emitter and the light receiver is abnormal, according to a difference between light receiving amounts of the at least three detectors.

8. The image forming apparatus of claim 1, wherein the light receiver has four detectors, and the four detectors are arranged in a lattice shape.

9. The image forming apparatus of claim 8, wherein
when an intersection between an optical axis of the light radiated by the light emitter and the recording medium is defined as an origin point, the output determiner calculates a difference between a sum of light receiving amounts of one or more detectors among the four detectors that are arranged on one side of a direction perpendicular to a conveying direction of the recording medium and a sum of light receiving amounts of remaining detectors among the four detectors that are arranged on another side of the direction perpendicular to the conveying direction of the recording medium, and
when the difference exceeds a preset maximum threshold, the output determiner determines that the at least one of the conveying state of the recording medium and the relative arrangement between the light emitter and the light receiver is abnormal.

10. The image forming apparatus of claim 8, wherein
when an intersection between an optical axis of the light radiated by the light emitter and the recording medium is defined as an origin point, the output determiner calculates a difference between a sum of light receiving amounts of one or more detectors among the four detectors that are arranged on one side of a conveying direction of the recording medium and a sum of light receiving amounts of remaining detectors among the four detectors that are arranged on another side of the conveying direction of the recording medium, and
when the difference exceeds a preset maximum threshold, the output determiner determines that the at least one of the conveying state of the recording medium and the relative arrangement between the light emitter and the light receiver is abnormal.

11. The image forming apparatus of claim 8, wherein
when a sum of light receiving amounts of the detectors is less than or equal to a preset angle determination threshold, the output determiner defines an intersection between an optical axis of the light radiated by the light emitter and the recording medium as an origin point, and calculates a difference between a sum of the light receiving amounts of one or more detectors among the four detectors that are arranged on one side of a conveying direction of the recording medium and a sum of light receiving amounts of remaining detectors among the four detectors that are arranged on another side of the conveying direction of the recording medium, and
when the difference exceeds a preset shift determination threshold, the output determiner determines that at least one of the conveying state of the recording medium and the relative arrangement between the light emitter and the light receiver is abnormal.

12. The image forming apparatus of claim 8, wherein
when a sum of light receiving amounts of the detectors is less than or equal to a preset angle determination threshold, the output determiner defines an intersection between an optical axis of the light radiated by the light emitter and the recording medium as an origin point, and calculates a difference between a sum of light receiving amounts of one or more detectors among the four detectors that are arranged on one side of a direction perpendicular to a conveying direction of the recording medium and a sum of light receiving amounts of remaining detectors among the four detectors that are arranged on another side of the direction perpendicular to the conveying direction of the recording medium, and
when the difference exceeds a preset shift determination threshold, the output determiner determines that at least one of the conveying state of the recording medium and the relative arrangement between the light emitter and the light receiver is abnormal.

13. The image forming apparatus of claim 8, wherein
when a sum of light receiving amounts of the detectors is less than or equal to a preset angle determination threshold, the output determiner defines an intersection between an optical axis of the light radiated by the light emitter and the recording medium as an origin point, and calculates a difference between a sum of light receiving amounts of one or more detectors among the four detectors that are arranged on a diagonal line in one direction and a sum of light receiving amounts of remaining detectors among the four detectors that are arranged on a diagonal line in another direction, in four areas defined in the lattice shape by a conveying direction of the recording medium and a direction perpendicular to the conveying direction of the recording medium, and
when the difference exceeds a preset shift determination threshold, the output determiner determines that at least one of the conveying state of the recording medium and the relative arrangement between the light emitter and the light receiver is abnormal.

14. The image forming apparatus of claim 1, further comprising:
a paper type determiner configured to determine, from at least one of a change in the amount of light transmitted, a change in the amount of light specularly reflected, and a change in the amount of light diffusively reflected, a type of the recording medium currently being conveyed; and
an abnormality determiner configured to determine, from the at least one of the change in the amount of light transmitted, the change in the amount of light specularly reflected, the change in the amount of light diffusively reflected, and from the type of the currentlybeing-conveyed recording medium determined by the paper type determiner, normality or abnormality of the recording medium currently being conveyed.

15. The image forming apparatus of claim 14, wherein, when at least one of the amount of light transmitted, the amount of light specularly reflected, and the amount of light diffusively reflected exceeds a preset medium detection threshold, the paper type determiner determines that the recording medium is on the conveying path and determines the type of the recording medium currently being conveyed.

16. The image forming apparatus of claim 15, wherein, when the paper type determiner determines that the recording medium is on the conveying path and the amount of light diffusively reflected is less than or equal to the preset medium detection threshold, the paper type determiner determines that the recording medium currently being conveyed comprises a film layer on a surface of the recording medium.

17. The image forming apparatus of claim 16, wherein
when it is determined that the recording medium currently being conveyed comprises the film layer on the surface of the recording medium, and an output of the transmitted light receiver is equal to or greater than a preset saturation determination threshold, the paper type determiner determines that the recording medium currently being conveyed comprises a transparent sheet, and
when the output of the transmitted light receiver is less than or equal to a preset resin sheet determination threshold, the paper type determiner determines that the recording medium currently being conveyed comprises an opaque resin sheet layer.

18. The image forming apparatus of claim 15, wherein, when the paper type determiner determines that the recording medium is on the conveying path, and an output of the diffusively reflected light receiver is equal to or greater than a preset paper determination threshold, the paper type determiner determines that the recording medium currently being conveyed comprises a paper layer on a surface of the recording medium.

19. The image forming apparatus of claim 18, wherein
when it is determined that the recording medium currently being conveyed comprises the paper layer on the surface of the recording medium, and an output of the transmitted light receiver is equal to or greater than a preset saturation determination threshold, the paper type determiner determines that the recording medium currently being conveyed is tracing paper, and
when the output of the transmitted light receiver is equal to or greater than a preset common paper determination threshold, the paper type determiner determines that the recording medium currently being conveyed is common paper.

20. The image forming apparatus of claim 1, further comprising:
an abnormality determiner configured to determine normality or abnormality of the recording medium currently being conveyed; and
a second conveying path for printing another surface of the recording medium currently being conveyed,
wherein
the light emitter and the light receiver are arranged on the conveying path of the recording medium before a meeting point between the conveying path and the second conveying path such that the recording medium currently being conveyed is detected between the light emitter and the light receiver by using a light receiving amount detected by the light receiver, and
the abnormality determiner determines the normality or abnormality of the recording medium currently being conveyed, from a time period during which the light receiving amount changes.

* * * * *